US005988862A

United States Patent [19]
Kacyra et al.

[11] Patent Number: 5,988,862
[45] Date of Patent: Nov. 23, 1999

[54] INTEGRATED SYSTEM FOR QUICKLY AND ACCURATELY IMAGING AND MODELING THREE DIMENSIONAL OBJECTS

[75] Inventors: Ben Kacyra, Orinda; Jerry Dimsdale, Berkeley; Mark Brunkhart, Oakland, all of Calif.

[73] Assignee: Cyra Technologies, Inc., Orinda, Calif.

[21] Appl. No.: 08/638,961

[22] Filed: Apr. 24, 1996

[51] Int. Cl.⁶ .......................... G06F 17/50; G01C 25/00
[52] U.S. Cl. ........................ 364/578; 364/560; 382/195
[58] Field of Search ........................ 364/560; 324/309; 344/578; 382/195

[56] References Cited

U.S. PATENT DOCUMENTS

| | | | |
|---|---|---|---|
| 4,658,218 | 4/1987 | Kenney-Wallace et al. | 330/4.3 |
| 4,860,304 | 8/1989 | Mooradian | 372/92 |
| 4,907,586 | 3/1990 | Bille et al. | 606/5 |
| 4,928,152 | 5/1990 | Gerardin | 356/5 |
| 4,973,111 | 11/1990 | Haacke et al. | 324/309 |
| 5,006,721 | 4/1991 | Cameron et al. | 250/561 |
| 5,110,203 | 5/1992 | MacCabee | 356/5 |
| 5,114,226 | 5/1992 | Goodwin et al. | 356/5 |
| 5,132,977 | 7/1992 | Zayhowski et al. | 372/10 |
| 5,337,149 | 8/1994 | Kozah et al. | 356/376 |
| 5,381,431 | 1/1995 | Zayhowski | 372/25 |
| 5,384,717 | 1/1995 | Ebenstein | 364/560 |
| 5,386,427 | 1/1995 | Zayhowski | 372/34 |
| 5,394,413 | 2/1995 | Zayhowski | 372/10 |
| 5,402,364 | 3/1995 | Kitoh et al. | 364/560 |
| 5,414,647 | 5/1995 | Ebenstein et al. | 364/560 |
| 5,531,520 | 7/1996 | Grimson et al. | 382/131 |
| 5,606,409 | 2/1997 | Schneiter | 356/4.02 |
| 5,623,335 | 4/1997 | Bamberger | 356/5.01 |
| 5,638,163 | 6/1997 | Nourrcier, Jr. | 356/5.01 |
| 5,638,164 | 6/1997 | Landau | 356/5.01 |
| 5,689,446 | 11/1997 | Sundman | 364/560 |
| 5,719,664 | 2/1998 | Besesty et al. | 356/5.01 |

FOREIGN PATENT DOCUMENTS

| | | | |
|---|---|---|---|
| 2 662 244 | 11/1991 | France | G01B 11/26 |
| 41 09 844 C1 | 6/1992 | Germany | G01S 17/10 |
| 57-004564 | 1/1982 | Japan | G01S 7/48 |
| 62-108172 | 5/1987 | Japan | G01S 7/48 |
| 06188501 | 7/1994 | Japan | H01S 3/11 |
| 2 292 605 | 2/1996 | United Kingdom | G01B 11/24 |

OTHER PUBLICATIONS

Coticchia, Mark E. *CAD/CAM/CAE Systems, Second Edition*. Marcel Dekker, Inc. New York, NY. p. 438, 1993.

C. Bradley & G.W. Vickers, "Free-form surface reconstruction for machine vision rapid prototyping," *Optical Engineering*, Sep. 1993, vol. 32, No. 9, pp. 2191–2200.

E.S. Cameron & R. Doshi, "The Design and Manufacture of a High-Resolution Laser Radar Scanner," *SPIE Laser Radar IV*, vol. 1103, 1989, pp. 190–197.

T.C. Strand, "Optical three-dimensional sensing for machine vision," *Optical Engineering*, vol. 24, No. 1, Jan./Feb. 1995, pp. 33–40.

S.-Y. Lu & R.K. Johnson, "A New True 3-D Motion Camera System from Lawrence Livermore," *Advanced Imaging*, Jul. 1995, pp. 51 & 54.

N. Woodbury, M. Brubacher & J.R. Woodbury, "Noninvasive Tank Gauging With Frequency-Modulated Laser Ranging," *Sensors*, Sep. 1993, pp. 27–31.

(List continued on next page.)

*Primary Examiner*—Kevin J. Teska
*Assistant Examiner*—Russell W. Frejd
*Attorney, Agent, or Firm*—Limbach & Limbach L.L.P.

[57] ABSTRACT

An integrated system generates a model of a three-dimensional object. A scanning laser device scans the three-dimensional object and generates a point cloud. The points of the point cloud each indicate a location of a corresponding point on a surface of the object. A first model is generated, responsive to the point cloud which represents constituent geometric shapes of the object. A data file is generated, responsive to the first model, that can be inputted to a computer-aided design system.

20 Claims, 37 Drawing Sheets

OTHER PUBLICATIONS

R.R. Clark, "A Laser Distance Measurement Sensor for Industry and Robotics," *Sensors,* Jun. 1994, pp. 43–45 & 47.

Brochure by Azimuth "Laser Ranging Systems," including Product Description LRY–750E, Mar. 1996, 10 pages in length.

Brochure by Automated Precision, Inc., "Precision Measurement and Sensing Instruments for Manufacturing," 1996, pp. front cover, 1–15 & back cover.

D.S. Schwartz, "Vision Metrology System: An Automated Noncontact Three–Dimensional Measurement System," *General Dynamics Corporation,* Copyright 1989, 7 pages in length.

Brochure by John E. Chance & Associates, Inc., "TruckMap, "May 1994, 2 pages in length.

D. Knopp, "Megamodels from MicroStation—Photography goes 3D," *MicroStation Manger,* Aug. 1994, pp. 60–63.

M. Laasonen, "Surveying and Data Processing in Building Renovation," *Surveying Science in Finland,* vol. 11, No. 1–2, 1993, pp. 3–14, reformated pp. 1–7.

A.J. Mäkynen, J.T. Kostamovaara & R. Myllylä, "Tracking Laser Radar for 3–D Shape Measurements of Large Industrial Objects Based on Time–of–Flight Laser Rangefinding and Position–Sensitive Detection Techniques," *IEEE Transactions on Instrumentation and Measurement,* vol. 43, No. 1, Feb. 1994, pp. 40–49.

T.T. Wohlers, "3D Digitizers," *Computer Graphics World,* Jul. 1992, pp. 73–77.

T. Wohlers, "The Challenge of 3D Digitizing," *Computer Graphics World,* Nov. 1995, pp. 21–22.

T. Wohlers, 3D Digitizing Systems, *Computer Graphics World,* Apr. 1994, pp. 59–61.

K. Määttä, J. Kostamovaara & R. Myllylä, "Profiling of hot surfaces by pulsed time–of–flight laser range finder techniques," *Applied Optics,* vol. 32, No. 27, Sep. 20, 1993, pp. 5334–5347.

R.E. Garrett, "Advanced Technology for Blasters," *Rock Products,* Jan. 1996, pp. 37–42.

Brochure by IBEO Systems, Inc., "Information on the LADAR Scanning System," IBEO Systems, Oct. 13, 1994, 20 pages in length.

"Application Notes," Issue 2, IBEO Systems, Inc., Sep. 1993, 6 pages in length.

Article by W. Niemeier & P. Wild, "Use of Laser Scanners for the Determination of Building Geometries," Dec. 1995, pp. 275–284c.

I. Kaisto, J. Kostamovaara, M. Mannien & R. Myllylä, "Laser radar based measuring systems for large scale assembly application," *SPIE,* vol. 2088, 1994, pp. 121–131.

R.J. Pinheiro, C.D. Crane & J.S. Tulenko, "Laser Range Image Interpretation for Automated Mapping of Hazardous Enviroments," 1995.

H. Aillsto, J. Kostamovaara, I.Moring & R. Myllylä, "Applic ations of Laser Radar," *Sensor Review,* vol. 13, No. 1, 1993, pp. 26–28.

Brochure by CATCO, "Laser Mapping System," Jan. 1996, 27 pages in length.

M.H. Tulloch, "Laser Rangefinder/Speed Guns Find New Uses," *Photonics Spectra,* Jul. 1992, one page in length.

Brochure by Laser Atlanta, "Prosurvey 1000 and Geolink Mapping Systems," Jul. 1992, 10 pages in length.

B. Simon & T.T. Wohlers, "Capturing Surface Data," *DesignNet,* Mar. 1992, on page in length.

Brochure by Perceptron, "Simultaneous 2–D and 3–D images from a single general–purpose camera!," may 1995, 5 pages in length.

S. Ball, "Autoscanning Laser Systems a Valuable Took," Sep. 1996, 2 pages in length.

C. Bradley & G.W. Vickers, "Free–form surface reconstruction for machine vision rapid prototyping," *Optical Engineering,* vol. 32, No. 9, Sep. 1993, pp. 2191–2200.

C.–W. Liao & G. Medioni, "Surface Approximation of a Cloud of 3D Points," *Graphical Models and Image Processing,* vol. 57, No. 1, Jan. 1995, pp. 67–74.

A.B. Dobrzeniecks, N.D. Levitt, "Interactive and Intuitive Segmentation of Volumetric Data: The Segmentview System and the Kooshball Algorithm," *Instittute of Electrical and Electronics Engineers. Proceedings of the International Conference on Image Processing (ICIP),* vol. 3, Oct. 23–26, 1995, Washington, pp. 540–543.

J.H. Park, T.G. Chang & J.S. Choi, "Three–Dimensional Object Representation and Recognition Based on Surface Normal Images," *Pattern Recognition,* vol. 26, No. 6, Jun. 1993, pp. 913–921.

P.F. Hemler, G.L. Bilbro & W.E. Snyder, "Active Model Matching in Range Images," *IEEE International Conference on Robotics and Automation,* Raleigh, NC, vol. 1, Mar. 31–Apr. 3, 1987, vol. 1, pp. 228–233.

N.S. Raja & A.K. Jain, "Obtaining Generic Parts from Range Images Using a Multi–View Representation," *Image Understanding,* vol. 60, No. 1, Jul. 1994, pp. 44–64.

S. Tamua, E.–K. Kim, R. Close & Y. Sato, "Error Correction in Laser Scanner Three–Dimensional Measurement by Two–Axis Model and Coarse–Fine Parameter Search," *Pattern Recognition,* vol. 27, No. 3, Mar. 1994, pp. 331–338.

T. Kanade, A. Gruss & L.R. Carley, "A Very Fast VLSI Rangefinger," *Proceedings of the 1991 IEEE International Conference on Robotics and Automation,* Sacramento, California, Apr. 1991, pp. 1322–1329.

J.D. Spinhirne, "Micro Pulse Lidar," *IEEE Transactions of Geoscience and Remote Sensing,* vol. 31, No. 1, Jan. 1993, pp. 48–55.

S.G. Nadabar & A.K. Jain, "Fusion of Range and Intensity Images on a Connection Machine (CM–2)," *Pattern Recognition,* vol. 28, No. 1, Jan. 1995, pp. 11–26.

K. Nakazawa & C. Suzuki, "Development of 3–D Robot Vision Sensor with Fiber Grating," *IECON'91 1991 International Conference on Industrial Electronics, Control and Instrumentation,* vol. 3, Oct. 28–Nov. 1, 1991, Kobe Japan, pp. 2368–2372.

P. Vähä, K. Känsälä, I Kaisto & R. Heikkilä, "Application of 3–D CAD and 3–D Coordinate Meter in Frame Erection", *Automation and Robotics in Construction X, Elsevier Science Publishers B.V.,* 1993, pp. 487–494.

"Take a Photo, Create a Model", *Computer Graphic World,* May 1994,. pp. 58–59.

I. Kaisto, J. Kostamovaara, "Laser Rangefinding Techniques in the Sensing of 3–D Objects" *SPIE,* vol. 1260, Sensing and Reconstruction of Three–Dimensional Objects and Scenes, 1990, pp. 122–133.

B. Turko, "A Picosecond Resolution Time Digitizer for Laser Ranging", *IEEE Transactions on Nuclear Sciences,* vol. NS–25, No. 1, Feb. 1978, pp. 75–80.

K.W. Wong, A.G. Wiley, & M. Lew, "GPS–Guided Vision Systems for Real–Time Surveying", *Journal of Surveying Engineering,* vol. 115, No. 2, May 1989, pp. 243–251.

Brochure, Photo Modeler, EOS System, 1995, 2 pages in length.

Brochure, Kreon, 1995, 7 pages in length.

Brochure, Spatial Positioning Systems, Inc. (SPI), 1996, 4 pages in length.

Brochure, Bechtel Corp., 1993, 4 pages in length.

Brochure, Micro Scan 3D, CyberOptics Corp., 1995, 1 page in length.

Advertisement, "MDL's Quarryman ALS", ACSM Bulletin, Jul./Aug. 1996, p. 36.

Brochure, "On–line 3–D Measuring Systms," Mapvision II, date unknown, 4 pages in length.

Brochure, "TV Auto–Scanning Laser System (TV–ALS)," MDL Technologies, Inc., date unknown, 4 pages in length.

Brochure, "Surveyor ALS (Auto Scanning Laser System)," MDL Technologies, Inc., date unknown, 3 pages in length.

M. Scherer, "Uni–Scan: A System for Automatic Architectural Surveying," date unknown, pp. 285–284c.

Brochure, "Cyberware Color 3D Digitizer," date unknown, 7 pages in length.

Brochure, "3D Laser Digitizing Systems," Laser Design, Inc., date unknown, 5 pages in length.

Brochure, "Acccess problems? Prism Problems? Gota do it fast?", Cubic Precision, date unknown, 5 pages in length.

INTEGRATED SYSTEM FOR QUICKLY AND ACCURATELY IMAGING AND MODELING THREE DIMENSIONAL OBJECTS

TECHNICAL FIELD

The present invention relates generally to systems that document the geometry and other attributes of objects in three dimensions and, specifically, to a system that employs a scanning lidar (range finding laser) to quickly and accurately sense the position in three-dimensional space of selected points on the surface of an object to generate a point cloud which represents the sensed positions of the selected points; that recognizes geometric shapes represented by groups of points in the point cloud, and that generates a model that represents these geometric shapes. The model may be transformed into a further model usable by computer-aided design (CAD) tools, including conventional CAD tools.

BACKGROUND

Mapping the geometry (shape, dimensions and location) and other attributes (e.g., color, texture and reflectance intensity) of complex real objects (whether small components such as small mechanical parts or large objects such as buildings and sites) has conventionally been a tedious and time consuming process. That is, such measurement have traditionally been performed manually. In addition, transforming these measurements into drawings or computer models required manual drafting or input into a CAD system for the production of the drawing or computer models.

Recently innovations have endeavored to simplify this process, but all have fallen short of achieving full integration, automation, precision, speed and range. For example, in the building industry, mapping a structure conventionally requires three basic steps:

1. Field data gathering
2. Data reduction and preparation
3. Drafting and CAD

The field data gathering step is performed by a team of surveyors who manually measure and record dimensions of pertinent components of the structure such as walls, ceilings, beams, columns, doors, windows, fixtures, pipes, conduits and equipment. The surveyors attempt to determine the geometry of the components as well as the relative location of the components in the structure. The surveyors recorded the data in a field notebook. The field-collected data is then organized and reduced to tables and organized sketches, and a CAD operator or drafter utilizes these tables to generate final drawings or models.

This process is labor intensive, time consuming, and error prone. In addition, using traditional surveying methods, the number of points which can actually be measured is very limited, due to the high cost of acquiring each point in terms of time and effort. Furthermore, if it is desired to acquire color, texture and other attribute information, additional field notes must be taken (e.g., still photographs and video).

Recently, the field step has been somewhat automated by using a laser ranging device built into or mounted on an electronic theodolite. Precision reflection targets (retro reflectors) are placed at the locations of the object for which measurements are desired. Then, the laser ranging device obtains a precise measurement of the distance between the instrument and the target, which the theodolite provides an accurate indication of the horizontal and vertical angle offsets to the point relative to a given coordinate system. The distance and angle data are either recorded automatically on a magnetic device connected to the instrument or are reduced within the instrument to Cartesian coordinates relative to the instrument axes. This procedure is then repeated as many times as necessary to map a desired number of points of the object. The collected coordinates data can then be plotted directly on a CAD system.

Unfortunately, the plot is of little practical use since it does not indicate the object geometry. Moreover, because of the requirement for retro reflectors which must be manually placed, and because of the relatively long time per reading required by the laser range finder, the gathering of sufficient points to describe most objects is very labor intensive, time consuming and error prone.

Another known field gathering data process employs stereo photography and aerial photogrammetry. That is, stereoscopic images are taken of the objects and the resulting stereo photographs are registered either manually or using computerized techniques to reproduce the relative location of the camera picture plane location at the time each photograph was taken. The data reduction and preparation step is performed manually by a specially trained operator. Specifically, with the aid of specially mounted stereoscopic viewing lenses, the operator digitizes the coordinates of a sufficient number of points to allow the definition of the objects using the stereo photographs. Again, the digitized data is input into a CAD system or is manually drawn on paper.

SUMMARY

The present invention is an integrated system for generating a model of a three-dimensional object. A scanning laser device scans the three-dimensional object and generates a point cloud. The points of the point cloud each indicate a location of a corresponding point on a surface of the object. A first model is generated, responsive to the point cloud, representing constituent geometric shapes of the object. A data file is generated, responsive to the first model, that can be inputted to a computer-aided design system.

DETAILED DESCRIPTION

A. Overview

1. Overall System

Figure 1:
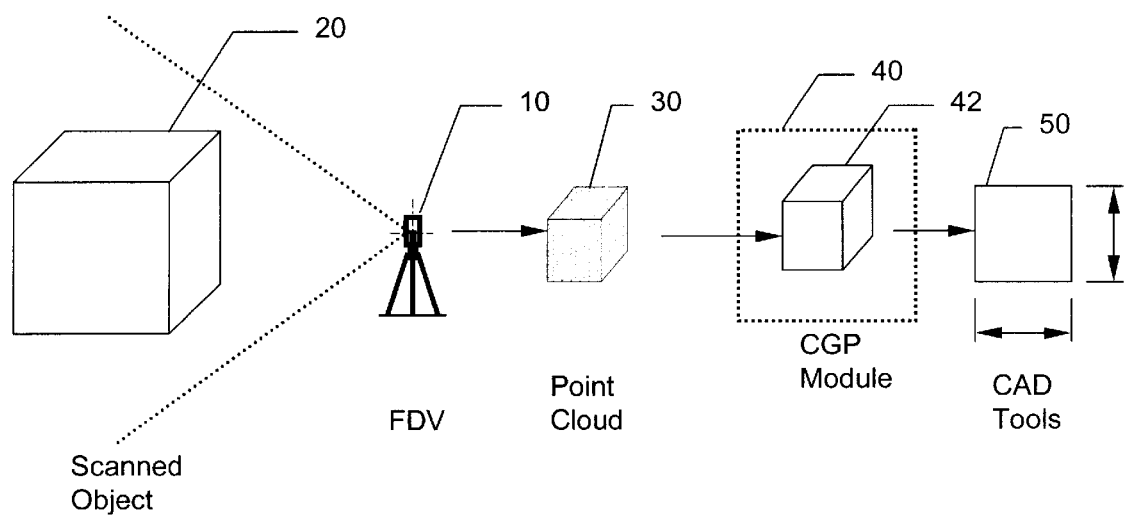
FIG. 1 is a block diagram of a system in accordance with an embodiment of the invention.

FIG. 1 is a block diagram that illustrates the invention in its broadest aspect. Referring to FIG. 1, a Field Digital Vision (FDV) module 10 includes a scanning sensor for scanning an object 20 and for sensing the position in three-dimensional space of selected points on the surface of the object 20. The FDV module 10 generates a point cloud 30 which represents the sensed positions of the selected points. The point cloud 30 also represents other attributes of the sensed positions, such as reflectivity, surface color and texture.

A Computer Graphics Perception (CGP) module 40 interacts with the FDV to provide control and targeting functions for the FDV module 10 sensor. In addition, using the point cloud, the CGP module 40 recognizes geometric shapes represented by groups of points in the point cloud 30, and the CGP module generates a CGP model 42 that represents these geometric shapes. From the CGP model 42, the CGP module 40 generates a further model usable by computer-aided design (CAD) tools 50. The CAD tools may be conventional.

Figure 1A:
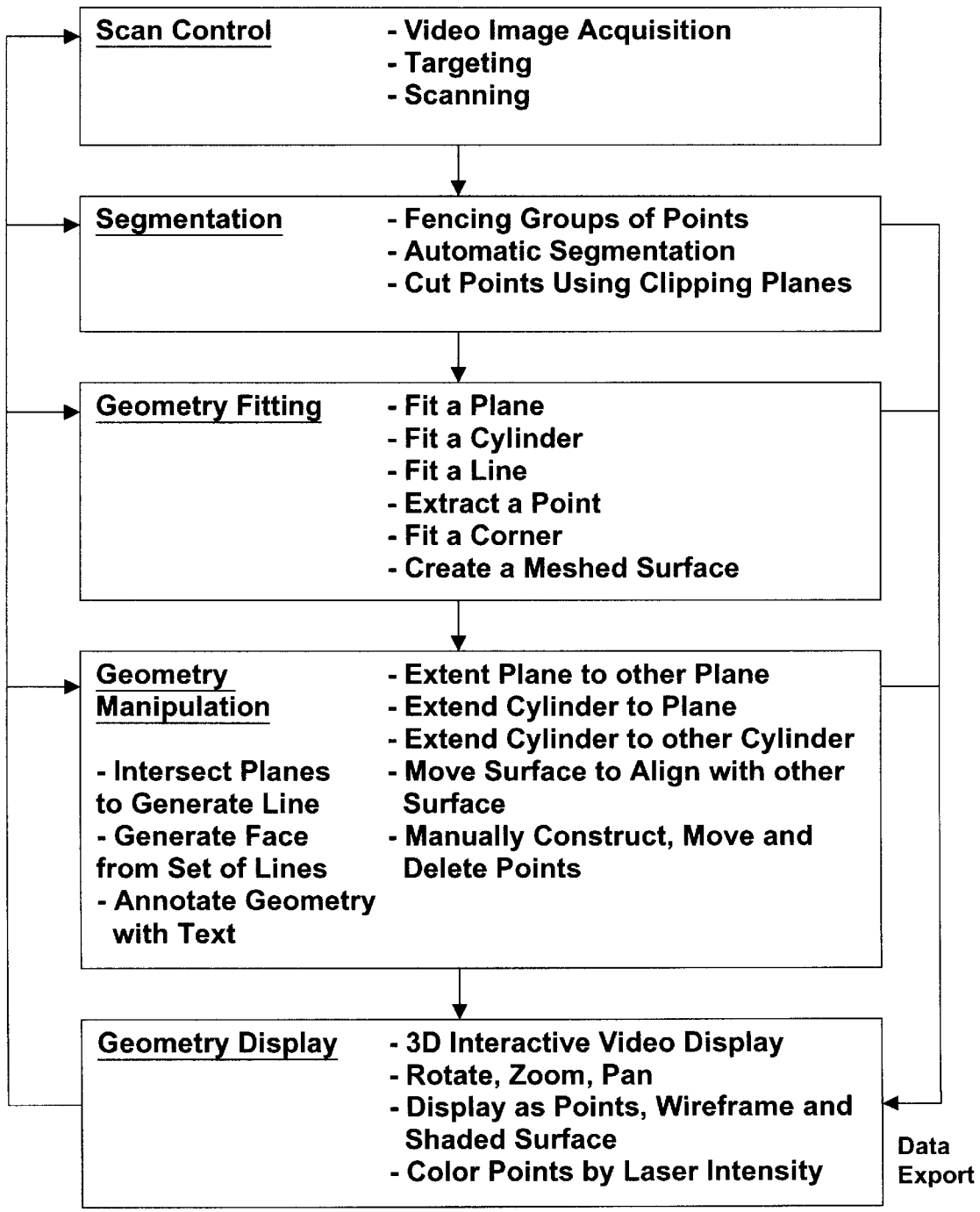
FIG. 1A shows the overall flow of how one may use an embodiment of the invention to scan an object, organize acquired points, fit geometric shapes to the organized point, manipulate the fitted geometric shapes, and display the resulting manipulated geometric shapes.

FIG. 1A shows the overall flow of how one may use an embodiment of the invention to scan an object, organize acquired points, fit geometric shapes to the organized point, manipulate the fitted geometric shapes, and display the resulting manipulated geometric shapes.

2. FDV Module Overview

Figure 2:
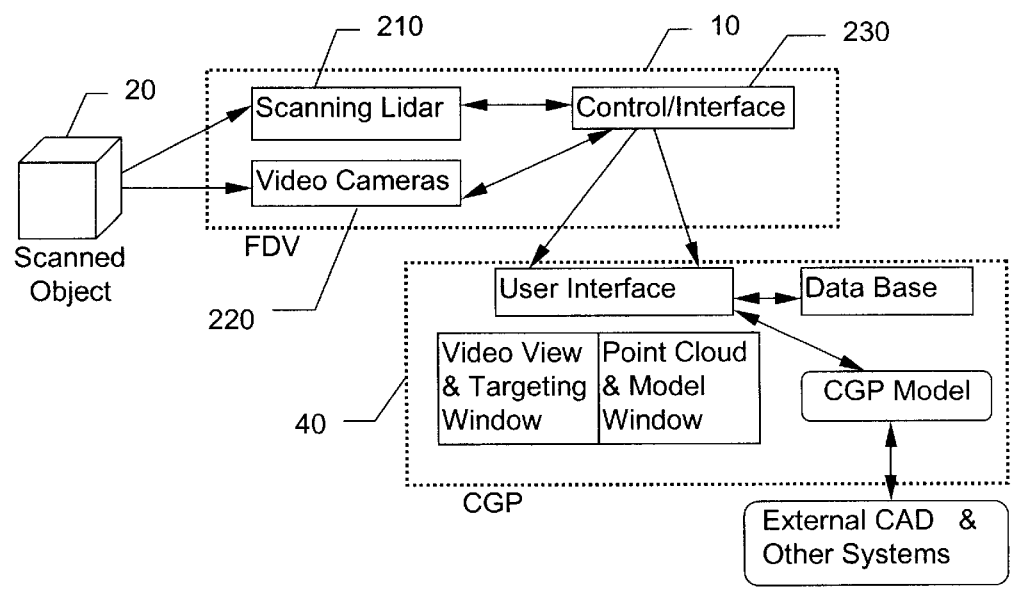
FIG. 2 is a more detailed block diagram of the system of FIG. 1.

Referring to FIG. 2, the FDV 10 includes a scanning laser system (lidar) 210 that scans points of the object 20 and that generates a lidar data signal that precisely represents the position in three-dimensional space of each scanned point. The lidar data signal for groups of scanned points collectively constitute the point cloud 30. In addition, a video system 220, preferably including both wide angle and narrow angle CCD cameras, is provided. The wide angle CCD camera of the video system 220 acquires a video image of the object 20 and provides, to the CGP 40 via a control/interface module 230 of the FDV 10, a signal that represents the acquired video image.

In response to user input relative to the signal that represents the acquired video image, the CGP 40 provides a scanning control signal to the lidar 210, via the control/interface module 230, for controlling which points on the surface of the object 20 the lidar 210 scans. More particularly, the scanning control signal provided from the CGP 40 controls an accurate and repeatable beam steering mechanism to steer a laser beam of the lidar 210.

In addition, the narrow angle CCD camera of the video system 220 captures the intensity of the laser return from each laser impingement point, along with texture and color information, and provides this captured information to the CGP 40.

3. CGP Module Overview

Referring still to FIG. 2, the CGP 40 is constituted of a data processing system (e.g., a notebook computer or a graphics workstation) and special purpose software that when executed configures the CGP 40 data processing system to perform the FDV 10 control and targeting functions, and also to perform the CGP model generation functions.

i. FDV Control

The CGP 40 controls the scanning lidar 210 of the FDV 10 by providing a lidar control signal to the FDV 10 that controls which points of the object 20 the FDV 10 scans. User input is provided to the CGP which defines what portions of the object 20 to scan, and at what resolution.

ii. Model Generation

Each data point in the point cloud 30 generated by the FDV represents both distance to a corresponding laser impingement point from an FDV 10 "origin point" and the angle from the origin point to the laser impingement point. The CGP software configures the CGP 40 computer to process the data points of the point cloud 30, generated by the lidar 210 as a result of scanning the object 20, to display and visualize the scanned portions of the object 20. More specifically, the CGP software configures the CGP 40 computer to recognize geometric shapes in the object 20 ("graphic perception") and, using these recognized geometric shapes, to perform geometry construction, 3D model construction, 3D visualization, and database functions for automated acquisition or manual input of object attributes, generation of plans, sections, and dimensions, data query, and CAD interfaces, and networking options.

B. Details

1. FDV Module Detail

Figure 5:
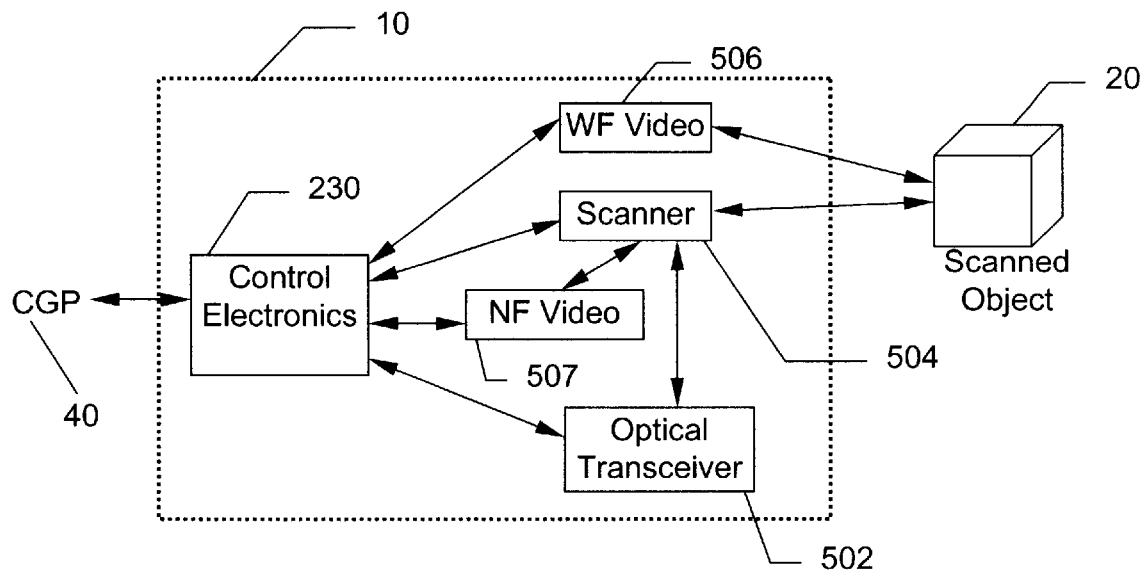
FIG. 5 is a block diagram of one embodiment of an FDV in accordance with the invention.

FIG. 5 is a block diagram of one embodiment of an FDV 10 in accordance with the invention. A lidar transceiver 502 includes a laser, transmit optics, receive optics and detector for generating ranging and intensity data. A scanning system 504 includes dual orthogonal scanning mirrors, galvo motors, and encoders for steering the laser beam and determining the azimuth and altitude angles of the laser beam from the positions of the mirrors. A wide angle video system 506 generates targeting video information and a narrow angle video system 507 generates color and texture information. Control/interface circuitry handles the exchange of data between the FDV 10 and the CGP 40.

The laser is preferably of the type disclosed in U.S. Pat. Nos. 5,132,977; 5,386,427; and 5,381,431, assigned to Massachusetts Institute of Technology. In particular, the beam generated by such a laser has special properties such as being capable of producing pulse widths less than 1 nsec.

A particular embodiment of the laser which has been used is particularly suitable for precision lidar since:

1. The short pulsewidth provides high accuracy, since radar theory shows that the accuracy is proportional to the inverse of the pulse time.

2. The laser itself is physically quite small, especially useful for portable applications.

3. It has a diffraction limited beam, which implies that the spot size at a distance is not limited by the properties of the light, but only by the quality of the optics used to collimate or focus it.

4. Since the wavelength is quite short (532 nm), and Rayleigh range is inversely proportional to wavelength, the beam can be kept small over a large distance interval. In fact with a 1 cm exit aperture, the beam will remain less than 6 mm over 50 m.

The laser beam is directed by the orthogonal scanner mirrors to a laser impingement point on the surface of the object 20. The range can be determined by any of a number of conventional lidar techniques. For example, the "time of flight" of a laser pulse to travel from the laser, and then back to the detector, is determined. The range is determined based on the constant speed of light, with appropriate adjustments being made for atmospheric factors.

A system in accordance with the present invention can provide high ranging accuracy at high acquisition rates. For example, at 100 m ranges, a 1 mm accuracy can be achieved on a single shot basis, with anywhere from 1000 to 5000 data points being acquired per second.

Figure 3:
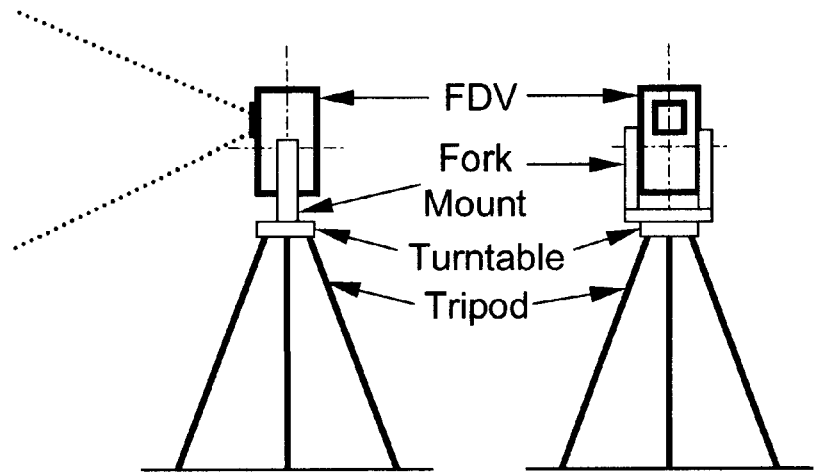
FIGS. 3 and 3A show the physical arrangement of the FDV of the FIG. 1 system, and also shows how the FDV is coupled to the tripod by a fork mount.
Figure 3A:
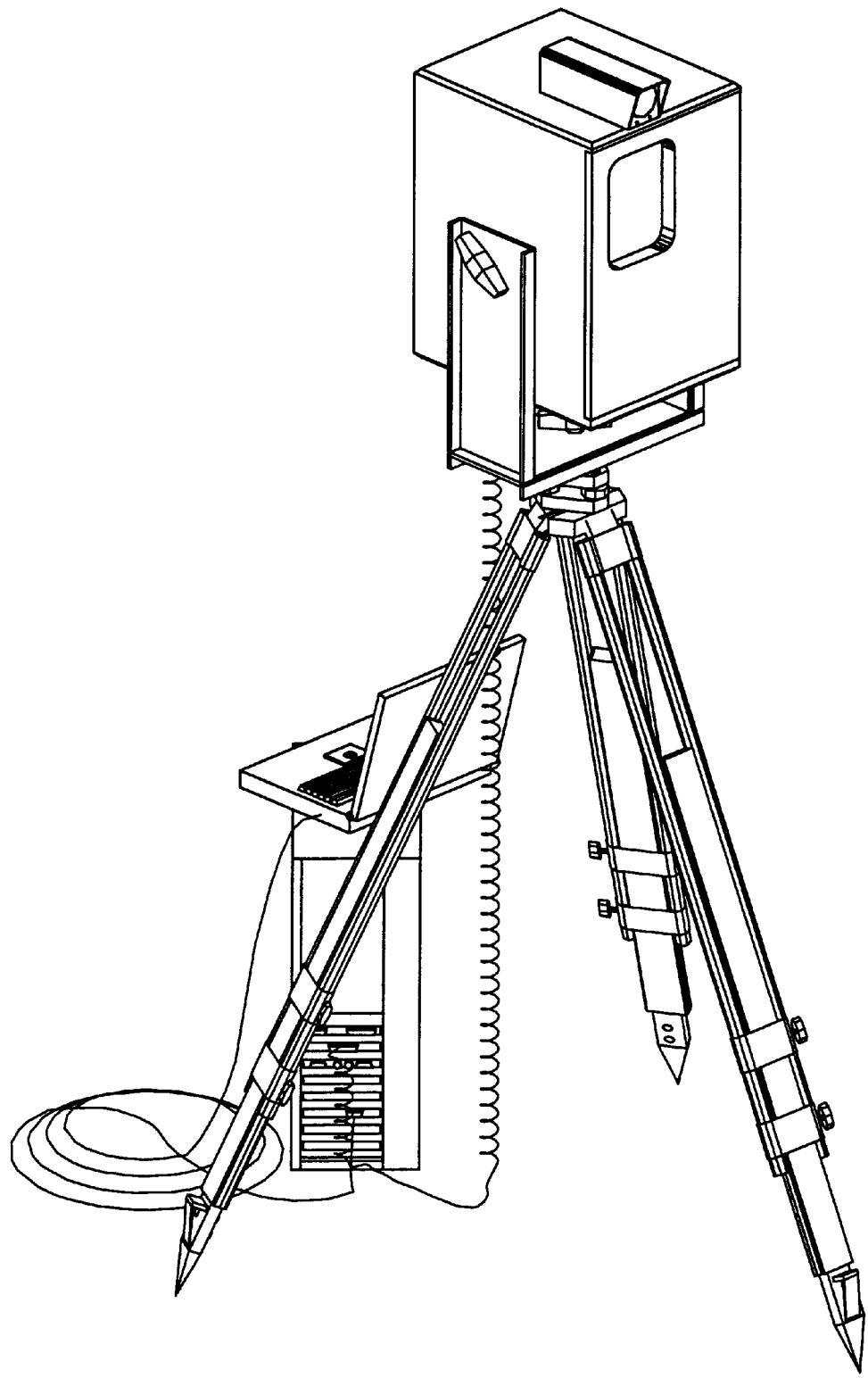

Referring to FIGS. 3 and 3A, in one embodiment, the FDV 10 is physically housed in a box made of metal or other suitable housing material. The box is suspended from its side panels by a fork mount mechanism. The fork mount system is supported on a turntable, and the turntable is mountable on a tripod. Using the fork mechanism, the FDV 10 can be rotated horizontally ("azimuth rotation") and vertically ("elevation tilt", or "altitude"). Generally, a position of the tripod is referred to as a "setting" or "positioning"; the rotation and tilt of the FDV 10 in the fork mount is referred to as "pointing" or "orientation". A "view" is generally associated with a given setting and orientation.

The fork mount system preferably includes high accuracy azimuth and altitude rotation measuring devices (e.g., conventional theodolite-type optical or electronic encoders) to provide precise rotation and tilt data of the FDV 10. This feature can allow the automatic integration of scans taken from the same tripod setting, but with a different orientation of the FDV. In the event these devices are not used, and for scans taken from different settings and orientations, these scans can be integrated using techniques described later in this disclosure.

Figure 4:
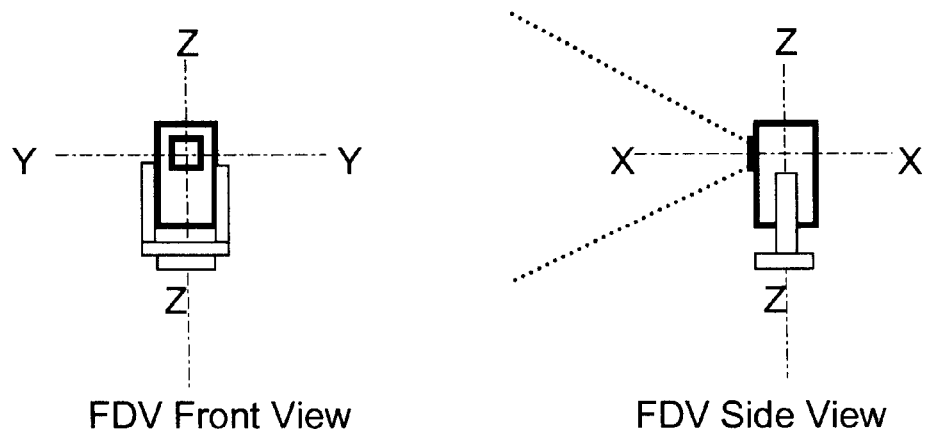
FIG. 4 shows an example coordinate system relative to the FDV of the FIG. 1 system.

It should be noted at this point that, while conventional surveying instruments should be levelled prior to operation in order to operate properly, this is not a requirement of the FDV 10. This is due to the novel methods of this invention as embodied in its since the own internal coordinate system and the procedures utilized in its software that take advantage of its method of acquiring position data. The system, however, does have the ability to be leveled and to be used in a manner similar to a traditional theodolite. The cartesian coordinates of the FDV in the example embodiment are shown in FIG. 4.

Referring still to FIGS. 3 and 3A two orthogonal mirrors of the FDV 10 provide a field of view of approximately 40° by 40° ("Field of View", or "View" is defined as the maximum size of the area projected by the laser maximum deflections of the beam in degrees). The field of view can be increased or decreased by resizing the mirrors and certain parts of the optical train. The fork mount described above is utilized to allow pointing of the FDV's 40°×40° field of view anywhere over a projected sphere thus affording a wide range of flexibility in imaging large objects or groups of objects from the same setting. Other mounting methods may be used to accomplish the same purpose.

High accuracy and repeatability electronic encoders read the rotational angles of the orthogonal mirrors, and the readings of the mirror rotation angles are precisely timed to coincide with the range reading. Preferably, the system is Class II FDA eye safe. A first embodiment has ±6 mm spacial accuracy over a range of ±50 m. In another embodiment, autofocus capability and 5–6 picosecond electronics are included, which extends the system's range accuracy to ±1 mm and ±1 mm spacial accuracy over ±50 m. The range (and accuracy) of the system can be significantly influenced by the choice of eye safety classification selected, but these limitations are not inherent limitations of the invention itself.

Figure 6:
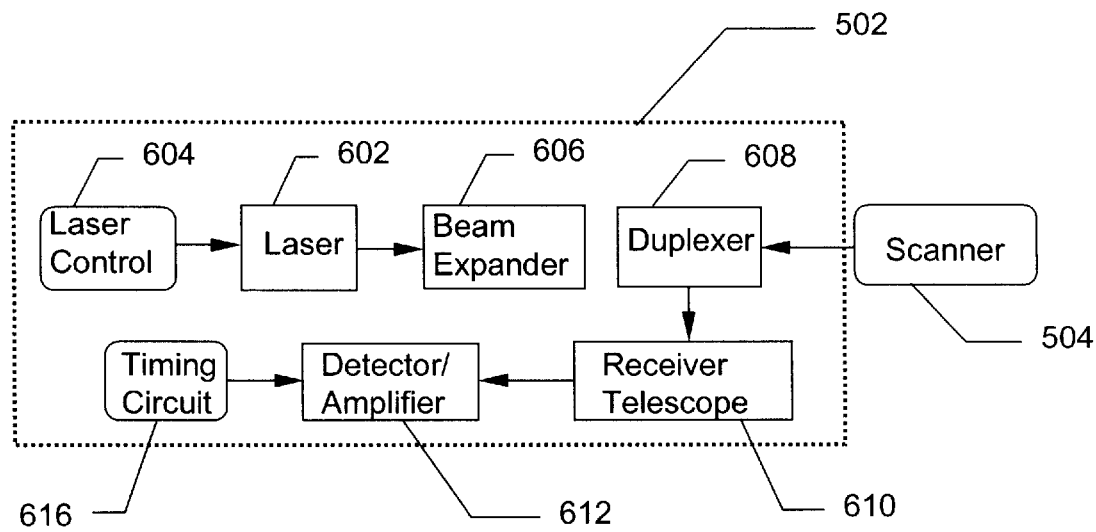
FIG. 6 is a block diagram of the optical transceiver of the FIG. 5 FDV.

The following is a description of the key components of the FDV. A block diagram of the optical transceiver 502 of the FDV 10 is shown in FIG. 6. The optical transceiver 502 that transmits an optical pulse to a spot on target, and receiving a reflected optical pulse for the target. Given the constant speed of light, the optical transceiver calibrates the distance to the spot on the target.

Referring to FIG. 6, the laser fires an optical pulse which lasts less than 250 psec in response to an external command provided from a laser controller 604. The laser 602 produces a pulse, preferably at a wavelength of 532 nm, within 100–300 $\mu$secs after an external signal emanating from a digital signal processor which provides central control of real time events. The time delay is a complicated function of recent laser history and environmental conditions. This function is not completely known at present. However, a software algorithm, which is described elsewhere, is employed to estimate the time delay with adequate accuracy for the required measurements.

The laser beam output of the laser 602 is transmitted through a beam expander 606 that is focused to adjust the size of a light spot that will eventually impinge upon a point on the object 20. The focussed optical pulse is then transmitted through a duplexer 608, which is an optical system for aligning the outgoing optical path with the incoming optical path. The duplexer 608 directs a significant first portion of the light energy of the outgoing optical pulse to spot on the object 20 via a scanner 614, but a second, much smaller portion, of the light energy of the outgoing optical pulse is directed to a receiver telescope 610. The portion of the outgoing optical pulse that propagates to the object 20 impinges on the spot on the object 20, and some of the energy of the optical pulse is reflected off the object 20 in a direction back to the duplexer 608. The returning optical pulse is directed by the duplexer 608 to a receiver telescope 610, which focuses the received energy onto a detector 612. The detector 612 converts the received optical pulse energy into electrical energy, and the output of the detector 612 is a series of electrical pulses, the first (which is generated by the detector 612 in response to the second, small portion, of the transmitted pulse not directed toward the object 20) occurs at a short fixed (i.e., fixed by the length of the optical path through the beam expander 606, the duplexer 608 and the receiver telescope 610) and the second of which occurs as light energy returns from the object 20. Both the second, small portion of the transmitted pulse not directed toward the object, and the return optical pulse reflected from the spot on the object, are provided to the timing circuit 616 which calculates the time of flight to the spot on the object. The range to the spot on the object can then be readily calculated from the calculated time of flight.

Figure 7:
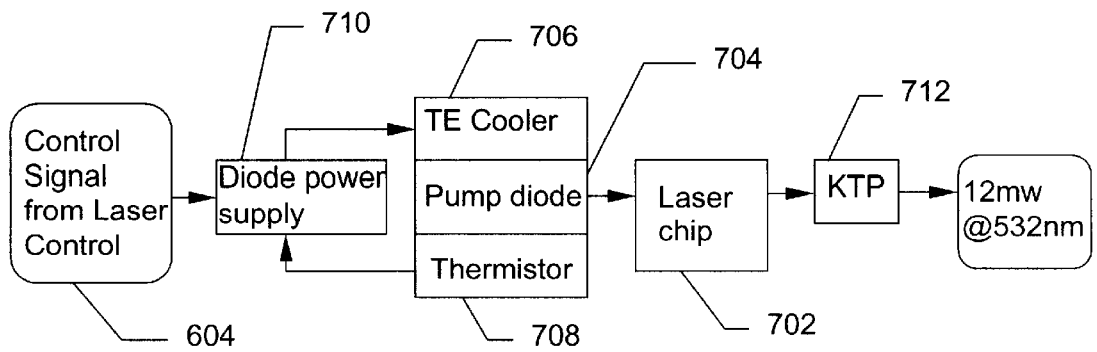
FIG. 7 is a block diagram which shows an embodiment of the laser.

FIG. 7 is a block diagram which shows an embodiment of the laser 602. The heart of the laser system 602 is a conventional laser chip 702 that include two bonded crystals coated with antireflective dielectric coatings on their faces. The laser chip 602 is pumped with a solid state diode 704 operating at 808.5 nm ±3 nm. The output frequency of the diode pump 704 is adjusted by changing its temperature with a thermoelectric cooler 706. The temperature of the pump diode 704 is measured with a thermistor 708, and the measured temperature is fed back into the diode power supply 710. The required temperature varies with each individual diode, but it typically ranges from 20° to 30° C.

The output power of the pump diode is typically 1 watt, launched into a 100 µm core glass fiber. When continuously pumped, the output of the crystal laser is approximately 35 mw average power at 1.064 µm, which corresponds to 1 µJ pulses lasting about 280 psec at a repetition rate of 10 KHz. The multimode fiber is preferably terminated by an SMA905 solid brass connector, with the crystal of the laser chip 702 is glued to one end of the connector with an optical resin. Thus ensures adequate thermal dissipation from the crystal of the laser chip 702, keeping the crystal 702 within the temperature range required for most efficient operation.

A piece of KTP frequency doubling crystal 712 is held within a few millimeters of the face of the laser chip crystal 702. This provides an ultimate output from the laser 602 having a 12 mw average power at 532 nm, which corresponds to 0.8 mJ pulses lasting approximately 218 psec. This ultimate output from the laser 602 is nearly diffraction limited (i.e., one which has theoretically minimum divergence, given a specific wavelength and waist diameter), with an apparent waist diameter of 56 m.

Embodiments of the invention meet FDA Class II eye safe system design specifications are potentially more commercially viable. In order to meet this specification, the maximum energy per pulse that can be transmitted at 532 nm is 0.2 µJ. With this restriction, the average power transmitted is largely dependent on the pulse repetition rate, and is given by the following table

| CLASS | ENERGY PER PULSE | AVERAGE POWER | REPETITION RATE |
| --- | --- | --- | --- |
| I | .2 µJ | .39 µW | 1.95 Hz |
| IIA | .2 µJ | 3.9 µW | 19.5 Hz |
| II | .2 µJ | 1.0 mW | 5 kHz |
| IIIA | .2 µJ | 5.0 mW | 25 kHz |

In one embodiment of the invention, the beam expander 606 is entirely conventional (e.g., Melles Griot model number 09LBM013, 10× beam expander). The transceiver has cross axis accuracy which is proportional to the size of the laser beam impinging on the intended target. The base design of 6mm accuracy has a simple beam expander. The laser can be collimated with a fixed 10× beam expander which has an aperture of <1 cm to produce a beam whose $1/e^{2*power}$ beam width is less than 6 mm over a range of 50 m.

Figure 7A:
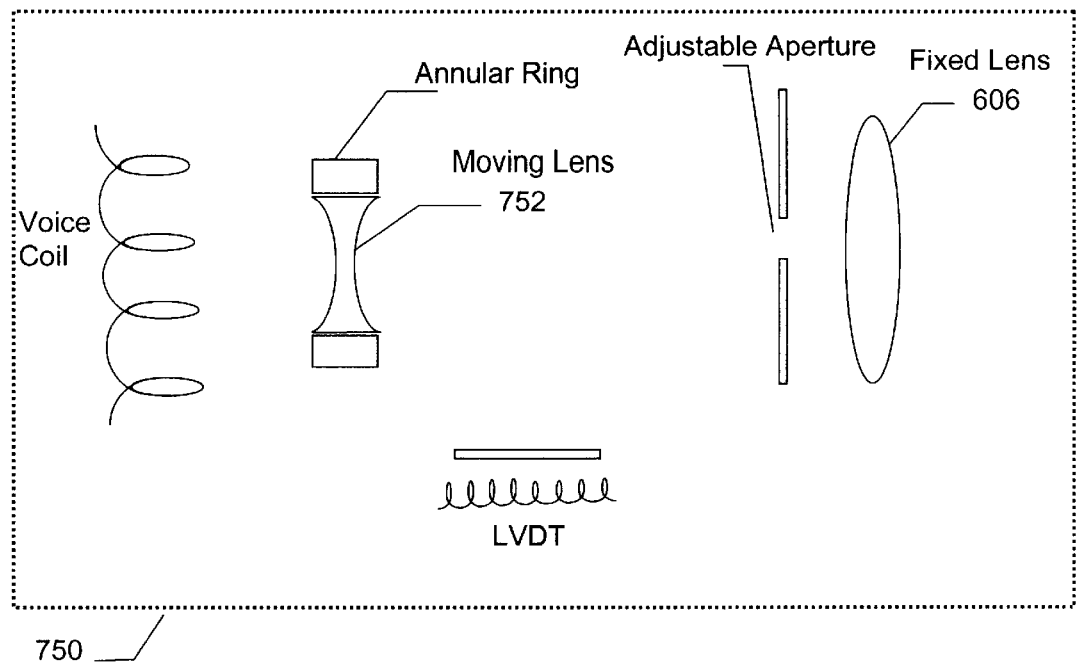
FIG. 7A is a block diagram of the beam expander shown in FIG. 6.

FIG. 7A shows a further embodiment 750 of the beam expander 606 that includes features which allow the system of the invention to measure ranges at an accuracy of approximately 1 mm at 50 m. This is because the impingement spot on the object 20 of the laser beam expanded by a conventional beam expander is collimated, and produces a spot of no more than 6 mm over a 50 m range. However, a beam can be focused through a 50 mm aperture to a spot of size no more than 1 mm over a 50 m range—but the spot will be much larger at other ranges. Thus the beam expander 606 of a system having 1 mm accuracy at 50 m includes a movable optical element 752 which can change the size of the focused spot. Additionally, the beam expander 606 includes an adjustable aperture, and means for controlling the adjustment, so that the distance, from the laser, over which the beam stays at 1 mm in diameter remains approximately constant. $\lambda \omega$ The minimum diameter spot produced with a diffraction limited lens of focal length f and diameter D is $d_0 = 2f\lambda/D$. The Rayleigh range of the focused spot, which is the depth of focus of the beam, is given by $b = 2\pi \overline{\omega}_0^2/\lambda = 2\pi f^2 \lambda / D^2$. Thus, if f/D is held constant, the depth of focus will not be a function of the range of the focused spot, f.

As the beam focus is changed, the elements should stay sufficiently aligned so as to prevent the beam from changing direction by more than a fraction of 1 mm at 50 m, or this will appear as an error in the placement of the point in space. In order to minimize this beam wander, a linear servo motor (see FIG. 7) is employed for controlling the position of the focusing mechanism, and a transducer provides position feedback. The lens is mounted in an annular ring, which prevents it from rotating or misaligning while it is being translated.

Duplexer

Figure 8:
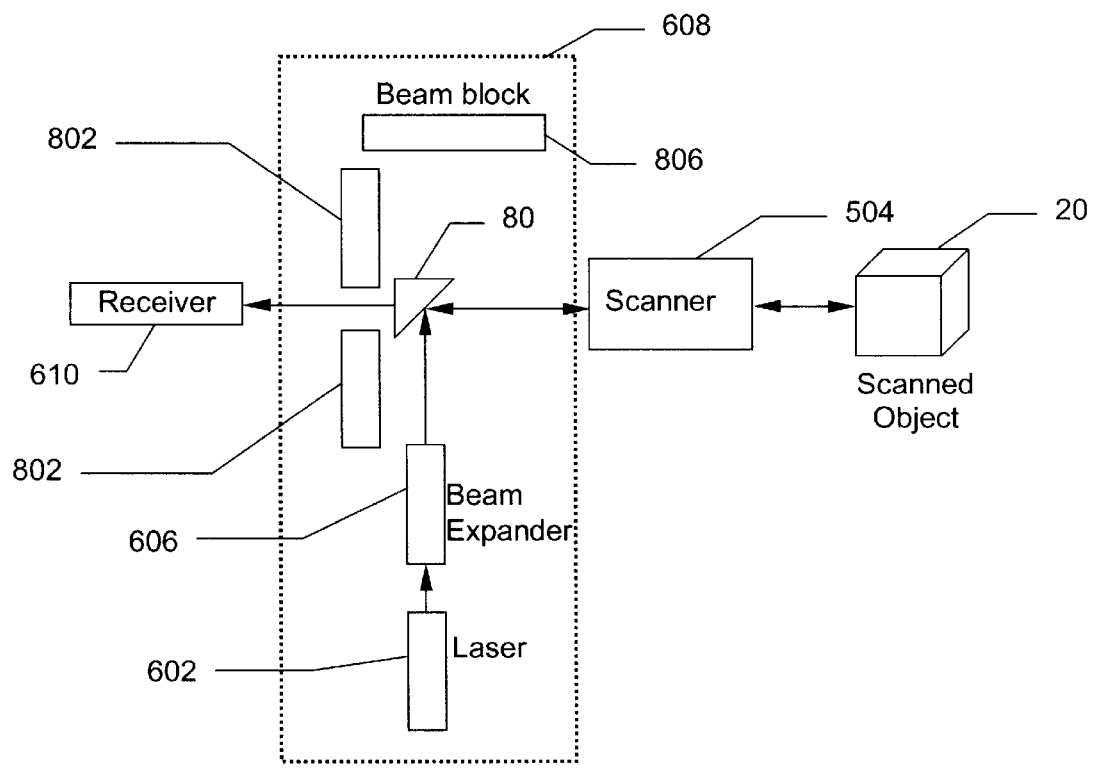
FIG. 8 an embodiment of the duplexer.

An embodiment of the duplexer 608 is shown in FIG. 8. The optical system of the duplexer 608 is configured such that the outgoing beam from the beam expander 606 to the scanner 614 is coaxial with the return beam reflected from the object 20. Thus, only one scanner 614 need be provided. In the embodiment of the duplexer shown in FIG. 8, a window 802 is provided, with a 50% beamsplitter 804 attached over the window 802. When an optical pulse is transmitted from the laser 602 and through the beam expander 606, the pulse impinges upon the beam splitter 804. Most of the light energy of the pulse is reflected off the beam splitter 804 and is passed to the scanner 614, but some of the optical pulse proceeds through the beam splitter 804 and impinges upon a low reflectance beam block 806. Due to the low (but non-zero) reflectance of the beam block 806, a small fraction of the optical pulse hitting the beam block returns to the beam splitter 804 and is reflected into the receiver 610.

Moreover, as an optical pulse returns from the object 20, since the central portion of the return pulse is obscured by the prism, at most only a fraction of the light impinging on it makes its way to the receiver.

Partially reflecting duplexer

Figure 8A:
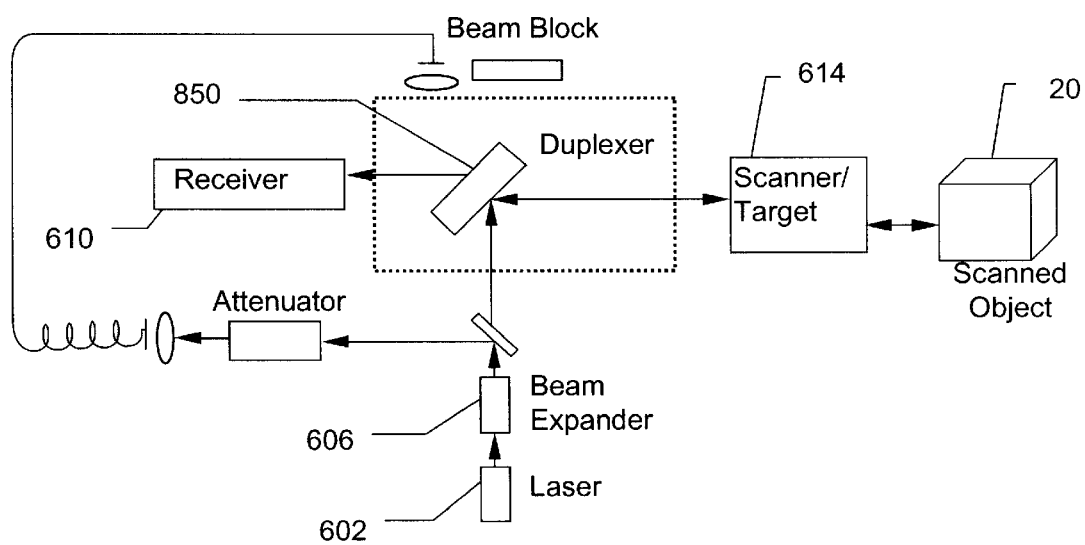
FIG. 8A shows a partially-reflecting duplexer.

Referring now to FIG. 8A, for the 1 mm accuracy option, a partially-reflecting duplexer 850 is employed. With this duplexer, a fraction of the light pulse provided from the beam expander proceeds through the window to the receiver telescope 610, and can be used for other purposes such as for calibration. The remainder of the light pulse proceeds to the object 20. Most of the return light pulse from the object 20 continues on through the window and is collected by the receiver telescope 610. The window is AR coated on the receiver side, and partially mirrored on the laser side. The entire window is used to steer the outgoing beam, since a 50 mm aperture is required to focus the spot to 1 mm at 50 m. The partial reflectance is chosen in view of the laser transmission power and the applicable eye-safe classification level. For example, if the laser transmission power is four times the allowable level of the applicable eye-safe level, then the partial mirroring is chosen to reflect 25% and absorb 75%.

Figure 9:
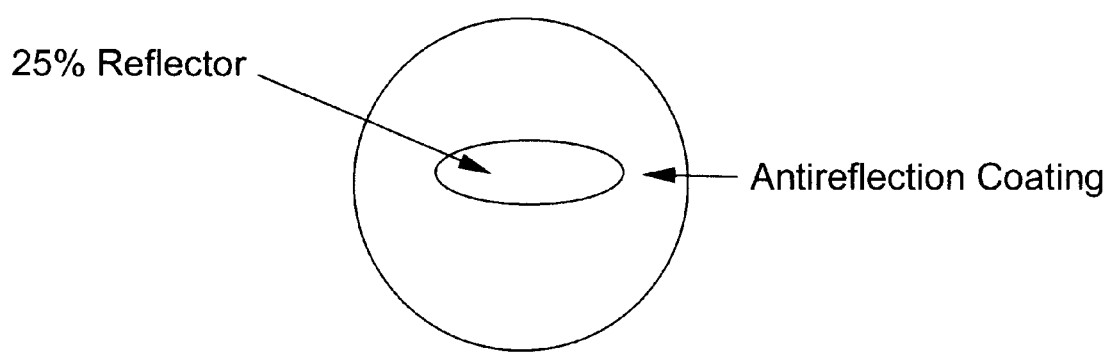
FIG. 9 shows an embodiment of the window of the FIG. 8 duplexer.

Referring now to FIG. 9, in the 6 mm version, improved efficiency can be achieved in collecting the return optical pulse if only the center of the window is coated to reflect the outgoing pulse, and the remainder of the window is anti-reflective coated. In this way, the return optical pulse is not reflected out of the receiver by the part of the window that is antireflection coated.

Preferably, the laser 602 emits a strongly polarized beam so that the reflective coating can be optimized to have slightly different reflection coefficients for the two planar polarizations (20%-S and 30%-P). In such an embodiment, the power of the beam impinged onto the object 20 can be fine tuned merely by physically rotating the laser body.

Receiver Telescope

Referring again to FIG. 6, after the returning pulse has passed through the duplexer 608, it is collected by the receiver telescope 610, which optimizes the amount of signal provided to the detector. The receiver telescope 610 may be a simple 50 mm aperture lens. The lens is preferably selected so that the variation in pulse energy entering the detector does not change as a function of the distance to the target over the range of distances for which the instrument is designed. A multiple element lens can be designed to minimize the variation in received pulse energy as a function of range somewhat more effectively than a single element lens. That is, at the greatest expected distance, the focal length of the lens is such that all the incoming light, which is effectively collimated since it is generated by a point source in the far field, is focused to completely fill the detector. As the target becomes closer to the telescope, the spot of return light becomes larger than the detector. The power incident on the detector 612 increases as the square of the distance from the telescope to the target, up to the maximum expected distance. Moreover, the power returning from the target decreases as the square of the distance from the telescope to the target. Thus, in practice, these two effects approximately cancel each other. This minimizes the variation in optical power incident on the detector over the range of anticipated use. In the 1 mm option, the receiver optics can be improved in some cases by using a two element, adjustable focus, newtonian telescope (e.g., similar to the 1 mm beam expander).

Detector

The detector 612 converts optical pulses to electrical pulses which can be processed by the elapsed time measurement electronics (timing circuit 616). In one embodiment, the detector 612 is an avalanche photodiode (APD) with greater than 1 GHz electrical bandwidth. In addition to the time between the start and any stop pulses, the intensities of all the pulses are recorded. The intensity information is used to make a correction to the range measurement derived from the timing information.

Scanner

Figure 6A:
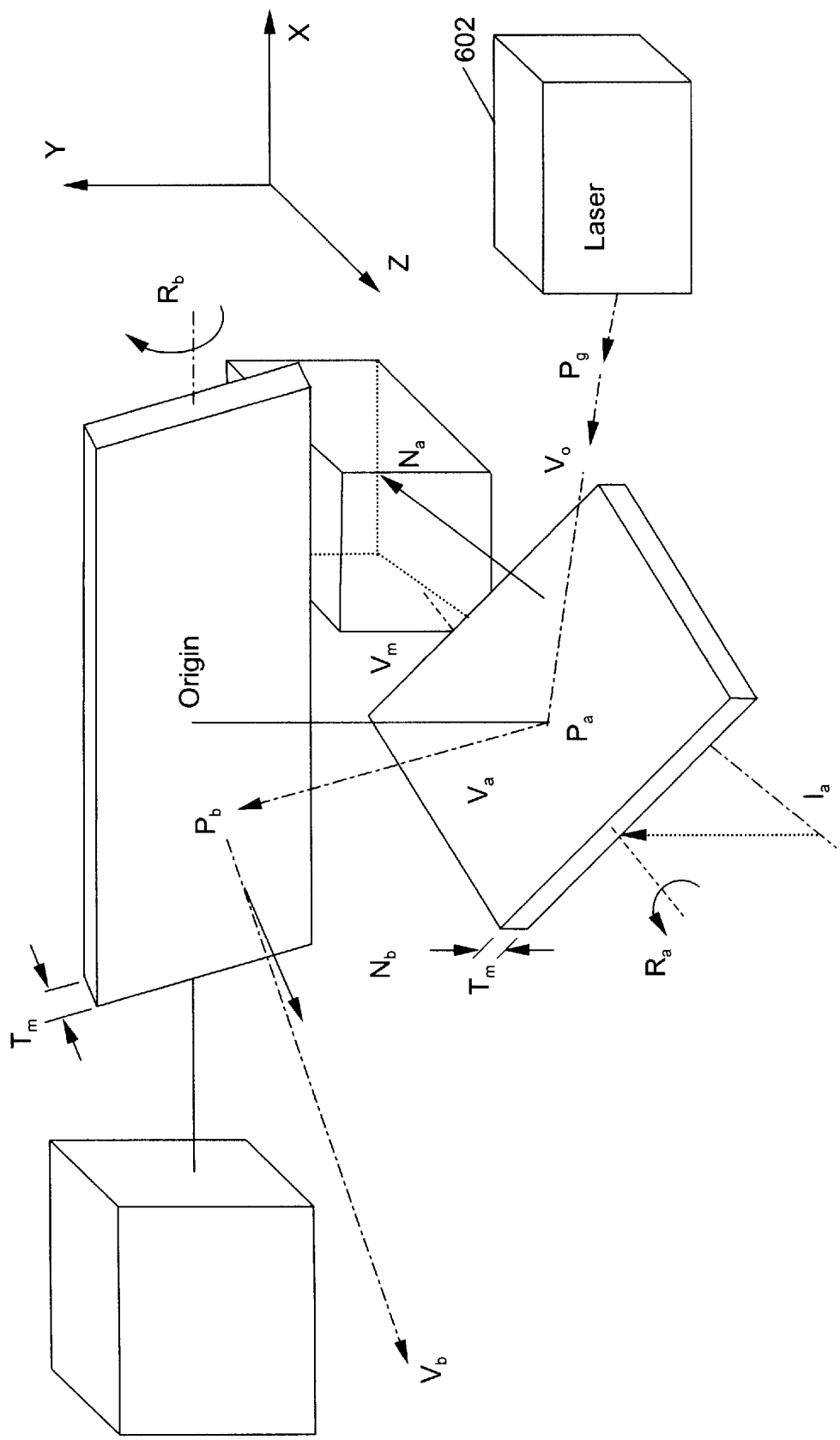
FIG. 6A shows a dual mirror arrangement of the scanner shown in FIG. 6.

The scanner 614 may be conventional. The scanner 614 directs the outgoing pulses from the duplexer 608 to a desired position on the object 20 and directs the incoming return pulse into the receiver telescope 610. The scanner 614 directs light to the narrow field ccd camera to collect color and texture in the immediate vicinity of the scanned laser points, which provides for precise registration of color and texture obtained with the lidar acquired point geometry. The scanner 614 includes a dual mirror arrangement (see FIG. 6A) for beam steering, although any conventional high accuracy and repeatability beam steering mechanism may be employed. The dual mirror arrangement includes two mirrors which are rotated on orthogonal axes by moving coil motors. These motors have an integral position decoder which has angular repeatability of less than 1 microradian. The mount for the scanners is integrally formed with the supports for the laser and other optics. This system provides 40 degrees of optical motion in both altitude (elevation) and azimuth at several hertz.

Electronics

A. Timing Circuit

The function of the timing circuit is to accept the output signal of an Avalanche Photo Diode (APD) and to provide data from which the relative times between electrical pulses can be calculated.

Time to Digital Conversions performed in receiver

Purpose: To provide sufficient data to calculate the relative time delay between pulses in the input pulse sequence.

Maximum relative time. Digitally programmable between 128 nsec and 25 usec in 64 nsec increments.

Relative Time Data: For each input pulse sequence, up to 3 sets of 9 bytes each to calculate 3 relative times.

Error in Data. After converting data to time differences in picoseconds, dispersion about mean of multiple measurements <5 psec RMS.

Conversion Time: 20 usec maximum after the Full Scale Time has elapsed

B. Pulse Area Conversions performed in receiver

Purpose: Provide data which can be used to compensate the relative time measurements for effects due to the amplitudes of pulses in the received sequence.

Data: For each input pulse sequence, up to 6 values of 3 bytes each for calculating the area (pulse voltage x time)

C. Control and Data Interface

Receiver Commands: Set threshold DAC, Set Hysteresis DAC, Set Holdoff Delay, Set Full Scale Time, Set Control Byte, Reset, Enable, Read Status byte, Read Data Byte Count, Read Next Data Byte Data Interface: Standard PC compatible enhanced parallel port, 26 pin IDC header APD Power Connector: 9 pin subminiature D receptacle supplying +12V at 120 mA Environmental:

Temperature: −20

Digital Signal Processor

A digital signal processor integrated circuit controls all the time critical functions of the FDV—scanner control, laser firing. It also provides fast floating point computation capability for making geometry corrections, calibration corrections, and video lens corrections, and video compression. The digital signal processor is interrupted at regular time intervals, typically about 10 usec. At each of these time intervals, a check is made to see what real time calculations are outstanding.

Scanner Control

The electronics for the scanner are a simple precision PID controller which are driven by a digital signal from the DSP. When driving this system quickly, there is noticeable lag in the ability of the scanner to follow the driving signal. However, the controller circuit does not have an error signal output. An external precision analog differential amplifier provides an error signal (the difference between the command signal and the actual displacement), which is sampled by the DSP at low resolution. The DSP then computes the exact scan position by computing the sum of the command signal and the error signal. The advantage of this method is that it requires only a low resolution A/D converter and a precision D/A converter, rather than a far more expensive precision A/D.

Figure 10:
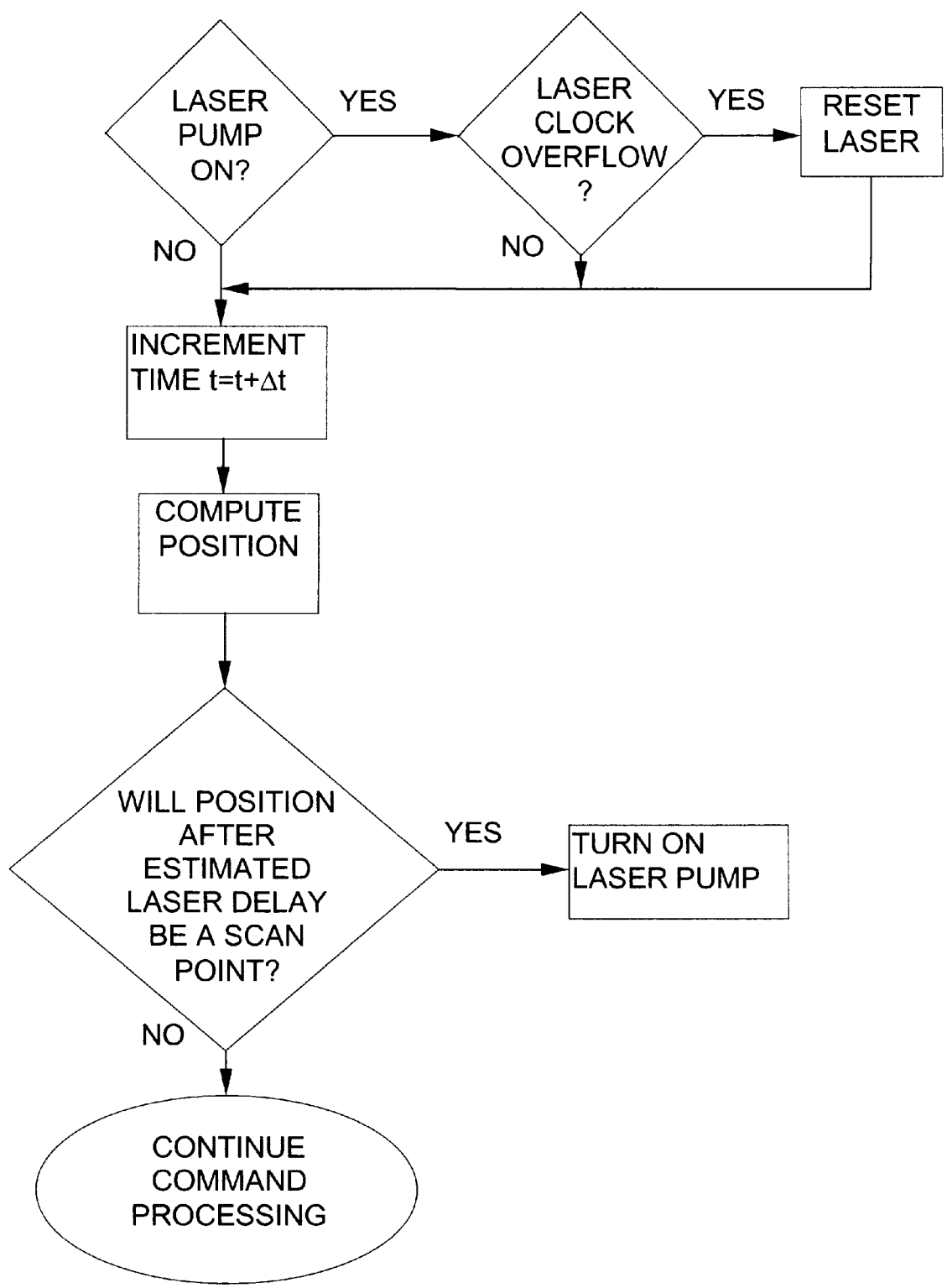
FIG. 10 is a flowchart that shows calculations performed by the FDV DSP.

The digital signal processor generates the trajectories for the analog scanner controller, and makes measurements of the difference between the desired trajectory and the actual position. It predicts the time at which the laser pump is turned on so that the laser will fire at the desired angle. These predictions are made at regular time intervals. FIG. 10 is a flow chart that shows the calculations performed at each time interval.

Trajectory computation

The user defines areas within the view of the scanner that are to be scanned, and indicates the density of points to sample within the scanned region. There are several scan patterns which can be used, and these require a specific pattern of mirror movement, known as the trajectory. The objective of picking a good trajectory are the conflicting needs of doing the move quickly and accurately. Accurate movement requires minimum torque, which would otherwise deform the apparatus. This limits the speed with which motions can be made. At equal time increments, a calculation is performed to determine the current position of each mirror. The particular calculation used depends upon the type of scanning employed.

Raster Scanning

Figure 11A:
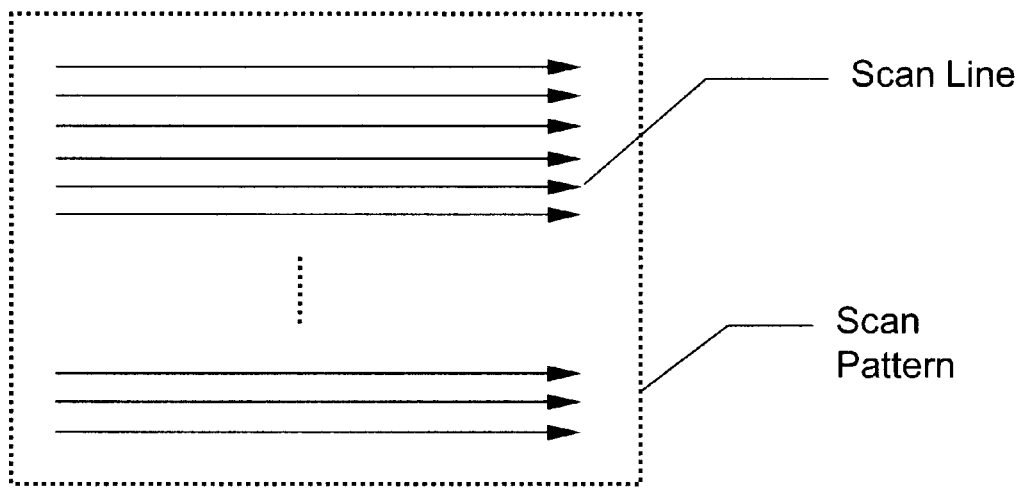
FIGS. 11A and B show a unidirectional scan pattern and a bidirectional scan pattern, respectively.

When the desired scan field is a polygon, one of two raster scanning patterns is used. In the first, scanning is unidirectional (i.e., always proceeds from left to right, or right to left, on parallel lines). FIG. 11A shows such a unidirectional scan pattern. In between scan lines, the scan mirror retraces to the beginning of the next line without making any range measurements. The retrace can proceed quite quickly since no measurements are being made during the retrace.

Figure 11B:
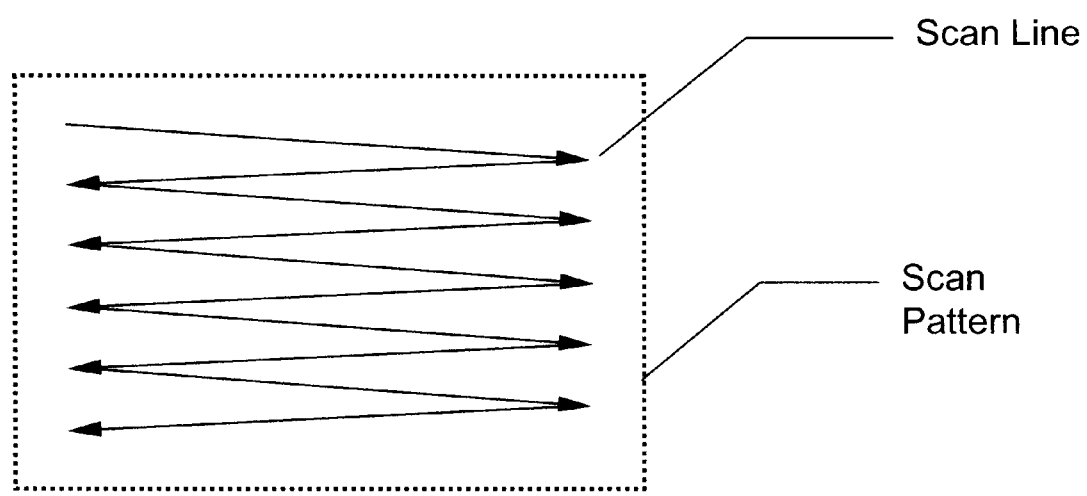

A slightly more efficient means of raster scanning is bi-directional, in which scanning is also performed on the retrace. FIG. 11B shows such a bi-directional scan pattern. This is not as efficient as it might seem because the retrace time is used for other calculations, and because the resulting scan pattern is not as regular.

Both raster scanning methods require traversing a straight line in the minimum time, starting at zero velocity and ending at zero velocity. The torque applied to the mirror is proportional to the angular acceleration, which must zero at the beginning and end of the scan since the mirror is at rest. It can be shown that the trajectory that makes such a minimum energy move between two points is given by the sum of a straight line and a full cycle of a sin. However, this is closely approximated with much less computation by the minimum degree polynomial, with boundary conditions $p(t0)=p0$, $p'(t0)=0$, $p''(t0)=0$, $p(t1)=p1$, $p'(t1)=0$, and $p''(t1)=0$ which is the fifth order polynomial: $p(t)=(p_1-p_0)t'^3(6t'^2-15t'+10)+p_0$, where $t'=(t-t_0)/(t_1-t_0)$.

Spiral Scanning

A disadvantage of raster scanning is that since the speed of the trajectory is varying, the scanning efficiency is not optimal. A spiral pattern can achieve a constant speed trajectory which permits a uniform point distribution.

Seeking

In addition to scanning a range image, the system is capable of performing a number of functions which are common in surveying. The scanner can be made to search for important features, or locations of high reflectivities. This allows the system to perform normal surveying functions by finding a target whose location is approximated identified, and reporting its exact angles and position.

Angle Calibration

The capacitive encoders in the moving coil motors have tremendous repeatability, but relatively poor accuracy. A number of calibration activities need to be continuously performed to ensure system accuracy.

Before use, each scanner is calibrated over its complete range of angles. At a number of discrete temperatures, a map is created and stored of the measurements of apparent angles for thousands of accurately measured points using an external resolver that is traceable to NBS standards. The DSP linearly interpolates between these measured points on every angle measurement.

Preferably, the accuracy of angle measurement is improved by determining scale or offset errors in the encoder during operation. Two methods are described.

A first method is to provide a pair of mechanical stops on the scanner shaft. Periodically, the scanner is driven into these mechanical stops with a known force (current), and a measurement is taken of the apparent angle. These two measurements provide an accurate gauge of any scale or offset errors in the encoder. A second method is to install a pair of autocollimators at two stable angles pointing at the back side of the mirrors. An autocollimator gives a very accurate reading when the mirror is close to perpendicular to its optic axis, and can give resolution better than 1 $\mu$rad. The mirror is adjusted until it comes perpendicular to each autocollimator in turn, and this permits estimating any required scale or offset adjustments.

Range Walk Calibration

In order to measure the distance to an object that is better than the response time of the detector, we must know where on the signal the voltage threshold used to stop the clock was crossed. The signals generated by strong optical returns will cross the threshold voltage sooner than those generated by weak optical returns, making highly reflective objects, or objects at distances of maximum transceiver sensitivity, appear closer. This "range walk" can be corrected if the shape of the optical return is always the same and the energy of the return is known. The extremely repeatable shape of the pulses generated by the passively Q-switched microchip laser makes this possible.

A circuit is added to estimate the energy in each detected pulse, and a table of corrections is maintained to improve the range estimates. Two different circuits have been employed to make a measurement of the pulse energy for this purpose. The first is a gated integrator, the gate being open at the beginning of a pulse, and closed at the end. The second consists of an integrator with a time constant scaled to the width of the pulse, followed by a peak detector which has a time constant much longer than the pulse width. The output of the peak detector is sampled shortly after the pulse is detected.

Range Calibration Fibers

A 20 m single mode fiber is provided in the optical path to provide range system checks, and to calibrate the timing circuits. One end of the fiber is placed in the transmit path, and is either obscured partially or completely by a movable aperture. The far end of the fiber is aimed into the lidar receiver aperture. When pulses are launched into the fiber by removing the obscuring aperture, an additional aperture prevents pulses from being sent out to external targets. In this way, start pulses and return pulses with extremely repeatable delays can be produced.

The fiber itself may be coated at both ends, so that a single pulse introduced into the system can produce multiple output pulses, all with extremely repeatable intervals. Individual pulses in the train can be distinguished by setting a range gate in the timing circuit which ignores all received pulses before a programmable length of time.

The precise delay of the fiber provides an accurate calibration of the gain and offset errors in the timing circuit. This intermittent calibration is used in all subsequent range measurements.

By altering the amount of light coupled into the fiber, the energy of the detected pulses can be varied over the dynamic range of the receiver, at one particular time delay. The intensity and the measured time values produce a map of the range walk correction required for each intensity, and this correction is applied to subsequent measurements. This correction can provide accuracy of 1 mm over the dynamic range of the instrument, particularly as a result of the great repeatability of the laser pulse waveform.

Geometry Calculation

The output of the FDV after a range scan consists of points in spherical coordinates with respect to a coordinate system in the scanner. However, the raw data consists of mirror angles and time intervals. The DSP computes the spherical coordinates of the scanned points by taking into account scanner geometry (mirror thickness, optic axes, mirror offsets, etc.) and all the appropriate calibration adjustments.

Laser Control Delay Prediction

The digital signal processor is responsible for controlling the firing of the pulsed laser, but it can only do so indirectly. The processor has control of the timing for starting the pump diode, which causes the passive q-switch to fire after saturation has occurred. However there is a variable delay between turning on the pump and having the laser fire. The delay is a function of junction temperature, which in turn is a complex function of ambient temperature and recent history of laser firing. The delay generally ranges between 100–300 usecs.

Fortunately, it is primarily necessary to know the scanning mirror angle at the precise moment the laser fires. After the laser has been fired just a few times, the pump delay does not change quickly if the firing rate does not change quickly. As a result, accuracy of a few microseconds can be achieved by estimating the next pump delay to be the same as that in the previous firing cycle. The digital signal processor measures the pump delay by reading an internal counter when the pump is started and when the laser actually fires, causing an interrupt. Since the interrupt latency is less than a microsecond, this becomes the timing accuracy to which the pump delay can be measured.

A more sophisticated dynamic model of the thermal properties of the laser could lead to slightly enhanced scanning pattern regularity, but is probably equally limited by the time resolution of the processor interrupts.

Firing control

Given a time vs. angle trajectory for a scanning axis, w(t), a desired angle to fire the laser, and an interrupt interval Dt, the decision to fire the laser amounts to computing the time at which point the pump diode is started.

Computer Control

Figure 12:
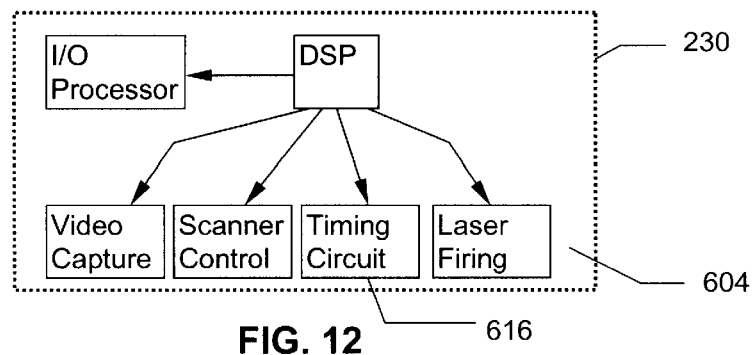
FIG. 12 is a block diagram of an embodiment of the FDV processor.

The FDV is designed to perform under the control of a remote host computer which contains graphical controls for a user to specify areas to be scanned. The remote machine controls the FDV through a bidirectional serial byte stream, which is effected in any of a number of media: ethernet, EPP parallel port, serial port. A processor in the FDV is assigned the task of decoding messages, and scheduling the required activity. FIG. 12 is a block diagram of the FDV processor.

Host Communications Interface

Figure 13:
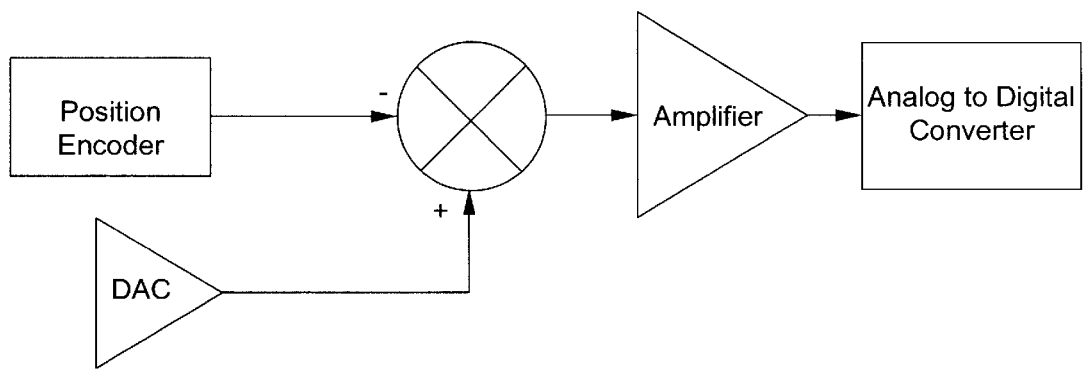
FIG. 13 is a block diagram of circuitry for setting a desired position of an FDV mirror.

The host machine acts as a master, sending a well defined message protocol to command the FDV. When actions are completed, the FDV responds with data and status information. Among the actions which can be requested are:

Point the scanner measure a distance range scan a box fire the laser n times take a video image Scanner Control Referring to FIG. 13, in normal operation, each scanner in the dual mirror system requires a 16 to 18 bit digital word to set the desired position, which is applied to a precision digital to analog converter to create a voltage proportional to the desired position. However, there will be some error between the position commanded by the output of this converter and the actual position of the scanner, which is reflected by the output of the position encoder. A precision difference signal is generated, and the difference is measured to 12 bit accuracy. This provides an economic method of making 18 bit position measurements while only using an inexpensive 12 bit converter.

Commercially available galvo scanners have microradian repeatability, but have relatively poor scale and offset performance, particularly over temperature. A calibration mode has been incorporated into the system to permit making measurements at two precise angles, and using the two measured data points the offset and scale drift of the scanner can be calculated.

Two methods have been developed for this purpose: an optical and a mechanical means. In the mechanical method, the scanner shaft is gently placed against one of two mechanical stops, and the current in the scanner controller is adjusted to a specific value, which provides a known force. The position signal is adjusted until there is no position error, and this gives the calibrated position measurement. In the optical method, two autocollimators are aimed at the back of the scanner mirrors, which have also been polished and mirror coated. When the scanner mirrors are exactly aligned with one of the collimators, the output from the split photodetector in the autocollimator is balanced. By placing the scanner in each of these precise angles in turn, an offset and scale correction for the scanner encoder can be calculated.

Timing Circuit

Figure 14:
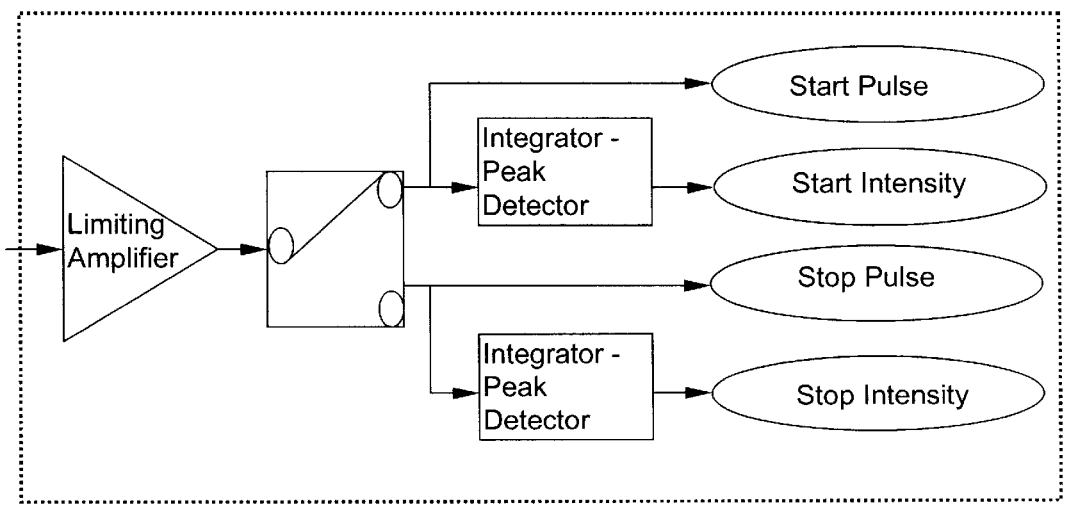
FIG. 14 is a block diagram of a signal conditioning and energy integration circuit of the timing circuit shown in FIG. 12.

The purpose of the timing circuit is to provide the relative time between the start pulse and the stop pulse, in picoseconds. There are two subsystems in the timing circuit: a signal conditioning and energy integration circuit (an embodiment of which is shown in FIG. 14), and a time interval analyzer. Both communicate directly with the DSP. Initially, systems have been produced with a commercial timing instrument, the Stanford Research Systems SR620 time interval analyzer. The interface to this instrument is through an IEEE488 interface. In a preferred embodiment, the communications interface to the Stanford Research Systems SR620 time interval analyzer is IEEE488.

A custom time interval measurement circuit has been developed which utilizes a separately patented interpolation technology. The circuit employs a clock, typically operating at >100 mhz, which is used to make a coarse count of 10 nsec intervals between stop and start pulses. Additionally, there is an interpolator which divides each 10 nsec coarse count into 1000 smaller increments, providing 10 psec resolution. This system has approximately 5 psec jitter. Differential time measurements can be made with less than 20 psec RMS error, which corresponds to about 3 mm. This circuit communicates with the DSP using a dedicated serial bus, and employs a packet protocol: the DSP arms the circuit by sending a single byte. When the timing circuit completes its task, it sends a sequence of bytes which represent both the time delay between start and stop pulses, and the intensity of each pulse.

Laser Firing

The DSP has three lines for laser control: one starts the laser pump, the second indicates that the laser has fired, and the third indicates that the return pulse from a target has been detected. When the laser fires, the DSP samples the analog pulse amplitude signal. This happens typically within 1 $\mu$sec.

Video

For targeting, the user is provided on the host a video representation of the scene from which he can choose a portion to be range scanned. In most cases this will correspond to the scene rendered in ambient illumination.

Capture

One way the video is captured is by using the scanner to aim single sensitive detector across the scene with the laser turned off. This permits acquiring an image which has very accurate spatial alignment with subsequent range scans. However, image capture can be quite slow in comparison to commercially available cameras.

A second approach is to utilize standard commercial CCD video cameras to acquire an image. One CCD camera with a wide angle lens is aligned with the range scanner with as small an offset as possible. A second camera with a 5 degree field of view is placed so that its optic axis is coaxial with the transceiver. Thus, a much smaller field of view is accessible through the scanner, and can be scanned with the same resolution as the transceiver. This allows targeting small or distant objects.

Alignment

The wide angle lens introduces a fish-bowl effect in the image captured by the CCD sitting behind the lens. Straight lines in the world are not straight in the image. This distortion increases with the distance from the center of the lens. This distortion is removed by comparing the image the camera produces when aimed at a carefully designed and printed calibration target image. The difference in the anticipated image and the recorded image provides the information needed to warp subsequently acquired images to eliminate the distortion.

Compression

Each video image is compressed prior to transfer. Currently we are using JPEG standard image compression. It is relatively fast, and creates reasonably small compressed images for communication. Another desirable feature is that the algorithm operates on blocks, which permits us to do interleave image capture, alignment, compression, and transmission in parallel—significantly enhancing throughput.

Point Video

A second camera, with a narrow field of view (e.g., approximately 5°) is placed such that it is coaxial with the scanning laser beam. The field of view is adjusted so that the pixel resolution is approximately the same as the voxel resolution of the lidar system. The camera can be operated while the laser is activated. When this is done, a small group of pixels will be illuminated by the laser, and the centroid of these pixels will correspond to the point which would be measured by the lidar. When a video image is captured, it can be mapped onto a surface which is estimated by a lidar scan.

CGP User Interface for Data Acquisition

As discussed briefly above, the FDV 10 is preferably controlled by the CGP 40 computer. By interacting with a display of the CGP 40 computer, not only can the FDV targeting be controlled, but also the scanned points can be displayed. This facilitates the CGP modeling functions. These functions are performed in two windows which divide the computer display screen. The first window shows the video image of the target scene (the Video Window or Targeting Window); the second shows the scanned points and later the constructed model (the Scanned Point Window or Model Window). The innovations mentioned above will be detailed below and in the CGP section.

By allowing a user to define desired areas to be scanned, and to define a desired resolution at which it is desired to scan the areas, the time required to scan the object 20 can be minimized. For example, in general, it is not required to scan the entire object 20 at a high resolution in order to accurately model the object, even when high detail is required. In particular, many objects are formed of regular geometry, such as planes or cylinders that can be scanned highly accurately at low resolution. Even when an area of the object 20 is scanned at lower resolution, the actual accuracy of each point (in terms of its relative location to all other points in the frame) is still as high as the maximum accuracy of the system.

In response to the user definition of desired areas and required scan resolutions, multiple scans of varying resolutions may be performed within the same view. The automated FDV interface, targeting, control and display system gives the user, in the targeting window of the CGP 40 computer display, tools such as pull down menus and stretch bounding boxes to graphically identify the areas of interest and their desired resolution.

Preferably, the FDV 10 can acquire up to 1000×1000 points per scan frame (defined as the collection of scanned points in a given bounding box). A view can have as many scan frames (or scans) as desired, but may be limited by the amount of memory installed in a particular embodiment of the CGP 40 computer.

The FDV is first pointed in the general direction of an object to be measured. When the system is initialized, the targeting CCD camera captures a video frame of the target area and displays it on the target window of the computer screen. The FDV's fork mount's rotation and tilt ability, can be used to make final pointing adjustments prior to scanning. In that event a new video frame is acquired for targeting the adjusted area.

The software configures the CGP 40 computer to allow the user to start modeling (replacing scanned points with geometric surfaces such as triangulated meshes, planes, cylinders etc) within the model window even while the FDV continues to scan the object. That is, the user can start the modeling process even after only the first scan frame is acquired. The software configures the CGP 40 computer to perform such tasks as basic object surface fitting tools and semi-automated surface recognition tools to be used in completing the model. The CGP software and its tools are more fully described in another section of this document.

Non-geometric "attribute data" relating to the objects in the scene such as component specifications, affixed to components of the object by a bar code or other label, can be acquired during the scan and associated with the particular component in the CGP model.

The resulting model can be viewed and queried within the model window in a variety of ways and it can be uploaded to any of a umber of CAD programs for further editing or design.

Computer Graphics Perception (CGP) Software

The CGP is comprised of a suite of software modules running on a portable PC computer or a graphics workstation (CGP Computer). In the example embodiment, the CGP software utilizes standard graphics libraries and database functionality operating on a personal computer or workstation.

The CGP allows the user to perform real time 3D data acquisition and modeling in the field. The CGP software's functionality includes FDV control, targeting and data acquisition; display and visualization of scanned points; surface segmentation and fitting; manual 3D CAD model construction; 3D visualization; interaction with part and model databases; and the ability to export data in standard data exchange formats to other CAD systems for further processing. In-addition to the innovation of integrating the software with the hardware to achieve major improvements in productivity and quality in the overall process of 3D modeling of reality, the CGP software has many additional innovations which will be obvious from the following description of the software system.

With reference to FIG. 1A (Program Flow), the data acquisition and modeling process divides into the following steps: scan control, point acquisition, segmentation, geometry fitting, geometry manipulation, scene integration, model annotation, and geometry display and query. Each step of this process is described individually below.

Figure 15:
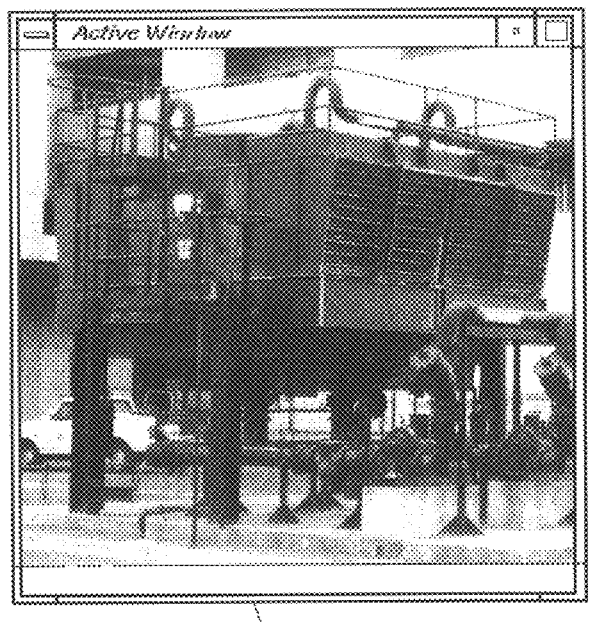
FIGS. 15 through 38 illustrate the flow of CGP software.
Figure 15:
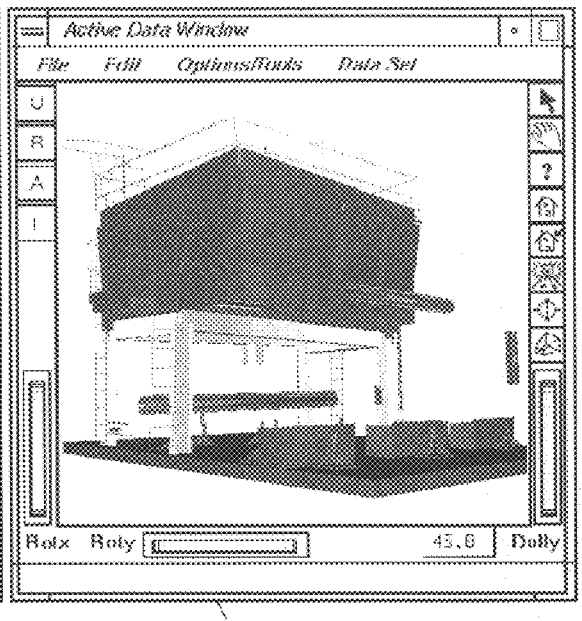

With reference to FIG. 15, the foregoing functions are performed in at least two windows. A first type of window 10 displays a video image of the target scene used to define regions to be scanned by the FDV. A second type of window 20 displays an interactive 3D model consisting of the scanned points and constructed surface geometry; multiple views of the same model may be displayed simultaneously. In addition, the CGP provides additional windows for controlling the FDV hardware, indicating status parameters of the system, and interacting with any number of external CAD and database systems.

Scan Control

Figure 16:
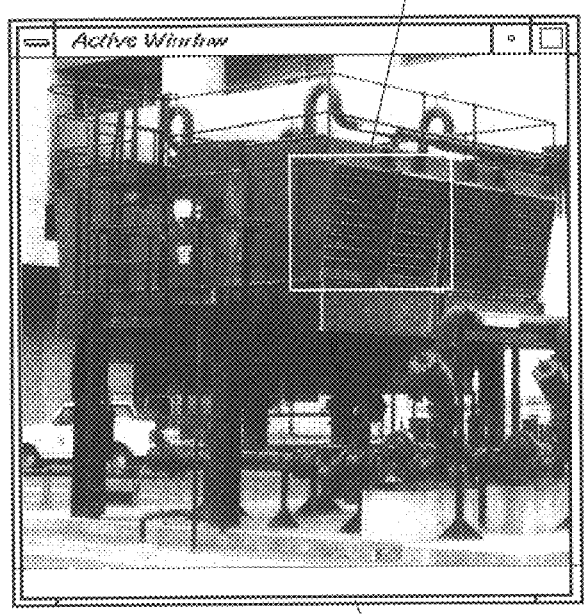
Figure 16:
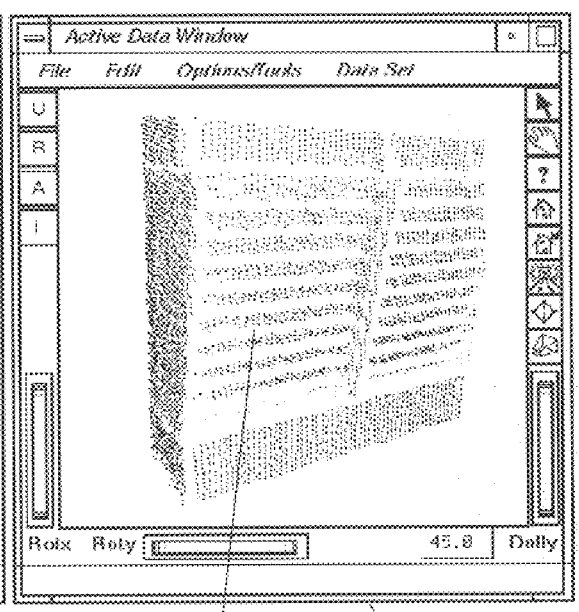

With reference to FIG. 16, scan control is the process of indicating which portions of a real world scene are to be scanned. Scan control is performed using a video image of the scene 10. The video imaging device (typically a simple video camera) is fixed in a known position and orientation relative to the scanning range-finding device. The video imaging device provides an image of the real world scene on the computer display which the user, using a pointing device such as a mouse, indicates a region to be scanned. This region is delineated by any of a number of well known computer graphics techniques such as dragging out a rectangle 15 bounding the region to be scanned.

For the area specified, the user indicates the density of the scanning operation by defining either the number of samples in each direction or the angular separation between adjacent samples.

The computer then translates such region and scan resolution information into a set of commands for the scanner. These commands are communicated to the FDV which is assumed to perform the commands, gather the desired data, and return the scanned data 25 to the CGP for display and further processing.

Point Acquisition

Figure 36:
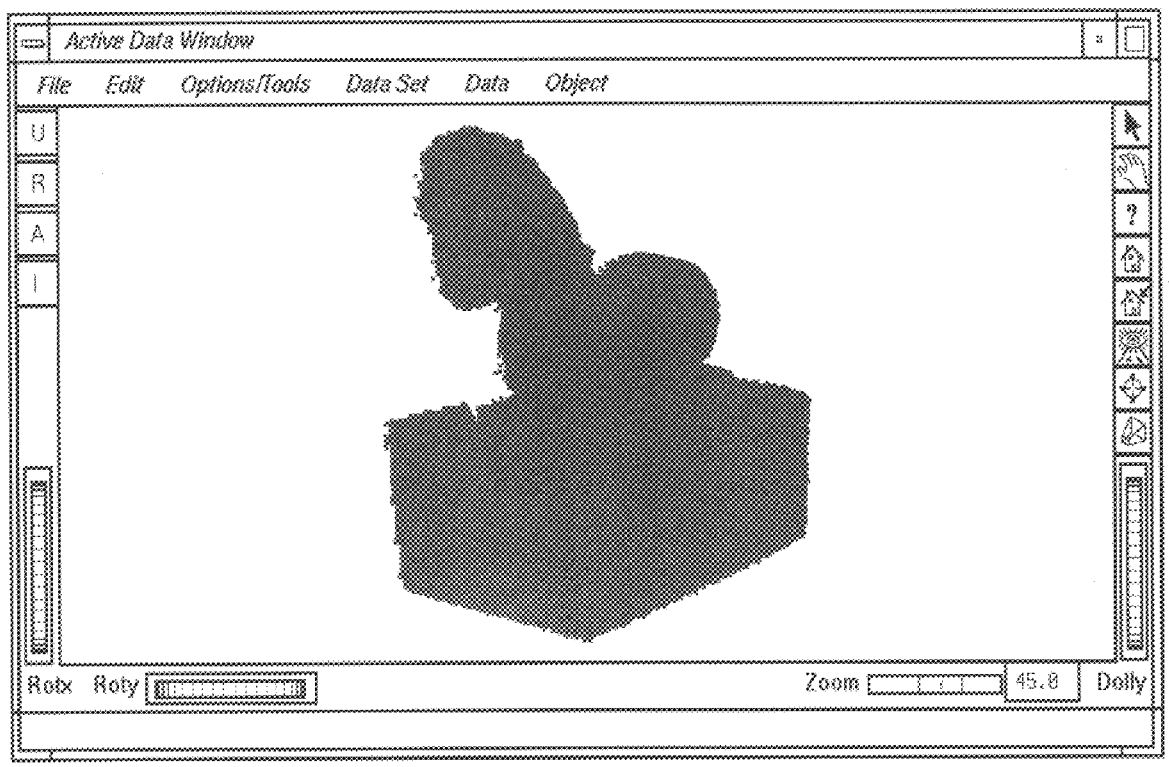
Figure 37:
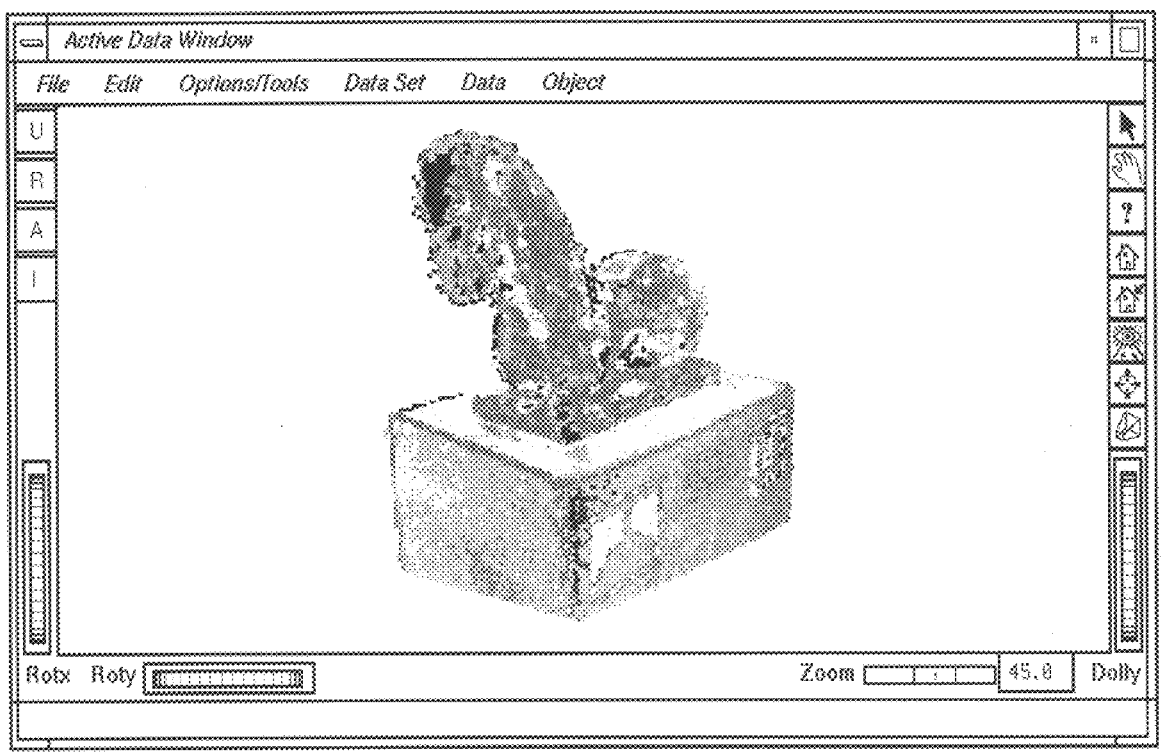

Still with reference to FIG. 16, the data returned from the FDV consists of an ordered grid of three dimensional points 25. Each point consists of its coordinates in three-space as well a measurement of the intensity of the reflected laser pulse at that point. Each point returned is displayed in the data window 20 as it is generated by the FDV at its three dimensional location. In addition, each point may be color mapped to the intensity of the reflected laser pulse at that point. With reference to FIGS. 36 and 37, the display of the intensity information (FIG. 37) provides a more intuitive understanding of the shape of the targeted object than that provided by the uniform intensity display of points (FIG. 36).

This intensity display may be used as a precisely aligned low resolution video image of the exact view of the scanner to delineate the area of additional scans to be taken.

The ordered grid of points generated in this manner is referred to as a scan field. Multiple, possibly overlapping scan fields may be gathered and simultaneously displayed in the manner disclosed above. The collection of such scan fields can be readily manipulated and viewed (see Geometry Display and Query below) as a rigid three dimensional object.

Segmentation

Figure 17:
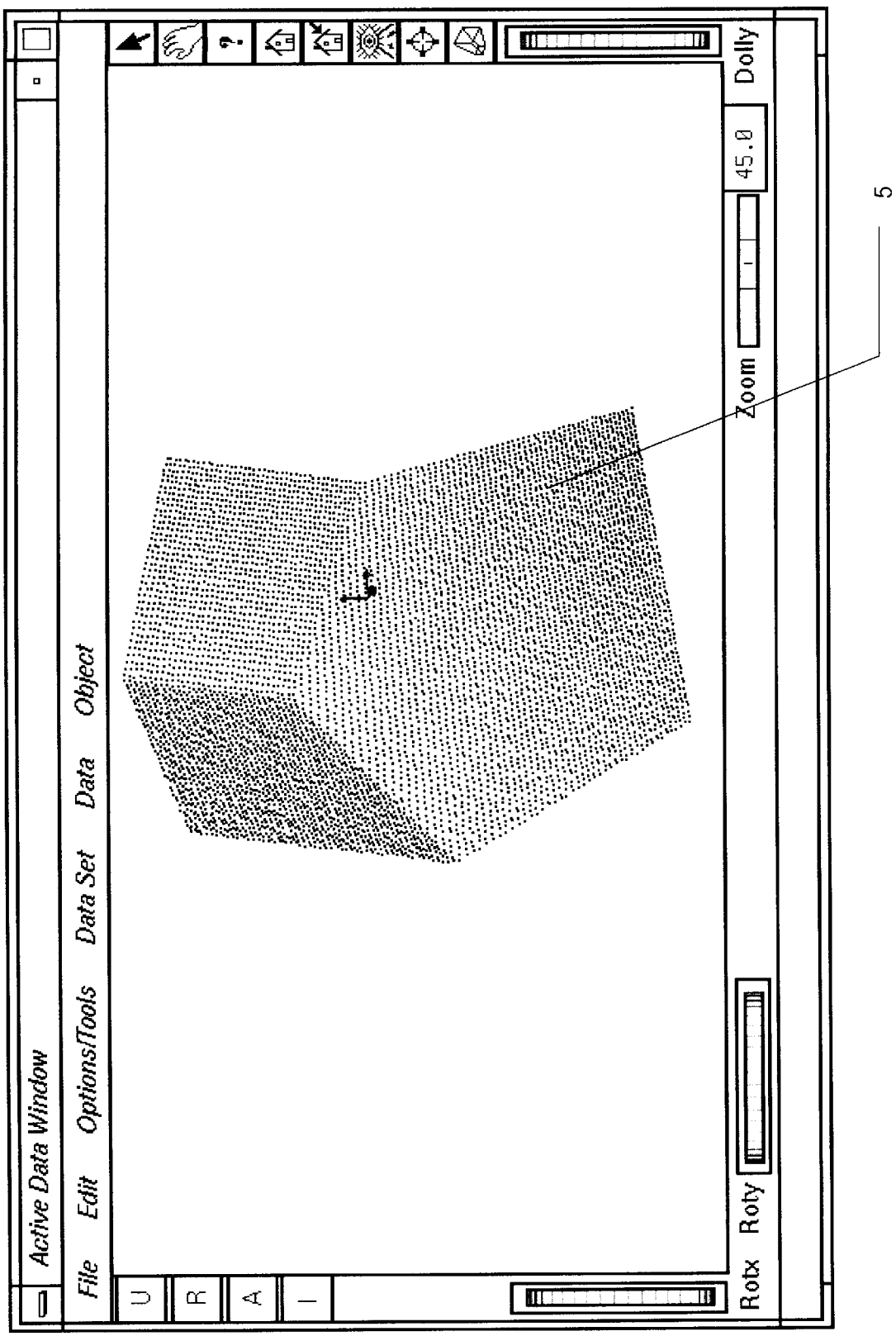
Figure 18:
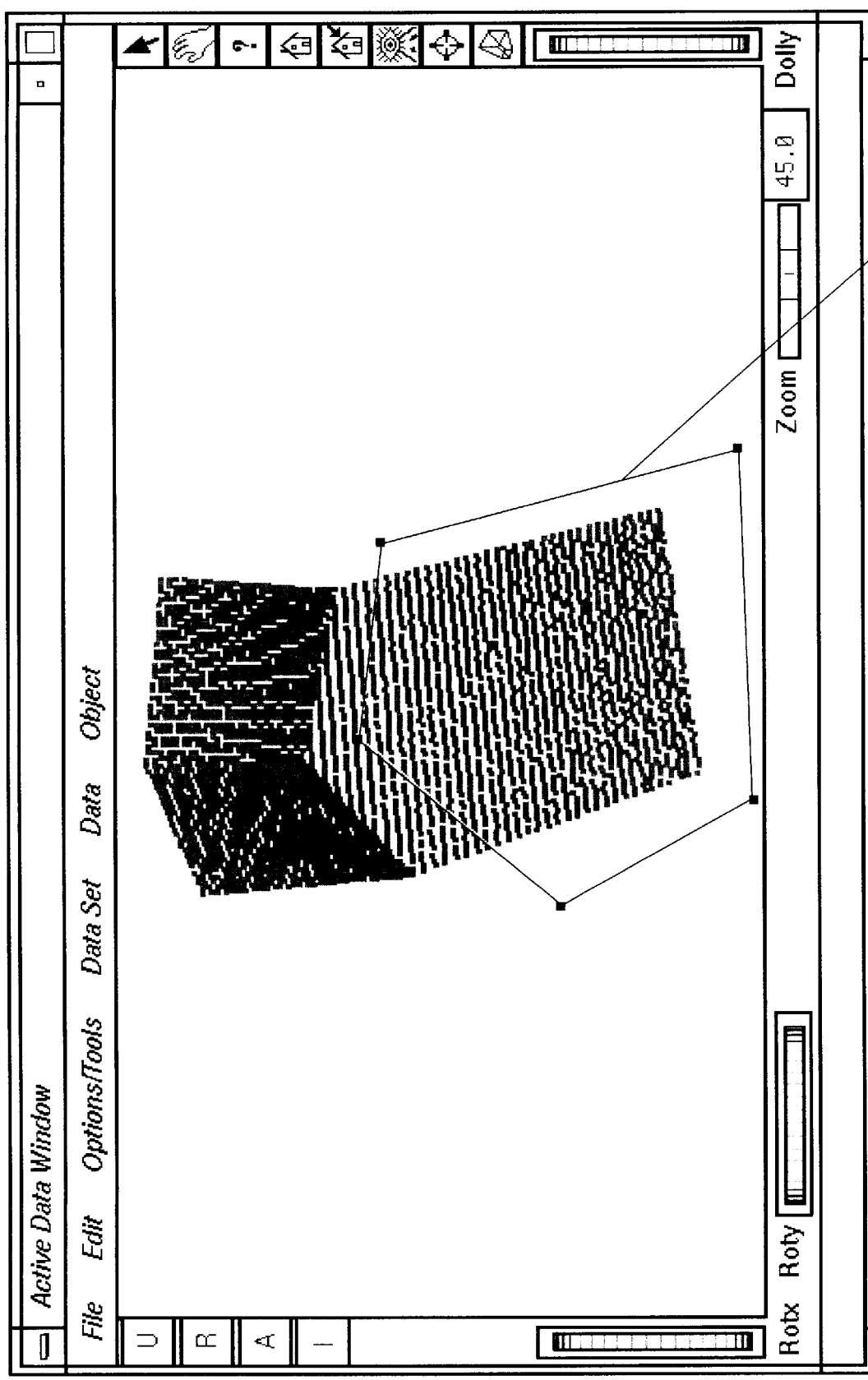
Figure 19:
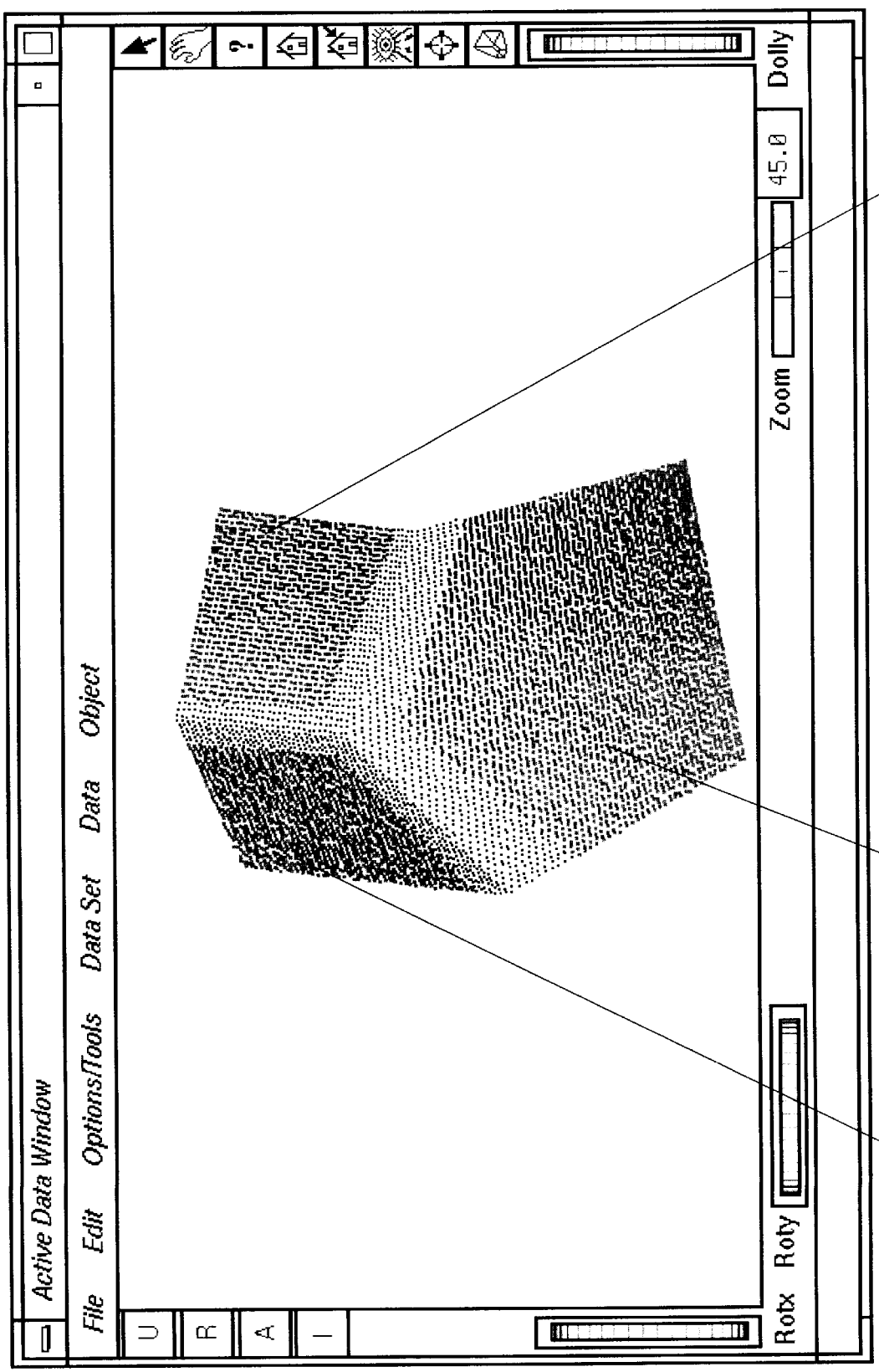

Segmentation is the process of grouping points whose surface type is represented in the software by a geometric primitive and cutting such points to isolate them as a new set. With reference to FIG. 17 which describes a scan of a corner of a room, a scan field is initially a single entity. With reference to FIG. 18, a subset of the points in a scan field can be delineated using standard computer graphic techniques such as outlining a polygonal domain 10. With reference to FIG. 19, subsets of points 11, 12, and 13 which have been cut from a scan field are displayed in a different color and are stored as distinct and independent scan fields. In the case of FIG. 19, the three subsets of points have been selected in such a manner that each subset belongs uniquely to one of three planes making up the corner of the room.

For certain collections of geometric primitives, the segmentation process can be automated. One embodiment of such automatic segmentation applies coplanarity tests to identify groups of points which can be described within a fixed tolerance by a single plane. In another embodiment, groups of points can be identified that lie on a single cylindrical surface. Automatic segmentation can be combined with geometry fitting (disclosed below) to generate surfaces from scan fields with minimal user interaction.

Geometry Fitting

Based upon the gritted and ordered nature of a scan field, a geometric description of the surface(s) represented by that scan field can be obtained by creating a triangulated mesh connecting adjacent points. Any of a number of standard mesh generation techniques well known in the art may be applied to the scan field. In the preferred embodiment, adjacent points are connected by triangles only when the depth differences of such points do not exceed a fixed threshold set by the user.

Figure 38:
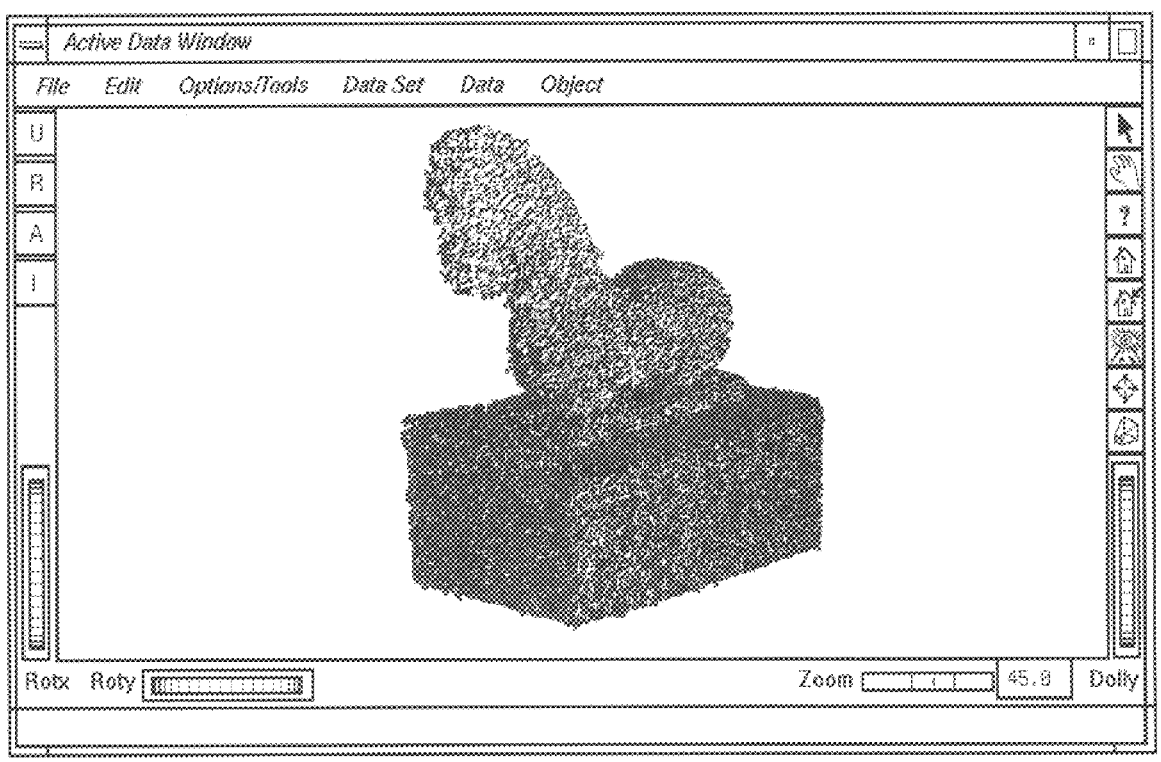

With reference to FIGS. 36 and 38, a scan of a statuette of a horse sitting atop a box (FIG. 36) can be rapidly converted into a surface mesh (FIG. 38). This representation is particularly appropriate for complex surfaces such as natural terrain which cannot be approximated by simple geometric primitives.

Geometrical primitives such as planes, cylinders, etc., can be used to replace groups of scanned points using known geometric fitting algorithms thereby providing the best fit between the selected points and the chosen primitive. Once the fitting is performed, the new surface can be colored and rendered and the user can invoke commands to allow the calculation and display of statistics relating to how well the fit has been performed. The user can also perform measurements such as radius of a cylinder or the location of the primitive relative to other objects in the data window.

Figure 20:
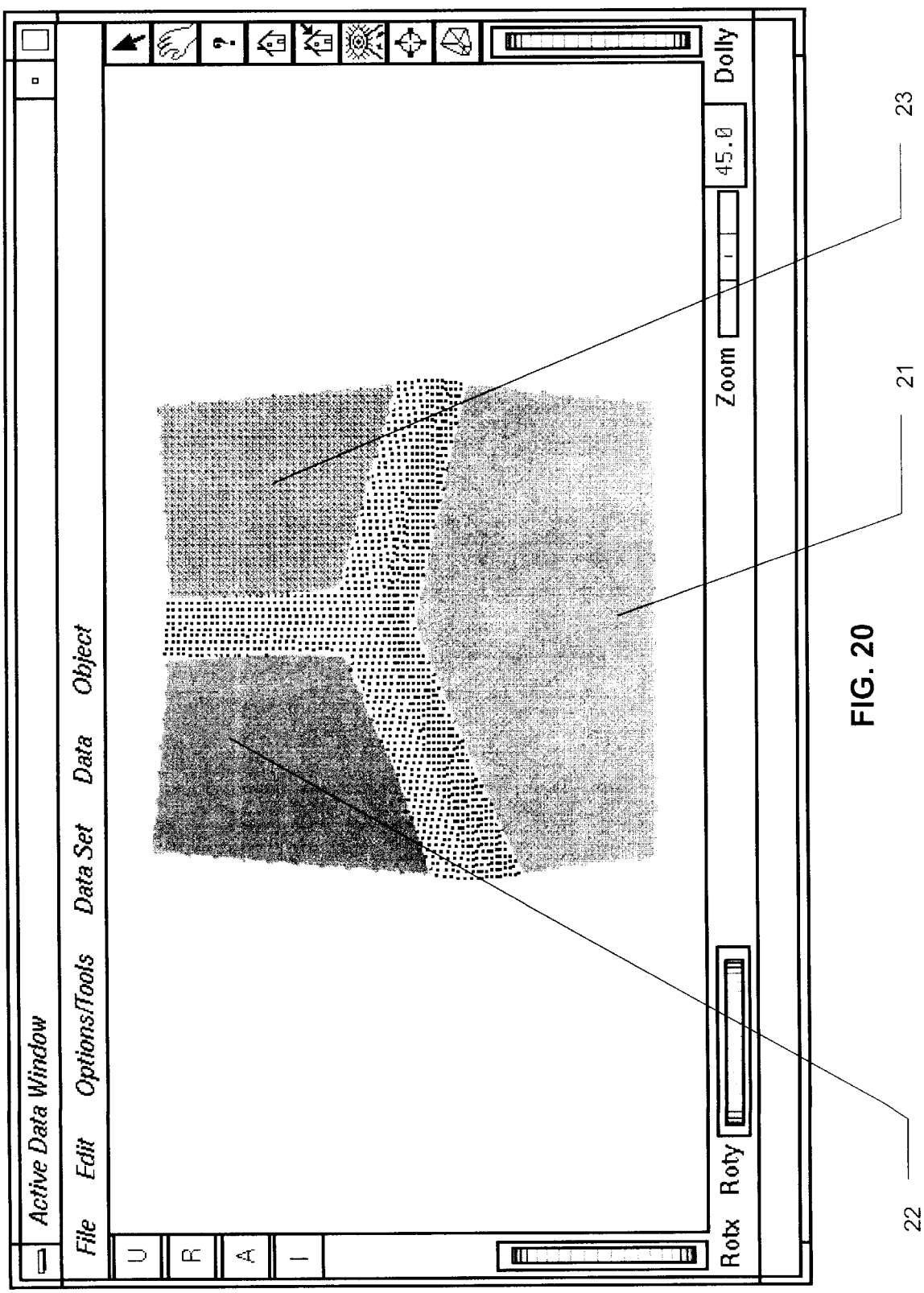
Figure 24:
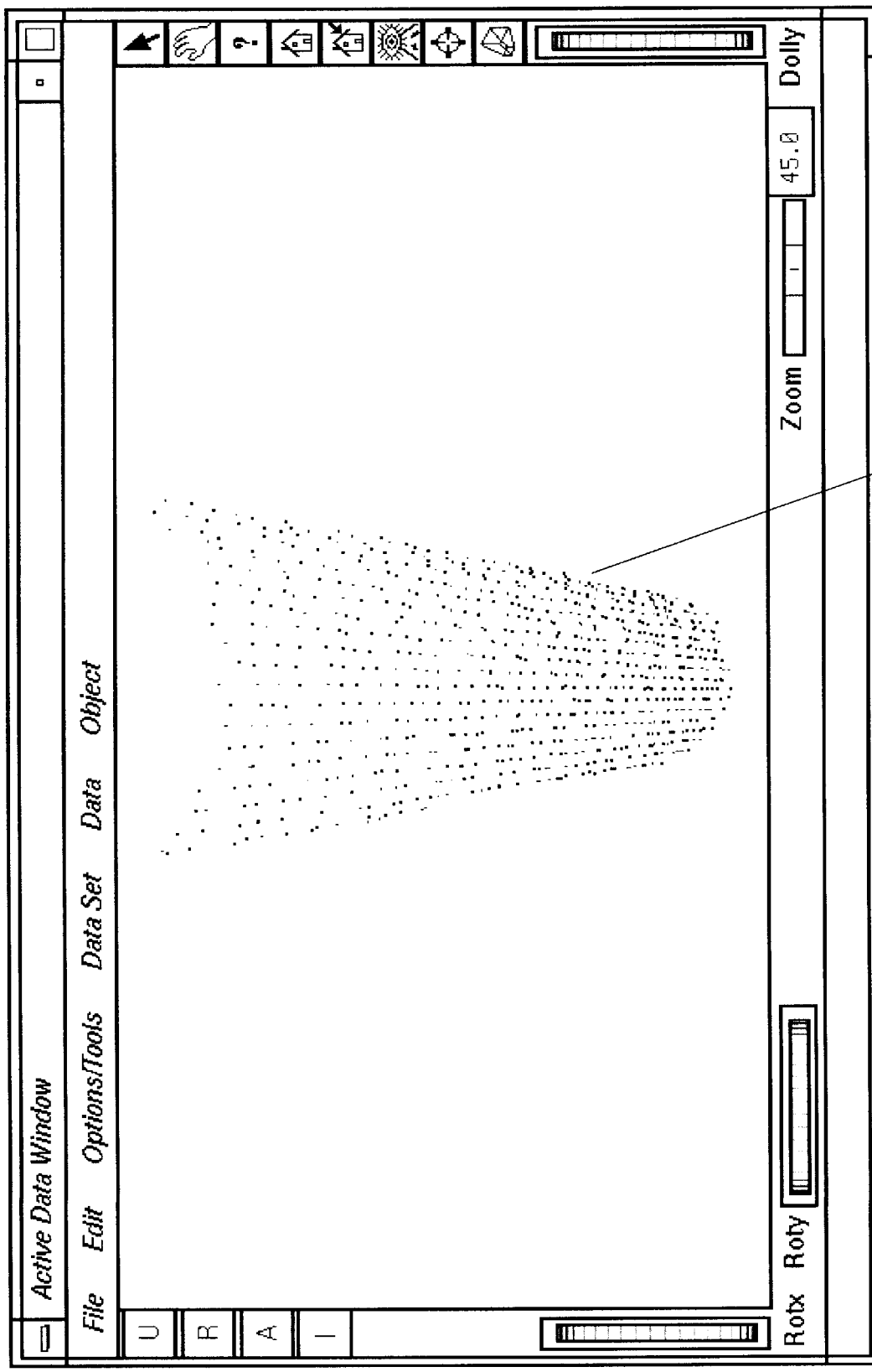
Figure 25:
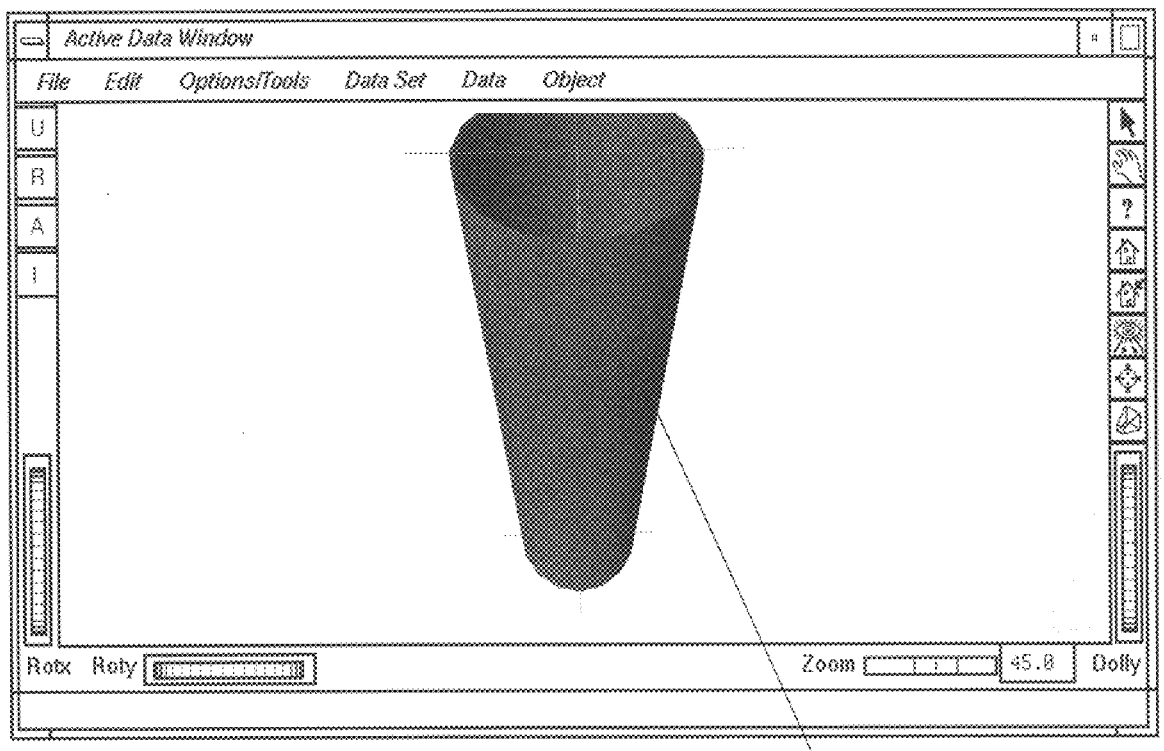

For example, the scan fields 11, 12, and 13 defined in FIG. 19, have been fit (as shown in FIG. 20) with planar patches 21, 22, and 23. Similarly, with reference to FIGS. 24 and 25, a set of points 31 can be converted into a best fit cylinder 41 at the request of the user.

Figure 31:
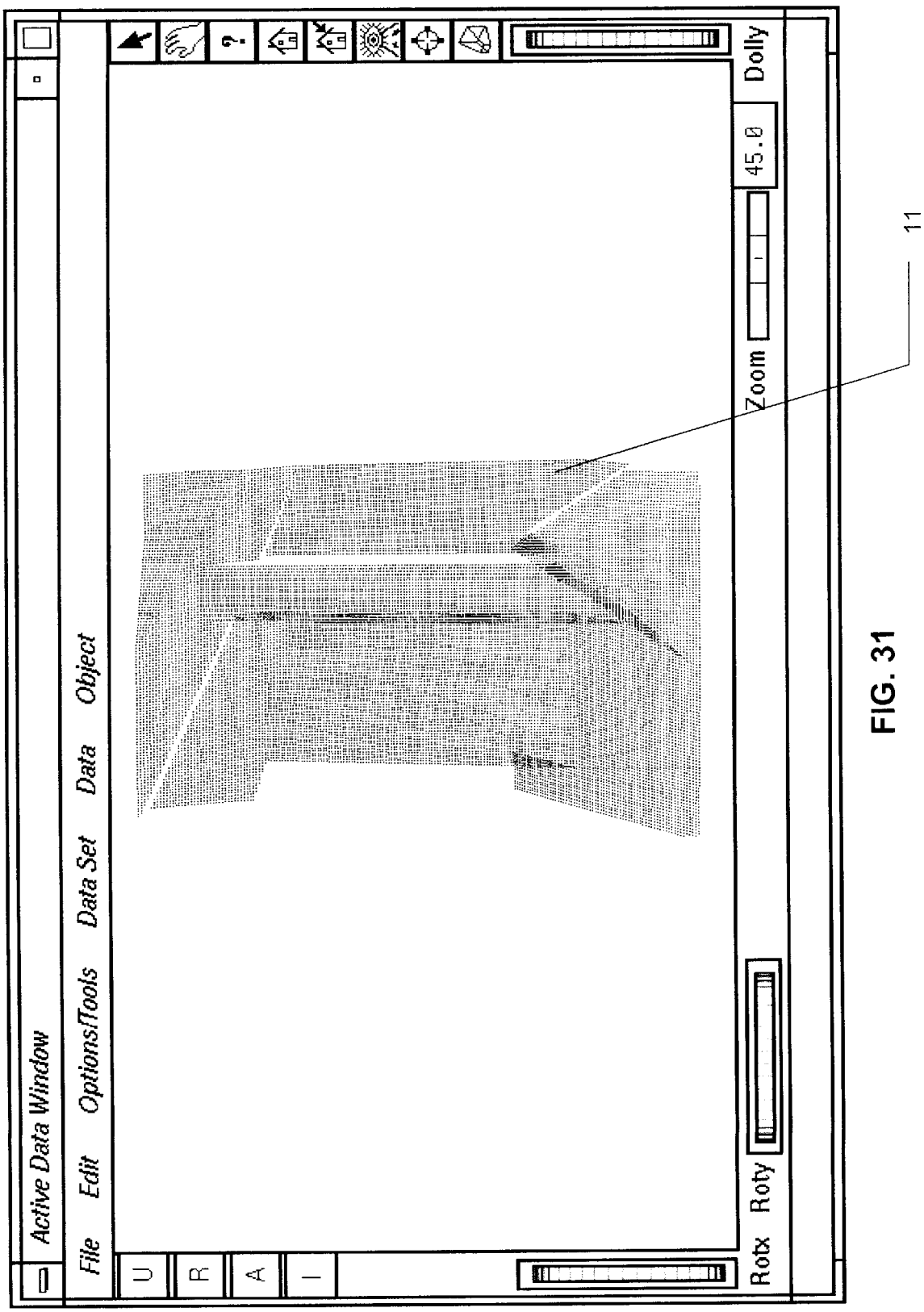
Figure 32:
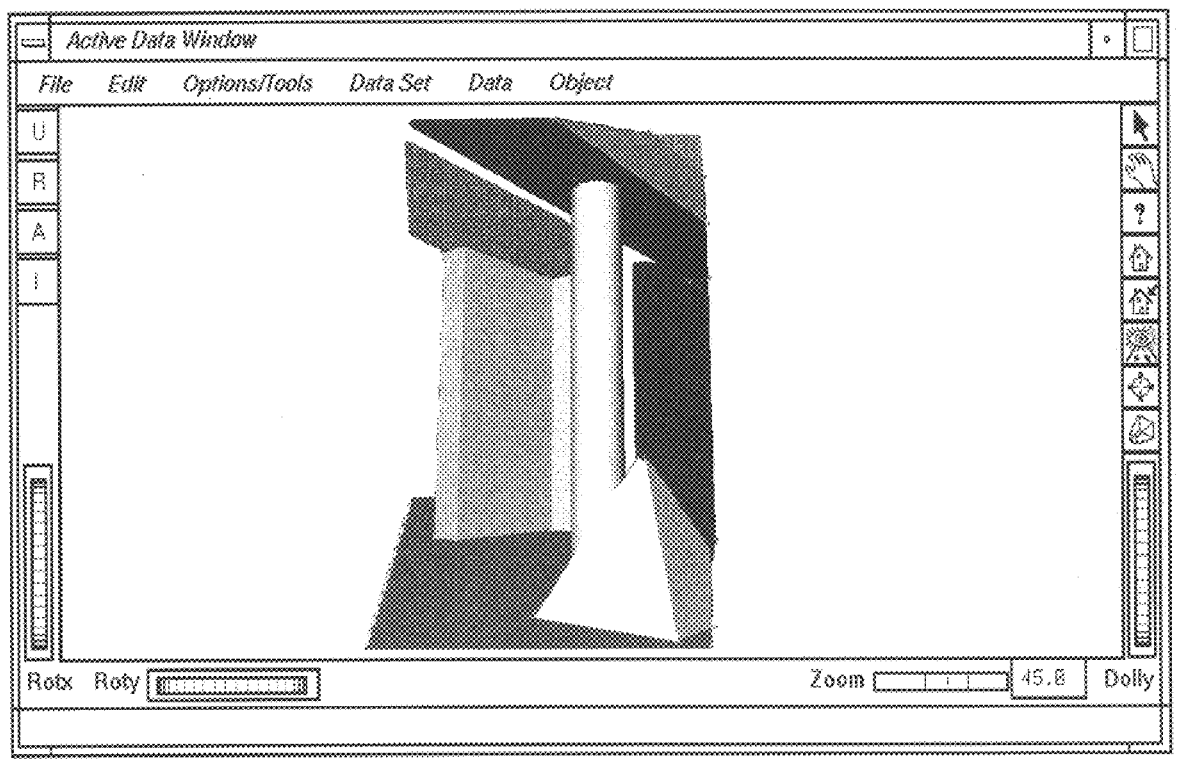

With reference to FIGS. 31 and 32, a more complicated scene has been scanned resulting in scan field 11 of FIG. 31. Using any of a number of automatic or manual segmentation techniques and selecting best fitting geometric primitives, the three dimensional CAD model of FIG. 32 can be constructed. In addition the CGP provides a method permitting an operator to automatically and rapidly fit a group of points representing an object in the view (such as a valve or a flange) with a predefined geometric model of the real object. The predefined model can be an item from a manufacturer's catalog having a three dimensional graphical representation of the object or an object previously generated using the CGP's modeling capabilities. As disclosed below, such predefined parts can be associated with additional database information such as model number, date of manufacture, or maintenance records.

Modeling

Modeling, as used herein, is the process of turning points and their attributes into meaningful computer graphical representations of reality that can be used for a variety of purposes such as graphical visualization and design. In addition, an object may include information regarding the connectivity to its immediate neighbors. For example, a pipe might indicate that it connects to a valve, or a plane representing the ceiling of a room might indicate its connection to four supporting walls.

Figure 21:
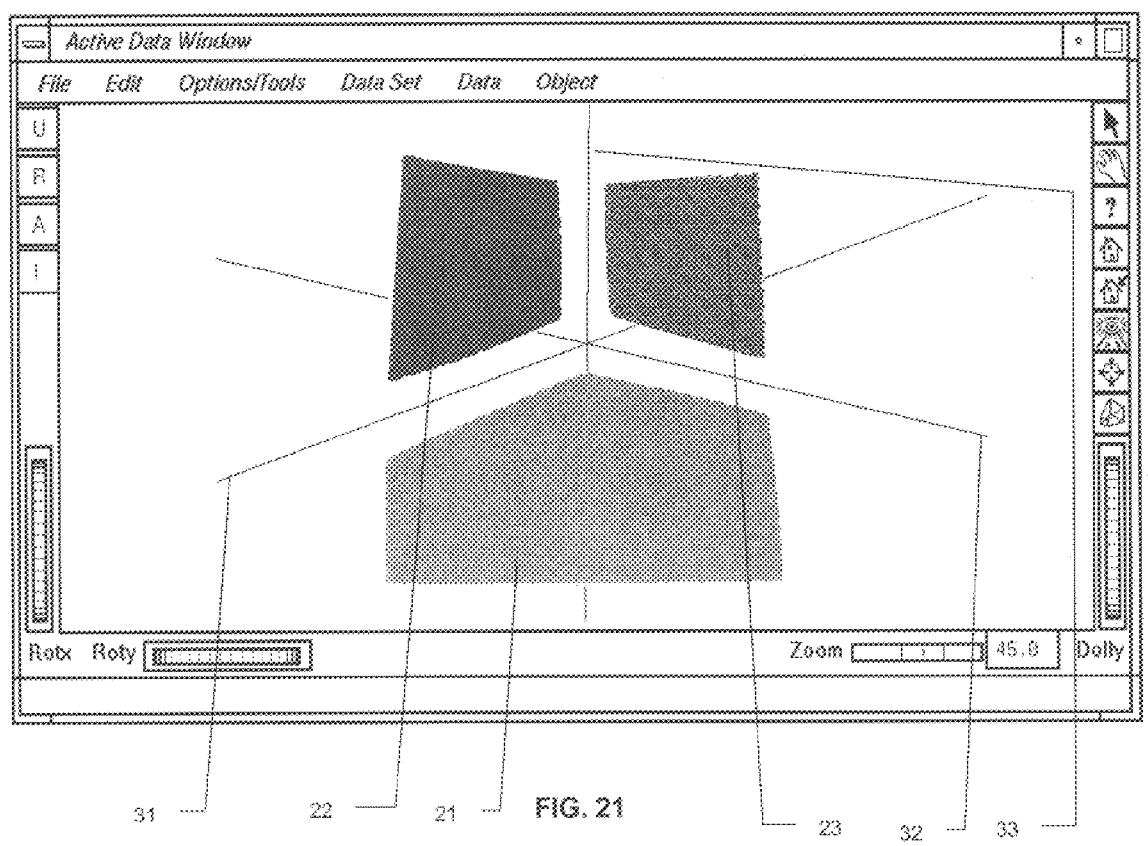
Figure 22:
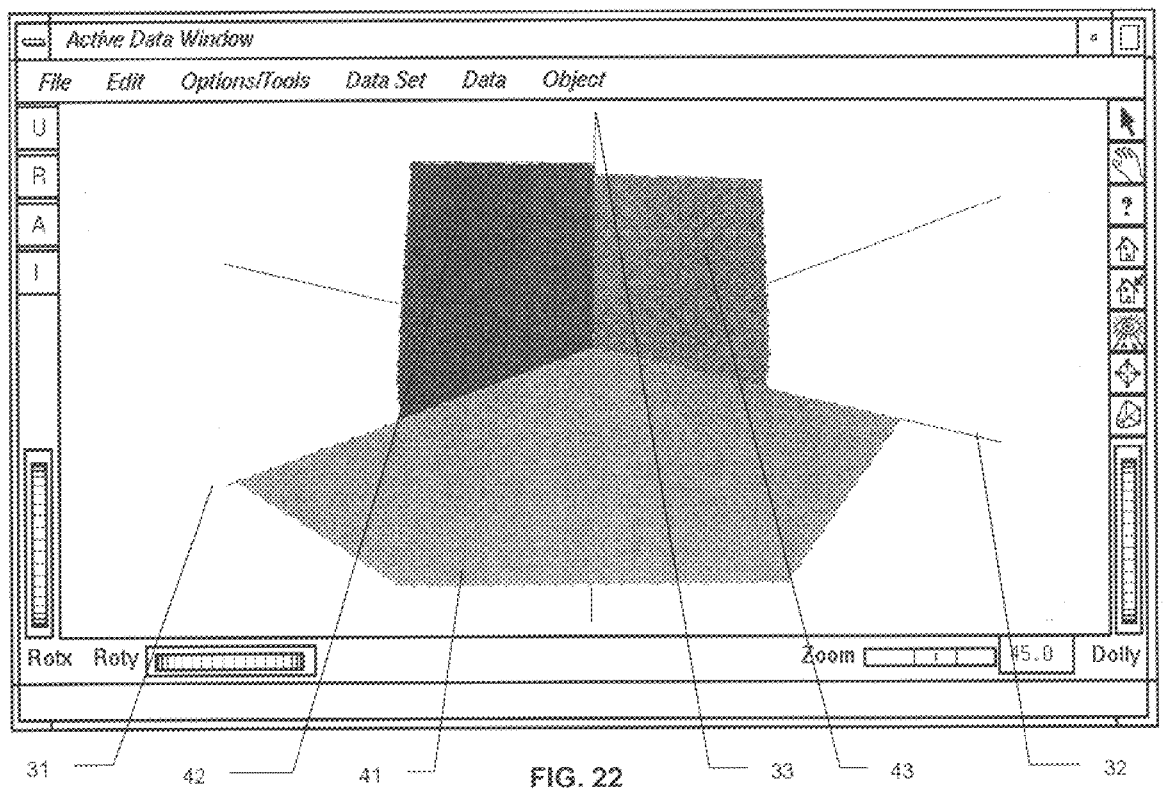

A user can indicate connectivity between geometric primitives by extending and intersecting those primitives. For example, with reference to FIGS. 20, 21, and 22, the user can generate the precise location of a corner point in a room by intersecting the planes representing two walls and a ceiling. In FIG. 20, the user has generated the floor plane 21 and two wall planes 22 and 23 using the geometry fitting techniques disclosed above. In FIG. 21, the CGP has generated the lines of intersection of pairs of these planes. For example, intersection line 31 is the geometric intersection computed mathematically from the intersection of lines 21 and 22. Similarly, lines 32 and 33 were generated by the intersection of pairs of planes 21, 23 and 22, 23 respectively. With reference to FIG. 22, the planes can then be extended to the lines of intersection by projecting the convex hull of a planar region onto the intersection line of that plane with another plane. For example, planes 21 and 22 of FIG. 21 are extended to line, 31 of FIG. 21 to generate planes 41 and 42 of FIG. 22.

Figure 23:
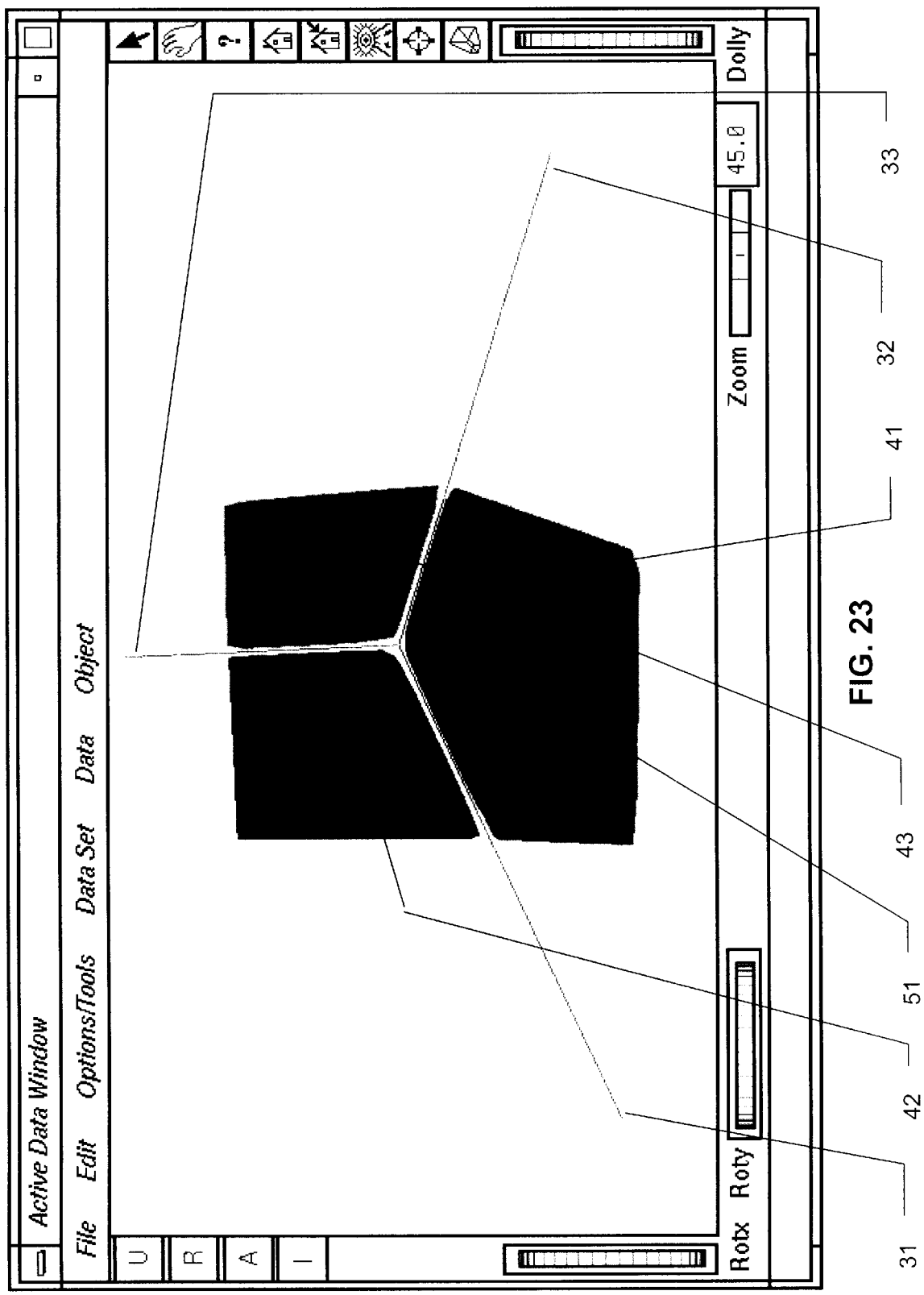

Since all steps in this process are deterministic and this operation is repeated frequently, the process can be integrated in a single tool requiring only one user interaction. With reference to FIG. 17, the automated corner tool takes a scan field 5, segments the points as disclosed above, fits three planes to the scan fields, merges them in their respective intersection lines, and thus defines the complete geometrical corner as shown in FIG. 23. Note that the only user interaction required was to define a scan field that covers just a single corner.

Figure 26:
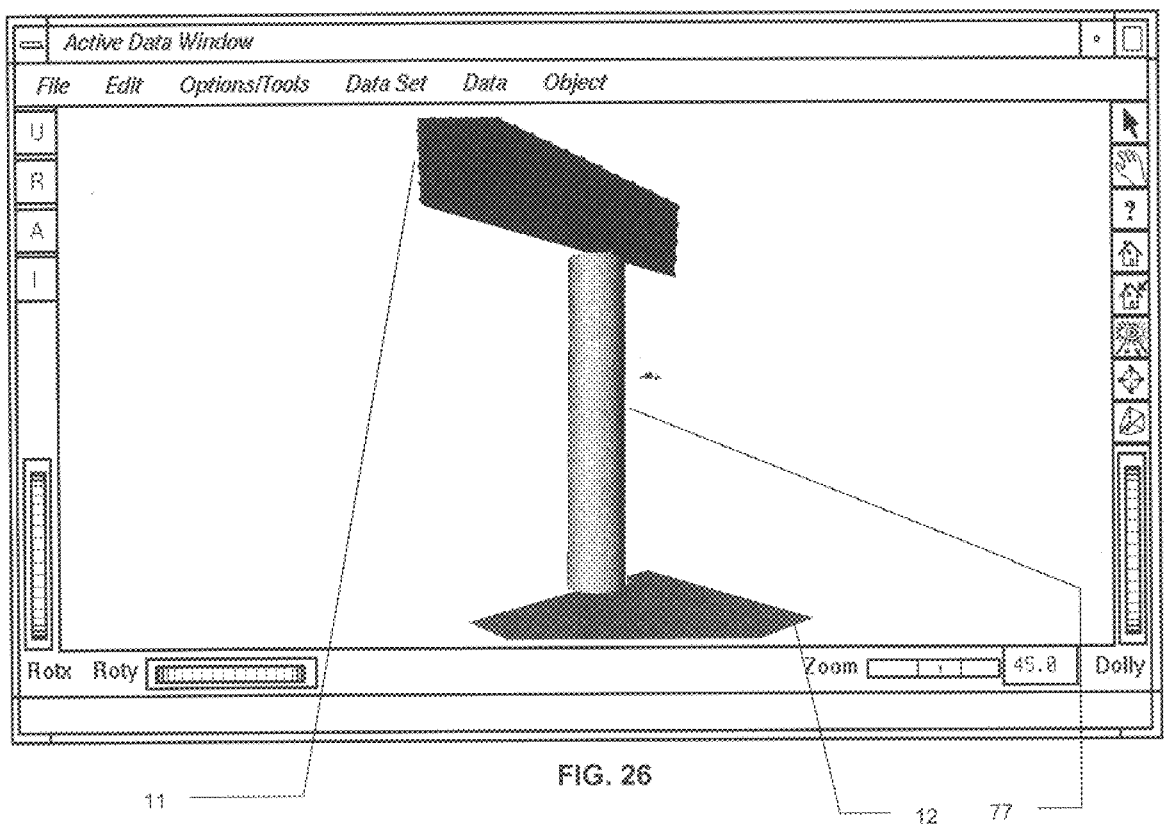
Figure 27:
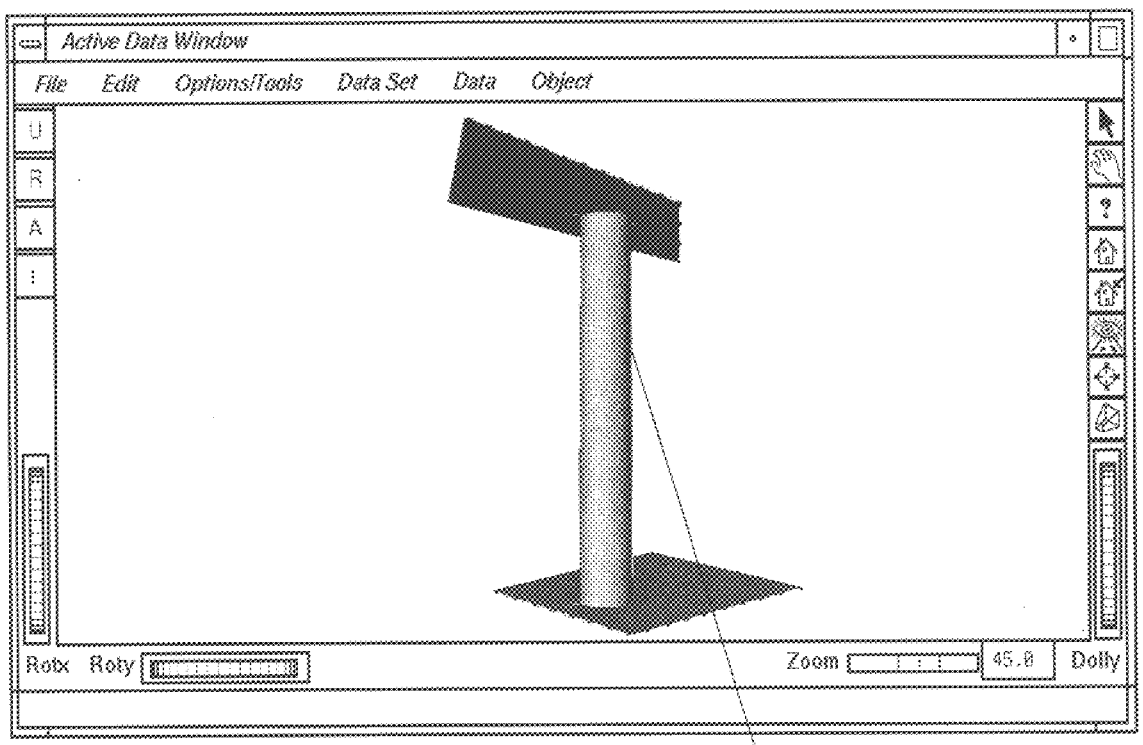
Figure 28:
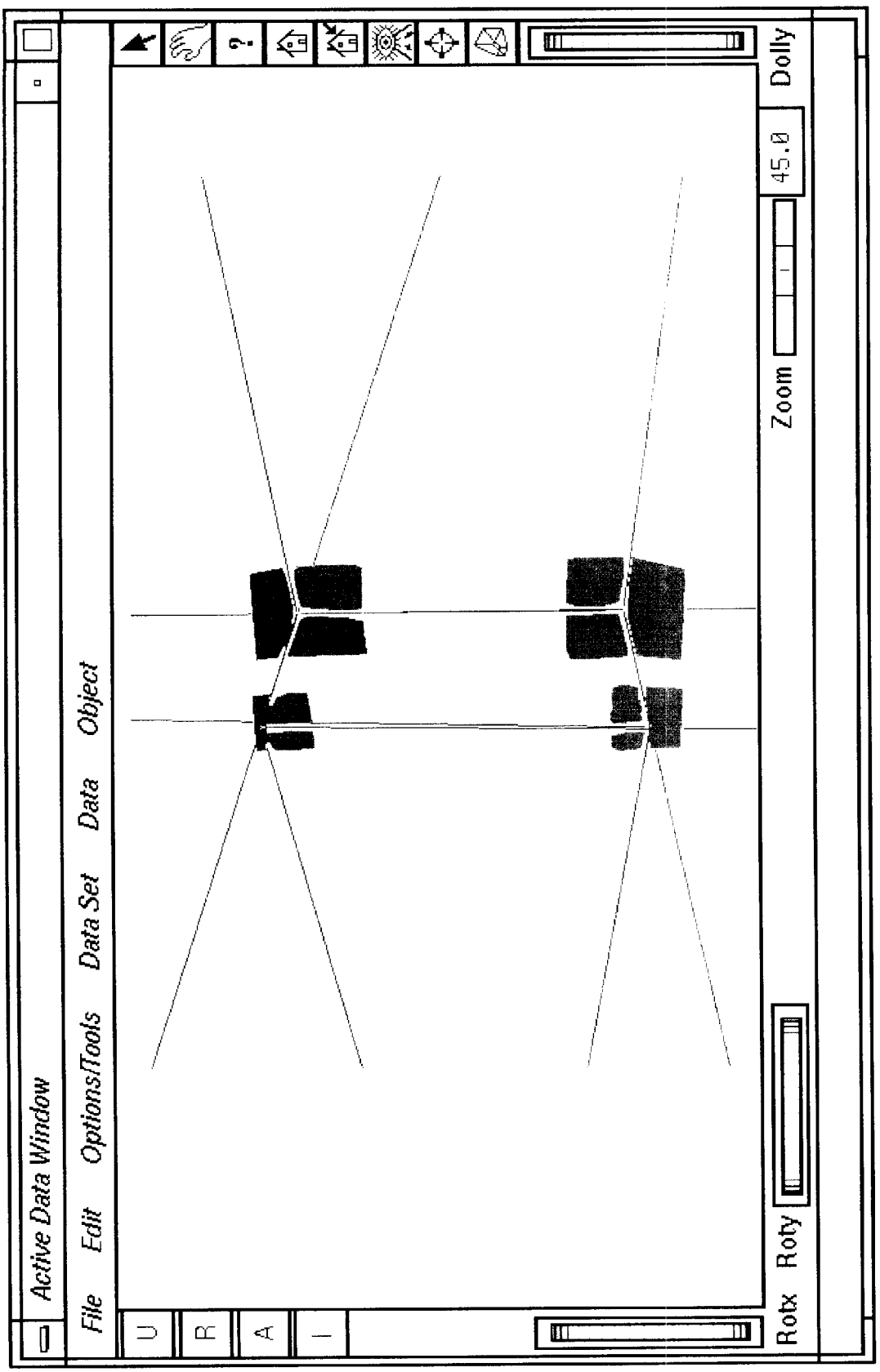
Figure 29:
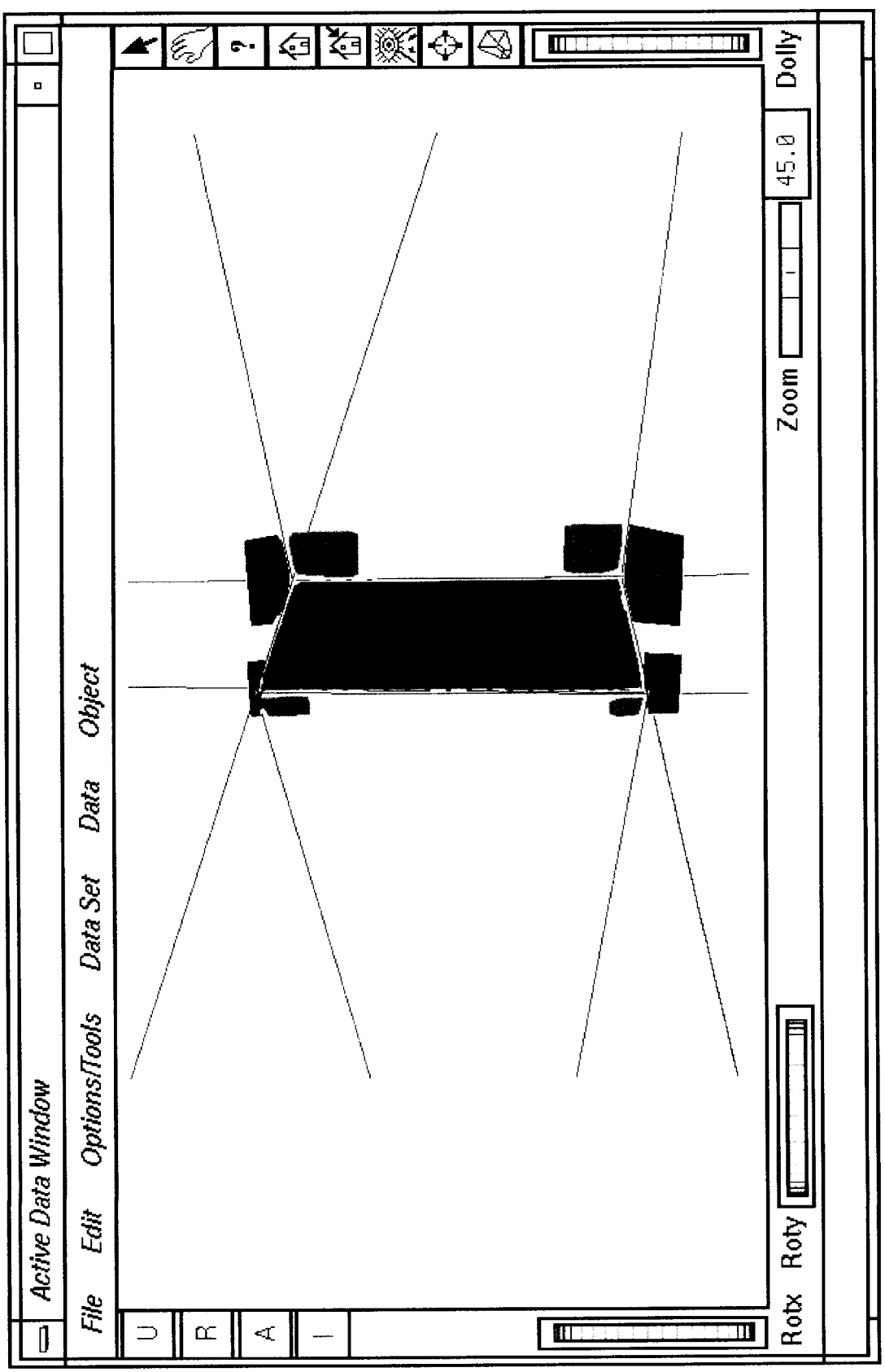
Figure 30:
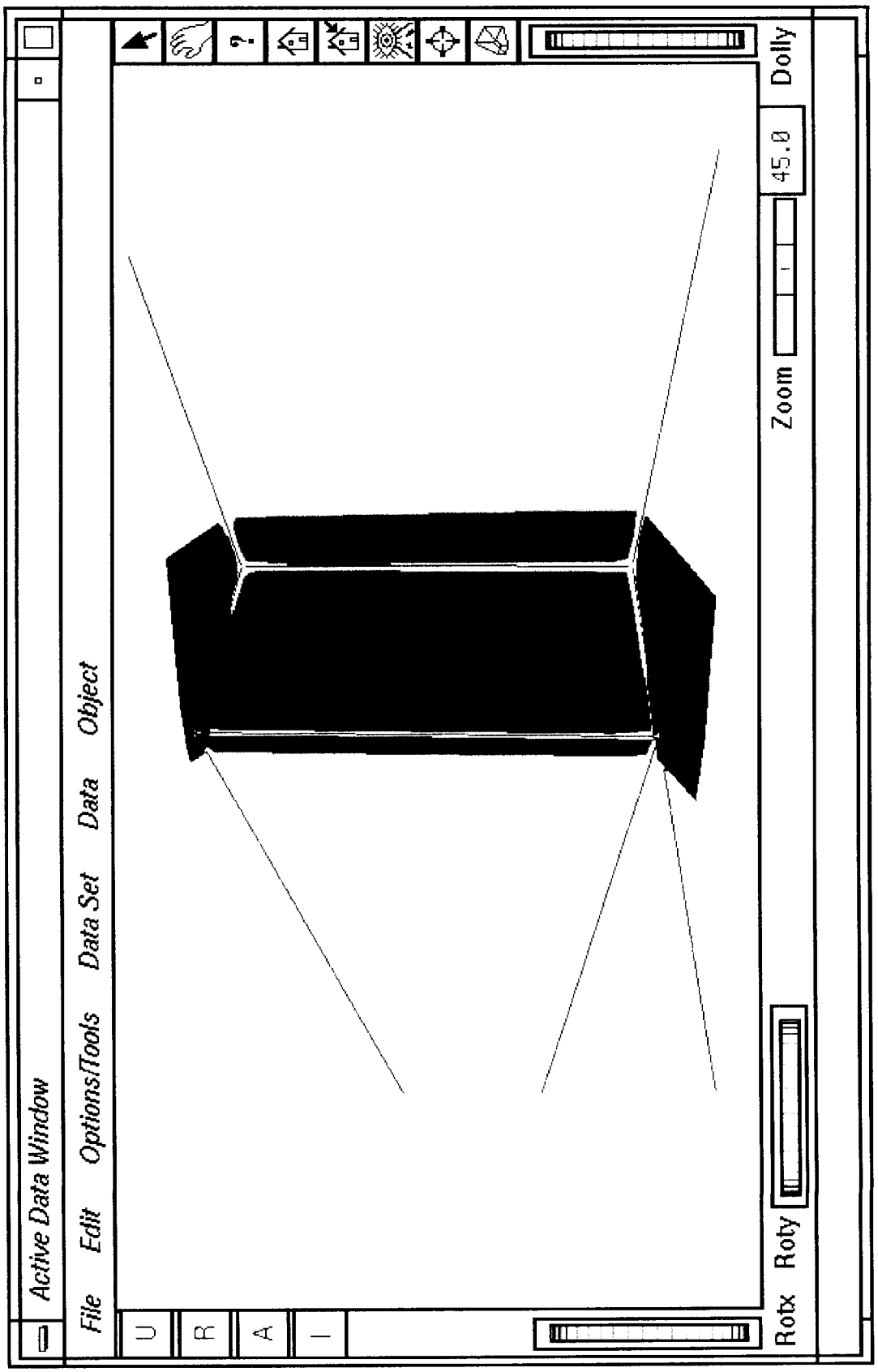

Similar merging and trimming operations are possible with other primitives such as cylinder, triangular meshes, or the planes shown in FIGS. 28, 29 and 30. In particular, cylinders can be extended as far as the intersection point of their axis with another primitive such as a plane. With respect to FIG. 26, the user can extend cylinder 20 as far as necessary so that its axis ends in the two planes 11 and 12. The result of this operation is indicated in FIG. 27 as cylinder 30. Similarly cylinders can be extended to a mutual point of intersection between their respective axes, or, if such an intersection point does not exist, the points of closest proximity between the two axes.

Figure 33:
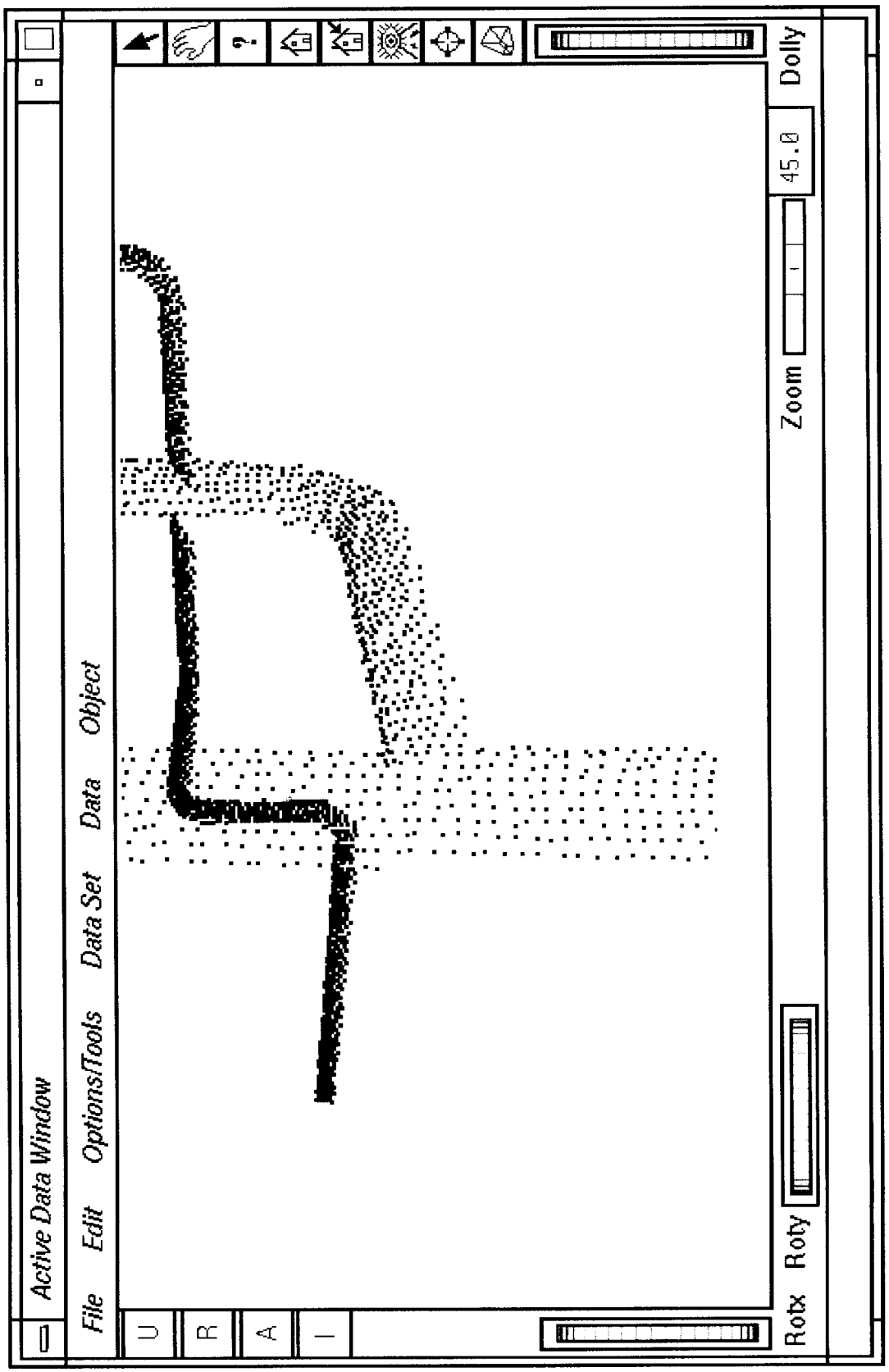
Figure 34:
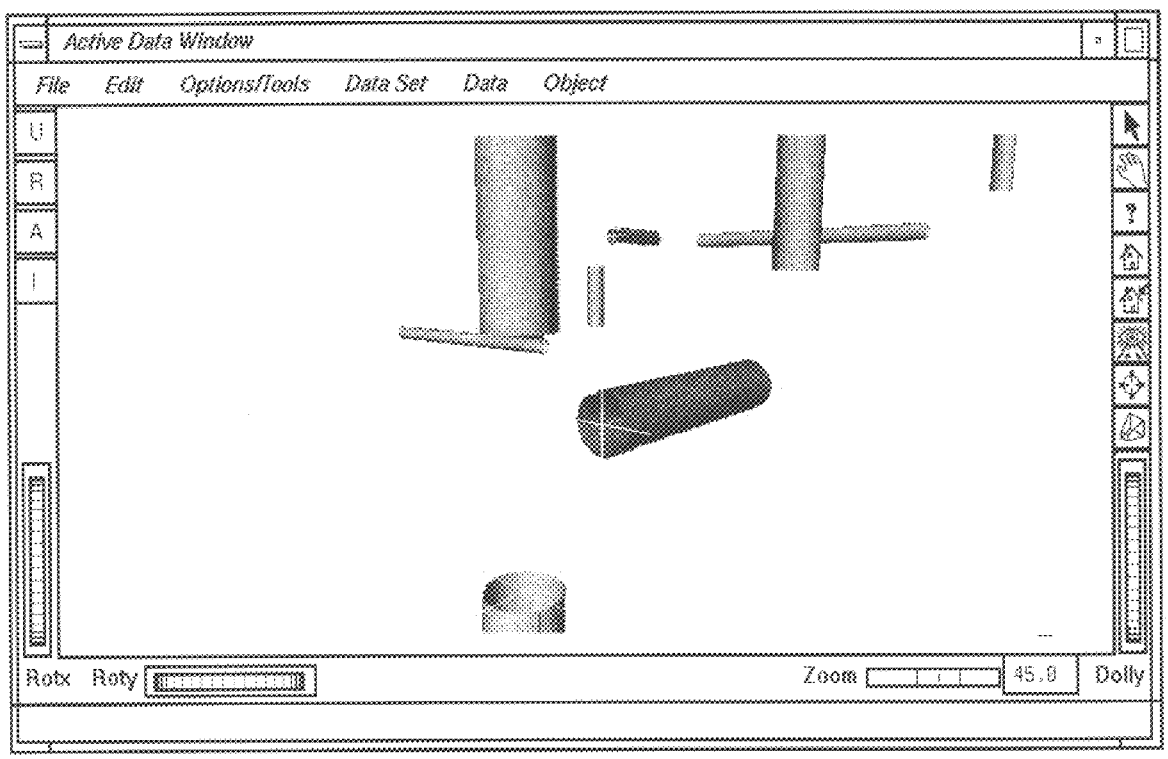
Figure 35:
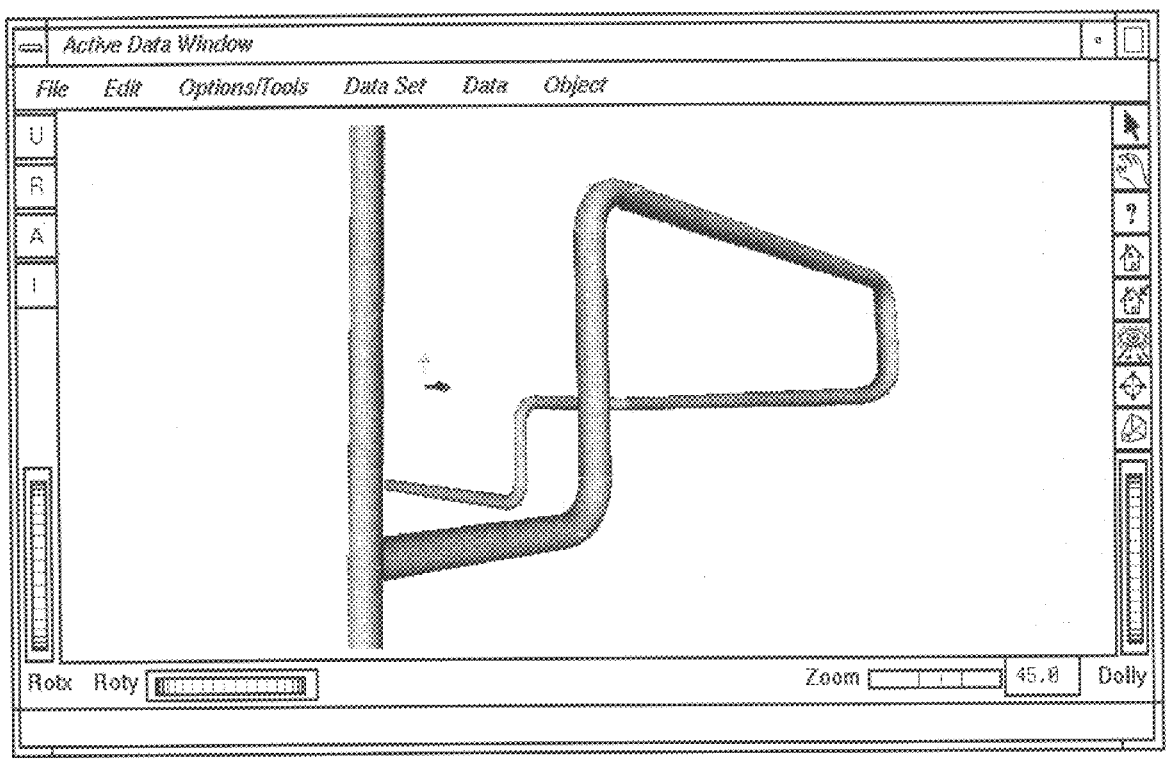

In addition the user can generate new connection primitives, e.g., rather than intersecting two pipe segments directly, they can be joined with a best-fitting elbow piece. As an example, FIG. 33 displays a scan field containing a collection of pipes and elbows joining those pipes. FIG. 34 demonstrates the best-fitting pipes generated by the user using segmentation and fitting techniques disclosed above. To generate an elbow, an arc of a specified radius is determined and fit between the two lines representing the axes of the two pipe segments (for examples, segments 20 and 21 of FIG. 34); a suitable piece of a torus is then constructed around this arc segment, and the two pipe segments are extended to join smoothly with the ends of this elbow part as shown in FIG. 35.

Scene Registration

Scan fields taken in the same field of view of the scanner are inherently registered with respect to the same shared 3D space. If, however, the FDV is moved between scanning operations, additional effort is required to construct a consistent, combined CAD model. Scan fields taken from different scanner positions must be registered based on suitable primitives viewed from both positions.

Two methods of scene registration are used within this invention. The first method is based on the fact that two views of the same object can be registered by matching three non-degenerate planes in each view. For example, if a particular corner of a room consisting of two walls and the ceiling is visible in two separate scans taken from different scanner positions, the two scenes can be positioned so as to align each of the wall and ceiling surfaces.

The second method uses overlapping regions of arbitrary surfaces and uses an iterative, global minimization technique to find the relative positioning parameters between the two views which minimize the distances between the surfaces of one view and those of the other as described in Turk and Levoy, "Zippered Polygon Meshes from Range Images", SIGGRAPH 1994.

After registration of the two scenes, primitives from the two individual views which represent the same physical object can be combined. In particular, matching patches belonging to the same planar surface can be combined into one extended planar patch, pieces of matching cylindrical surfaces can be combined into a single cylinder, and overlapping parts of meshes representing the same surface can be combined and smoothly joined into a single mesh using the algorithms disclosed in Turk and Levoy (referenced above).

Model Annotation

In order to compose a semantically rich CAD model, individual parts in the above geometrical model can be annotated with additional, possibly non-geometric, information such as material references, part numbers, and references to external databases and catalogues. This information can be entered manually by the user or alternatively can be generated automatically by using the scanner to read suitable bar code or character information from the real world object being scanned.

Because this additional information is stored in an external database, the user may click on an individual part in the geometrical model and recover such additional information through other windows. Similarly, queries may be made of the database requesting all parts which meet some selection criteria to be highlighted.

Geometry Display and Query

Access to the geometrical CAD model is available to the user through an interactive state-of-the-art computer graphics renderer. Among the capabilities of this renderer is the ability to manipulate the CAD model using standard graphical interaction techniques such as a crystal ball interface or interactive fly-through. Additionally, the user may choose to selectively view certain portions of the model either by placing objects in separate 'layers' and viewing only selected layers, limiting the geometrical extent with clipping planes, or choosing to view symbolic abstractions of certain geometrical parts such as the isometric center lines of cylindrical pipes.

Geometric attributes of the model may be extracted in an interactive manner. Coordinates of individual points, distances between geometric primitives, and angles between the normals of different facets are readily available to the user.

The resulting model can be uploaded to any of a number of CAD programs for further editing or design.

SUMMARY OF PROPOSED CGP SPECIFICATIONS

Smart Element Capabilities

1. Geometry is represented initially as a cloud of points; later as a mesh, as a detailed model copied from a library or catalog, or as simplified model generated interactively.

2. This geometry can be enhanced with color, intensity, texture, or even video information which gets added to the individual surfaces of the element.

3. There may be more than one representation for each element: First there may be several geometrical proxies of various levels of simplification or abstractions which can be chosen to make rendering more efficient and the produced views less cluttered.

Furthermore there can be symbolic representations for schematic renderings such as floorplans, elevations, or isometric pipe drawings.

There may even be smart models suitable for certain types of simulations.

4. Elements can be provided with tags or "layer" information for classification purposes. When constructing a model of a plant or of a refinery, the user may choose tags from previously defined hierarchical menus; e.g., the choices at a first level night be:

Supporting Structure—Maintenance Gangways—Pipe Systems—Other . . .

And at a second level within the category "Pipe Systems" we might find:

Steam—Water—Gas—Oil—Alcohol . . .

5. Arbitrary textual information can be attached to each element via a text window. This may contain summary information from a catalog or notes concerning the modeling.

6. Elements can be linked to other information contained in external databases, such as the type of a valve or pump, its ratings, its manufacturer, its maintenance schedule. This information in the external database may be in the form of a hyperlinked database.

It is viewed and browsed in the context of the viewer for that database.

7. It might be useful to have some explicit connectivity information. While logical connectivity between pipes or electrical wiring may be outside the initial charter of the CGP and could be extracted later from the implicit geometrical near-coincidences of certain elements, it might be worthwhile saving such adjacency information when it is first discovered. E.g., when a connected mesh is decomposed into several elements, say a pump and a pipe and a valve, then the cut lines in the initial mesh could be used to establish some explicit contact information between the parts that share these cut lines. This information will make it later much more efficient to find and extract a run of connected pipe elements.

FUNCTIONALITY OF THE OVERALL SYSTEM

Management Tools

1. At the "OS"-level, the system provides the capabilities to control the scan management and the video gathering. Later we may provide a user interface to provide more selective ways of indicating the areas that need to be scanned: one option is the "thick-brush" paradigm in which the user outlines the features that should be incorporated in the model; the system then goes and finds the corresponding features in the world and automatically selects a suitable scan region for the chosen edge, pipe, or I-beam.

2. Also at the OS level, the system provides the capabilities for efficient multi-tasking, so that several windows can be opened simultaneously, providing views into one or more catalogs or databases, while a scanning process or a modeling operation are under way.

3. There will be data management facilities for the scanned point sets and for any collected video images; as well as ways to label them and file them away for archival purposes.

Modeling Tools

4. At the "pure geometry" level, basic tools permit selection of subsets of the scanned points and enable manual segmentation. Meshes can be fit over the scanned points, and heuristically disconnected at possible horizon lines where there are sudden dramatic changes in the depth coordinates. If necessary, these meshes can be simplified. Planar polygons can be fit to selected portions of these meshes or to subsets of the original scanned points. Survey points can be established; lines can be drawn between them; and breaklines can be established between polygons or portions of a mesh.

5. At the "discrete element" level, tools permit collections of pure geometry parts to be lumped together and named as an element which can then be provided with additional information. Sections of a mesh could be replaced with models from a catalog or library or with a symbolic geometrical proxy. Backsides of such models may have to be intelligently added, out-lier points removed, and the model generally cleaned-up and subjected to some consistency tests.

6. These elements can be provided with color, intensity, texture, or texture map information. Other attributes can be assigned to these objects, and various kind of linkages can be established.

7. Sets of objects can be selected interactively and grouped hierarchically.

8. View integration is provided between views taken from different camera positions:

Pairwise view alignment based on registration features or based on an optimization process that tries to register the overlapping portions of two meshes by minimizing their mutual distances.

Data merging by weighted averaging of position parameters of discrete elements or by zippering together two overlapping mesh sections.

Establishing global closure by smartly distributing the closure error over previously established pairwise view registrations.

This is a hard problem that needs to be thought about carefully.

Visualization

9. At any time during the data gathering or modeling process, the existing Geometrical data can be viewed interactively either in a "crystal-ball/model-in-hand" paradigm or in a "walk-through" mode. At a later time we will add the proper spatial data structures and management schemes to make walk-through possible at interactive speeds even if the model is very large (more than 1,000,000 polygons).

10. Different modes of rendering the data will be provided: point clouds—wire frame-hidden lines removed, showing unshaded but outlined visible faces—flat-shaded facets—Gouraud-smooth-shaded meshes.

11. There will be schematic and symbolic representations such as floor plans and elevations which may use 2D proxies for various components to make the result more efficient and more effective. There may be center-line representations for pipes, or symbolic moment frame grids for steel structures. There may also be Pipe-ISO drawings and perhaps P&ID process drawings.

Database Queries

12. Geometrical information can be extracted from the model at any time. Cut sections can be created, and distances between two points or angles between to planes can be extracted.

13. By selecting discrete elements in a particular manner (e.g., double clicking it) the attribute information associated with that elements can be fetched from the database. If this information is large and organized in a hyperlinked document format, then the corresponding database browser will be opened and the root page for this object will be presented.

Data Exchange with Other Systems

14. Data generated within the CYRAX CGP can be exported in an ASCII text format in the form of ".crx" files. The crx format should be able to encode all information that is self-contained within a CYRAX model. This should allow sophisticated users to build external programs that can search CYRAX models for specialized analyses (such as counting all elements of a particular type) or to make global modifications to such a model (e.g., replace all I-beams of a particular type) without the need to go through any other database system.

15. We will provide some converters for popular existing databases such as AutoCAD or MicroStation which will properly insert the information contained in the .crx data stream into these databases. Conversely we will also provide some converters that will extract geometric information relevant to the CYRAX CGP and bring it into our own modeling environment.

16. Initially we do not plan to provide a complete smart product model database in which all additional information associated with any discrete model element can be stored; we will rely on the users of CYRAX to use their own established data storage facilities. We will, however, provide facilities to gain access to such databases via a separate window opened at the OS level. Links between non-CYRAX data items can then be established directly within these external databases between the geometrical representation of a model part and any other entries in the database that seem relevant.

User Interface Paradigms

17. We plan to provide a nice window-based user interface that emulates (as much as seems reasonable) the established interaction culture in MicroStation and AutoCAD. This implies the use of icon-palettes, pull-down menus, as well as keyboard shortcuts.

18. In the domain of graphical editing we will provide "Snap-Dragging" behavior to combine precision and speed in a an efficient and user-friendly manner.

19. For some application domains we will develop specific "Object Associations" that will provide behavioral heuristics that will minimize the number of mouse clicks a user has to make to accomplish a particular objective or the number of degrees of freedom the user has to control explicitly in any modeling operation. We expect that the higher symbolic levels of representation of a smart product model will offer interesting challenges how the entry of complex information can be made as simple as possible.

Product Overview

Cyra Technologies' Field Digital Vision (FDV) unit provides portable, rapid, and accurate laser range scanning technology in the field. The FDV, like a three-dimensional camera, is pointed at a target which it then scans to generate a range image. A range image is like a digital photographic image except that each pixel of the image is a point in space rather than a colored two-dimensional point. The FDV permits a user to rapidly gather three-dimensional data about an object by gathering thousands of points from that object.

Such data is the starting point for a multitude of modelling, design, and documentation tasks. The Computer Graphics Perception (CGP) software kit provides the functionality necessary to convert collections of range images into three-dimensional, intelligent models. These models can be generated by surveyors as the FDV generates the range images or can be Generated in the office by CAD operators from gathered data. Because of the wide range of modelling tasks. Requirements, and paradigms within the various three-dimensional modelling communities, the CGP is designed to support a general framework which can be integrated easily with standard CAD tools, facility management software, and intelligent modelling environments.

The functionality of the CGP takes you from range image to complete, annotated, intelligent models. The structure, detail, and content of the resulting model is under the complete control of the user allowing the generation of ten minute rapid visualization models to multi-layer, intelligent facility documentation models. The various forms of modelling available integrate easily and consistently to permit highly detailed and annotated submodels of interest to coexist with low resolution, automatically generated shrink-wrap models of 'context' structures intended only to aid in visualization.

Framework

Figure 39:
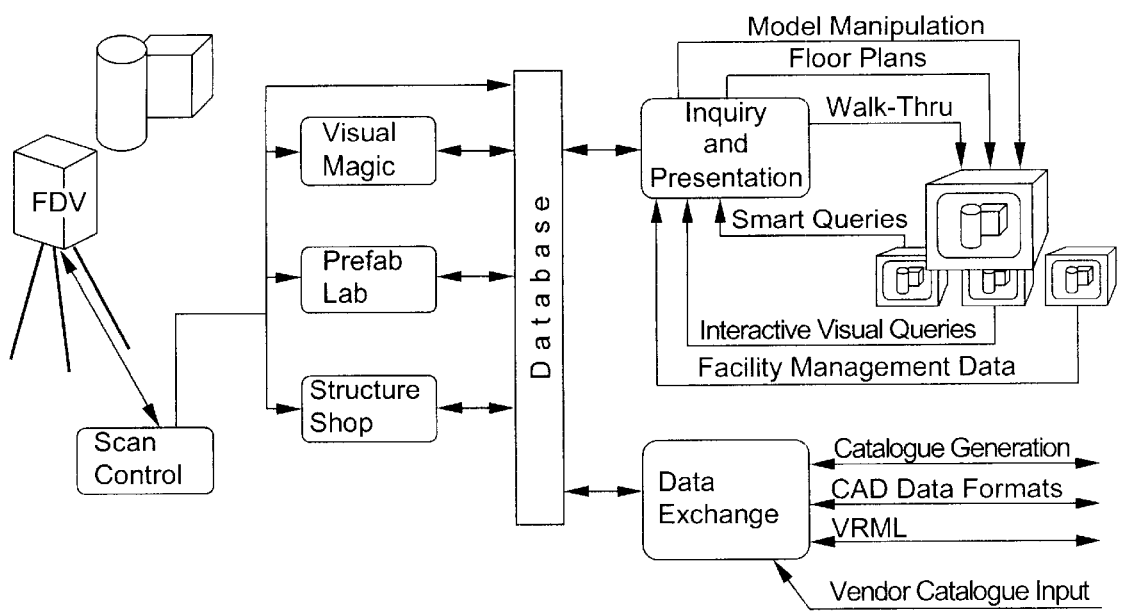
FIG. 39 is a schematic diagram illustrating the framework of the computer graphics perception software utilized in the subject invention.

The CGP is structured around a database (FIG. 39). The data stored in the database can come from a variety sources including raw range scans and video images generated by the FDV, geometric entities generated by the CGP modelling process, geometric entities and associated product information imported from catalogues, and annotation data such as facility maintenance information. Data within the database is classified as either 'internal' or external' data depending upon whether the content of the data is meaningful to the CGP system. Internal data such as geometry, scan points, and geometric annotations is used directly by the CGP is general purpose data required to meet the modelling needs of a wide range of user communities. External data stored in the database has meaning only in the context of general database queries or external, application specific software. Examples of external data include the date a pump in a chemical plant was serviced, the manufacturer of a particular part, or a pointer to the home page of the designer of an architectural subsystem. While internal data can reference external data elements, the CGP has no way to understand, manipulate, or present this data and must rely on external queries and external packages to make use of it. A more complete description of this concept is presented in the section "Intelligent Modeling".

The process of converting range data into three-dimensional models. Typically termed reality acquisition, appears on the left side of the database in FIG. 39. To the right of the database can be found two types of tasks: those involving the presentation of the data to a user community (which can range from a single person to every department in a chemical plant) and those involving the import and export of geometric data from and to other sources. These tasks are not specific to the use of the FDV and do not involve geometry construction and manipulation by the user.

The reality acquisition process subdivides into two processes: scanning and modelling. The CGP provides all of the necessary controls to operate the FDV scanner to gather video images and range scans both of which are archived in the database. Control over the amount of data gathered, the resolution of that data, and the exact region to be scanned is provided to the user through the Scan Control tools.

Three toolkits are provided by the CGP to develop range scans into geometric models depending upon the type of model desired and the contents of the scene being modelled. Each toolkit is optimized for a particular style of geometric modelling and thus the use of different toolkits for different portions of the modelling task is expected. The Visual Magic toolkit provides rapid mesh generation functionality for general purpose model construction of complex objects or scenes. The Prefab Lab provides mechanisms for replacing range and mesh data with prefabricated parts whose models are input from external catalogues or are instantiations of objects generated using the CGP. The Structure Shop provides point, line, and plane primitives and various Euclidean operations on these primitives useful for the construction of basic structural geometry such as architectural structures. As will be described in depth in the section on "Object Types", provisions for interoperability between the three section on toolkits permit users of the system to select which ever toolkit seems appropriate for a given task and then to integrate the results of the different toolkits into a single coherent model.

The Inquiry and Presentation system is a visual front-end to the database which allows users to view, query, and augment the external data within the database. The user will have the ability to walk through generated models and subsystems. visualize portions of the database, or generate basic structural diagrams. External information such as maintenance plans, subsystem names, and references to other databases can be associated with objects in the CGP database. This data can be queried, retrieved, and updated by a user community throughout the lifecycle of the real world system which the database represents.

The Data Exchange system permits the CGP to be coupled to existing CAD systems. This coupling comes in the form of data conversion routines to and from various CAD formats. Vendor part catalogues which have not been generated using the FDV and CGP can be imported into the system for use in the Prefab Lab. A part which needs to be redesigned can be exported from the CGP database to AutoCAD or other CAD packages to be reworked and then imported back into the CGP database.

The various systems and toolkits of FIG. 39 are tightly integrated into a single coherent system from the perspective of the user. The user operates in the visual window-icon-mouse-and-pointer environment and moves from module to module simply by pulling down a different menu or accessing a different tool bar. Most operations do not require keyboard input or arcane command line arguments typical in many CAD systems; rather, the user models geometry by selecting commands from a small but powerful tool set and clicking on the objects upon which he wishes these commands to operate. Visual interactivity is key to the field usability of the system and thus a focal point in the development of the CGP.

Document Overview

The remainder of this document is a high level specification of the CGP in the form of a user-oriented functionality guide to the system. This format is concise yet descriptive but should not be mistaken for a complete requirements specification (which would contain performance details, error handling issues, and other details which would be premature at the time of this writing). Similarly, although many functions will be described in terms of what the user will do to perform an operation ("The user clicks on a point set and then clicks on the plane tool to generate a plane from the set of points."), this should not be mistaken for a specification of a fixed user-interface. Rather, this description is nothing more than a simple way of clearly describing an operation (the Point-Set-to-Plane operation in this case) which will be available through some user-interface mechanism. User studies, user-interface prototyping, and ultimately a user-interface specification will precede determining the best manner by which a piece of available functionality will be accessed by a user.

The document is divided into sections based upon the system framework of FIG. 39. Each subsystem and toolkit is described by way of the functionality which it provides and the type of data it receives and generates. Indications are made throughout the document as to where expanded functionality will be added which exceeds the scope of the first generation system. These indications are intended to clarify the structure of the first generation system, provide an understanding of extensibility requirements which must be built into the first generation system, and indicate the vision of the complete system which will be developed over the next three years.

Scan Control

Interaction with the FDV is performed using the Scan Control functionality of the CGP. The FDV can capture both video and range data and present this data to the CGP. The CGP is responsible for providing the FDV with information about the location and resolution of the scan to be taken. The FDV uses a novel video based targeting method which permits the accurate targeting of small objects at large distances and the CGP provides access to this method. The Scan Control mechanisms strongly support the visual interactivity and point-and-click operation paradigms which underly the usage model of the full system.

Video Capture

Pressing the video capture tool button causes an RGB image of the scene from the FDV's standard video camera to be transferred into the CGP and displayed in the targeting, window. A video image may be named, annotated, and stored in the database at the request of the user. A video image may be associated with a set of range scans (see Range-Video Association below).

Zoom Capture

The zoom capture tool is available to the user when a standard RGB image of a scene is present in the targeting window. Clicking on the zoom capture tool and then clicking at a point on the image in the targeting window causes the FDV to capture and display a bore sighted zoom image taken in the direction of the point indicated. The bore sighted video image may be named, annotated, stored in the database, and associated with a set of range scans in the same manner as can a standard video image. An Unzoom tool permits the user to return to the standard view.

Video Image Browser

A video image browser permits the user to search for an image in the database by flipping through thumbnails of video images. All of the range scans associated with a video image can be highlighted or selected, or the user can set the viewing point of a model viewer to be the position from which a video image was taken.

The video image browser will ultimately become part of the full featured query interface for the smart modelling system. Queries such as "find all of the range scans associated with this image" or "find all of the video images taken on Dec. 12, 1995" will be part of a general purpose visual database query unit. The special purpose queries listed above provide a starting point in this direction.

Scanning

The scanning tool is available to the user whenever a video image (standard or zoom) is present in the targeting, window. The user indicates a scan by dragging out an axis aligned box on the video image in the targeting window. The FDV will generate a range scan from the region of space indicated.

A range scan is an axis aligned, approximately rectangular grid of depth information. Slight errors in mirror positioning in the FDV prevent an exactly rectangular grid. A range scan has an X and a Y resolution indicating the number of points scanned in each of these directions. The X and Y resolution may be set by the user in terms of the number of points or the distance between points for some fixed distance.

Each grid point in the range scan is associated with a three-dimensional Cartesian point and an intensity value measuring the laser intensity response at that point. The combination of a three-dimensional Cartesian point and a laser intensity value defines a scan point. A range scan, by definition, is an array of scan points ordered by rows and columns. A range scan may also contain flagged invalid points where the scanner failed to acquire an actual scan point.

Range scans are automatically inserted into the working database. They may be named and annotated manually.

Range-Video Image Association

Typically, range scans are automatically associated with the video image used for targeting that scan. By default, when a range scan is taken, the associated video image (either standard or zoom) is stored to the database (if it has not been stored previously) and an association between the video image and the range scan is made. This association can be used to access a picture of a region scanned or to isolate the scans taken from a given location.

Real-time Scan Display

Scan points being acquired by the FDV may be viewed (see Model Display) in any active data world view while the scan is taking place. These points are not for any operation other than display until the scan is complete.

Scan Cancellation

A scan cancellation tool is available while the FDV is generating a range scan. This feature terminates the collection of scan points. The incomplete range scan taken up to this point is inserted in the database.

Visual Magic

The Visual Magic (VM) toolkit provides rapid visualization tools for converting scan points into triangular mesh models of a scene with minimal user interaction. The focus of the operations in the VM toolkit is to provide extremely general functionality capable of modelling any object. Unlike with the Prefab Lab and the Structure Shop described below, the VM toolkit has no notion of primitives beyond that of the triangular mesh. This permits a wide variety of robust operations to be performed on a single, general purpose data types. Any geometric surface in the CGP can be converted into a triangular mesh and opera ted upon u sing the Visual Magic tool set.

Range Scan to Gridded Mesh

The Range Scan to Gridded Mesh tool provides the simplest way to generate a model using the FDV. Upon acquiring a range scan, the user can select that scan and click Range Scan to Gridded Mesh to generate a triangular mesh from that scan. The generated mesh is triangulated based upon the rectangular gridding of the scan. The gridded mesh is differentiated from a non-gridded mesh which was not generated directly from a range scan. A gridded mesh maintains information about the location of the scanner and the row and column ordering of its points. Invalid points are not included in the mesh and triangles whose size exceeds a user specified parameter are also excluded. The range scan is replaced in the database with the mesh. Meshes can be viewed in a number of waves including wire-frame Gourand shaded, and as a hidden line drawing (see Model Display).

Gridded Mesh Simplification

Gridded meshes may be simplified by removing triangles in regions which are essentially planar. The user can select a gridded mesh and click on this tool to remove as many triangles as appropriate given a user specified parameter for the maximum error to be in induced into the mesh. The original gridded mesh is replace with the simplified gridded mesh in the database.

Gridded Mesh Smoothing

An entire gridded mesh or regions within a gridded mesh may be smoothed by averaging the range depth of each point with its neighbors. The type of averaging (Gaussian. simple average. etc) and the size of the neighborhood to averaged over is specified by the user. Smoothing can be limited to a particular region by selecting a polygonal region of the mesh prior to selecting this tool. The original mesh is replaced with the smoothed mesh in the database. Multiple smoothing iterations can be performed on the mesh or region by repeated activation of this tool.

Mesh Alignment

Two meshes (gridded or non-gridded) which have been approximately aligned manually (see Freehand Rotate, Freehand Translate. and Move to Attach) can be aligned more precisely using the Mesh Alignment tool. The first mesh indicated is the anchor mesh and does not move. The second mesh is adjusted to achieve a greater alignment between the two meshes in the regions where the two meshes overlap. The original meshes are maintained in the database with the global transformation matrix of the second mesh altered. This step would typically precede a Mesh Zippering step but might also be used to register two scenes (determine their relative positions in world space) generated with the Structure Shop or Prefab Lab taken from different but overlapping viewpoints. In the latter case, non-mesh geometric primitives would be temporarily converted to meshes (see Object Polymorphism) to perform the alignment operation.

Mesh Zippering

Two meshes (gridded or non-gridded) may be merged into a single mesh using the Mesh Zippering tool. The resulting mesh is always non-gridded. Mesh zippering sews together regions of overlap between two meshes whenever the distance between the overlap is less than some user specified threshold. Typically this operation is preceded by a mesh alignment. The two original meshes are replaced by the joined, non-gridded mesh.

Cut Mesh with Mesh

A mesh may be cut with another mesh by using the Cut Mesh with Mesh tool. Both meshes can be either gridded or non-gridded. The first mesh selected is the a mesh to be cut. The second mesh is the cutting mesh and will not be chanted by the operation. The lines of intersection of the two meshes is computed and the cut mesh is divided alone, the line of intersection. Additional points are inserted into the cut mesh as necessary to give a smooth intersection (no gaps) with the cutting mesh. The cut mesh is replaced in the database with some number of non-gridded meshes representing the various components into which the cut mesh was sliced. This operation would typically be followed by the deletion of some number of the cut components and would permit the clean intersection, for example, of a mesh representing a pipe at a skewed angle with a wall or other more complicated object. The combination of this operation with Object Polymorphism (see below) is extremely powerful.

Mesh/Mesh Mutual Cut

Figure 40:
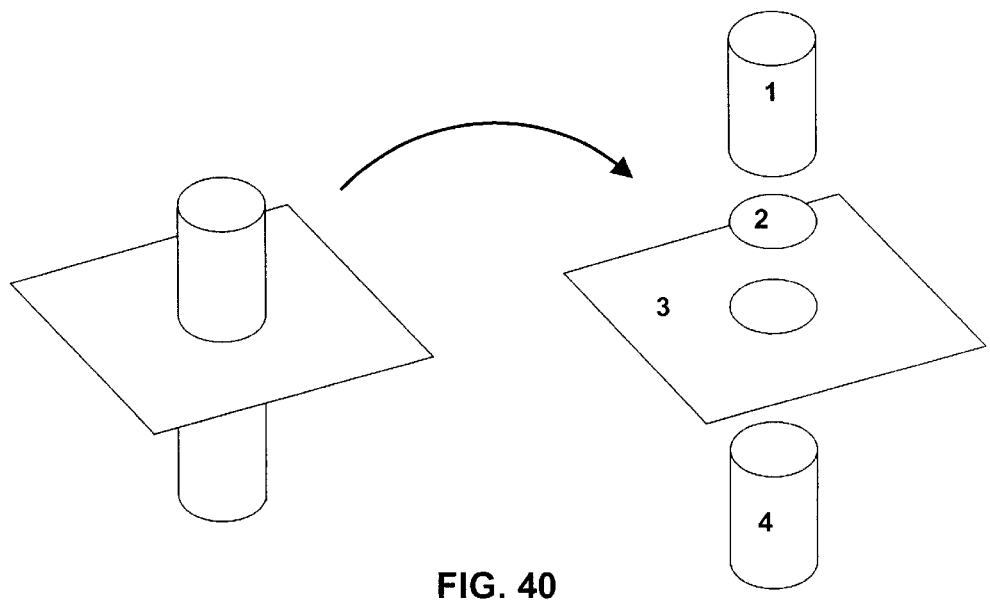
FIG. 40 is a diagram illustrating the mesh/mesh mutual cut operation used in the visual magic tool kit software of the subject invention.

This operation is identical to the Cut Mesh with Mesh operation above except that both meshes cut each other and are replaced by their components as non-gridded meshes. Thus performing this operation on the mesh of a cylinder intersected perpendicular to its axis by a meshed plane (FIG. 40) would result in four separate components.

Trim Mesh Overlap

When two meshes overlap, it may be desirable to leave one mesh intact while trimming the other mesh to join it seamlessly. The Trim Mesh Overlap tool performs this operation by cutting the trimmed mesh at regions where overlap begins (within some user specified distance), discarding the overlapping portions of the trimmed mesh, and adding vertices as necessary to form a seamless join to a static mesh. The two input meshes can be either gridded or non-gridded. The static mesh remains in the database unchanged. The trimmed mesh is divided into one or more component meshes which are always non-gridded. This tool combined with Object Polymorphism (described below) permits the replacement of parts of a mesh with prefabricated objects (from the Prefab Lab below) while maintaining visual connectivity of the various parts in a scene.

Non-Gridded Mesh Simplification/Optimization

Mesh simplification of non-gridded meshes is a computationally expensive task being studied at a number of major research institutions. The CGP will, in future generations, provide some of the functionality derived from the research efforts in this field.

Prefab Lab

The Prefab Lab (PL) toolkit provides for the integration of preconstructed submodels into a scanned scene. These submodels can be Generated within the PL toolkit. imported from external catalogues or CAD programs, or constructed from parts generated using other toolkits.

Concepts: Grouped Objects and Prototypes

The Prefab Lab supports two notions which play a key role in the construction and use of intelligent models: the grouped object and the prototype. A grouped object is simply a collection of geometric primitives or other grouped objects which act as a single entity. This is conceptually equivalent to the grouping of objects in most drawing programs. Grouped objects exist in the same coordinate space and act as a rigid object. Operations performed on the group are performed on all objects within that group.

A prototype is a class of object which exists outside of a geometric scene for the primary purpose of instantiating that object within the scene. A prototype may be formed from either a single Geometric primitive or a grouped object. A prototype is essentially a 'meta-object' which stores general information about all instantiations of that prototype. Instantiations of a prototype are called parts. An example will help to clarify.

A person generating a model of his kitchen constructs a three-dimensional mesh model of a chair. Using the Visual Magic toolkit he Generates separate meshes for each of the legs of the chair and the seat. To avoid scanning each of the four legs. he generates a model of one leg and then uses copy and past tools to place the object in the scene four times. At this point, he decides to change the color of the legs of the chair to blue. If he changes the color of one leg, will all of the legs change color? This depends upon whether or not the legs are parts, that is, instantiations of a prototype (in which case, they share information such as color) or simply copies of an object (in which case, there is no stored relationship between the legs). A prototype stored in the database may not be instantiated anywhere within a scene. It has an existence beyond its appearance in an active database. An object, however, is entirely self-contained as an entity in a scene. Removing an object from a scene removes it from the database.

Group/Ungroup

The Group tool takes a set of one or more objects or parts and generates a new grouped object which is a hierarchical collection of these input objects. The grouped object may be generated from geometric primitives, parts, or other grouped objects. The entities from which a grouped object were formed are replaced in the database by the new grouped object. The Ungroup tool removes a grouped object from the database and replaces it with instantiations of its components Cut/Copy/Paste The Cut tool allows the user to delete one or more objects or parts from a scene for later Paste operations. The entity is removed from the active database and stored in the Copy/Cut buffer. The Copy tool is identical to the Cut tool except that the original object or part is not removed from the active database. The Copy/Cut buffer is a single level buffer which stores only the last entity cut or copied.

The Paste tool places the entity in the Copy/Cut buffer into the active database. If the entity in the Copy/Cut buffer is a part, a new part is created in the active database. If the entity in the Copy/Cut buffer is an object, a duplicate of this object is copied into the active database.

A single Copy/Cut buffer exists across all databases during a session so that the entities can be cut and paste from one database to another. The Copy/Cut buffer is essentially a one object database which can be viewed, edited, and manipulated as desired (see Data Viewing).

Freehand Translate

Entities can be translated interactively using the Freehand Translate tool. A translation manipulator is generated around the selected entity permitting the entity to be translated interactively. The new position is reflected in the database.

Freehand Rotate

Entities can be rotated interactively using the Freehand Rotate tool. A rotation manipulator is generated around the selected entity permitting the entity to be rotated interactively. The new orientation is reflected in the database.

Move to Attach

One entity can be moved so as to orient properly with another entity using the Move to attach tool. The user selects up to three points on the object to be moved and corresponding attachment points on a fixed object. The interface forces the attachment points to be consistent (that is, there exists a way to position the movable object so that all attachments are made). Upon identifying these correspondences, the entity to be moved is repositioned and oriented so as to enforce the attachments and the updated location is reflected in the database. Note that attachments are temporary and cease to exist upon the completion of the operation. To join the objects once they have been attached, the user should use the Group tool.

Paste Attach

The Paste Attach tool is identical to the Attach tool above but it permits the user to attach an object from the Cut/Copy buffer into the active data world.

Freehand Scale

Entities can be scaled interactively using the Freehand Scale tool. A scalingmanipulator is generated around the selected entity permitting the entity to be scaled interactively. The new scale is reflected in the database. Scaling can be performed in the X,Y, and Z directions of the local coordinate system of the entity. For objects, scaling constraints (uniform scale, uniform scale in X and Y, etc) can be specified via a preferences window. For a part instantiation, scaling preferences are mandated by the part.

Scale to Attach

Scale attachment is analogous to Move to Attach except the object is scaled under its constraints to make the required attachments. The new scaling of the object is reflected in the database.

Object To Prototype

The Prototype tool generates a prototype from an object or primitive and stores that prototype in the database. The original object or primitive is removed from the database and replaced with an instantiation of the newly generated prototype The prototype will persist in the database even if all parts associated with it are deleted from the active database unless an explicit Part Deletion is requested. A name and annotation may be attached to a prototype.

Prototype Browser/Part Instantiation

The Prototype Browser provides the ability to search through all of the prototypes in the database. Prototypes are displayed within the browser and can be dragged from the browser into an active data world. The Move to Attach and Scale to Attach can also be used to generate a part from a prototype attached to objects in an active data world. New parts generated from the prototype browser are stored in the active database with the associated placement information.

Part to Object

The Part to Object tool converts a part into an object, copying all of the information from the prototype into an object unassociated with that prototype. This permits the user to take a part which almost meets his needs and edit that part without affecting other objects generated from the same prototype.

Polymorphism

Polymorphism is the ability of the system to automatically convert objects of one type into objects of another type so as to permit a tool which requires arguments of a certain type to operate properly. If the object being converted to a different type is not changed by the operation, then the polymorphism is temporary and transparent to the user. If the object being converted is changed by the operation, then the user is informed that the polymorphism will be permanent and given an opportunity to cancel the operation.

The primary form of polyrnorphism is the required ability to convert every object or part in the system into a triangular mesh. Grouped objects can be converted into a triangular mesh by taking the union of the triangular meshes formed by converting their components into triangular meshes. Thus, the requirement of the system that it be possible to morph every object into a triangular mesh is essentially a requirement that every piece of primitive geometry in the system provide functionality for conversion to a triangular mesh.

Grouped objects which are permanently morphed into triangular meshes maintain their hierarchical structure but as a collection of meshes instead of objects. Annotations, names. and other external database information is maintained within the hierarchy.

Prefab Primitives

The system provides a set of geometric primitives which can be instantiated, moved, scaled, displayed, and converted to meshes. These primitives are basic geometric shapes from which other geometry can be assembled such as the cube, cylinder, cone, prism, disc, and the like. Because no primitive specific operations are provided, adding a primitive to the system requires nothing more than a basic parameterization of the primitive which captures its geometry, a display generator, a conversion to a mesh, and an encapsulated database representation. The display generation and mesh conversion routines take a single floating point value between zero and one as a complexity argument to assist in the determination of the detail to provide (for example, the number of planar faces to use to approximate a cylinder). This argument may be set at any time by the user of the system.

Prefab Primitives are inherently simple and are not used to represent objects such as I-beams which can be constructed as groups of other prefab primitives such as stretched cubes.

Parameterized Prototypes

It is a long-term goal to provide general parameterized parts whose parameters can be set by the user. The concept behind scaling constraints is a simple version of the idea of generally parameterizable prototypes. A parameterized prototype would allow the user to set, for example, the width of a groove, the spacing of a set of holes, or the number of legs on a stool. This would permit a smaller catalogue of prototypes to service a larger need but requires significantly more complex functionality for prototype description.

Structure Shop

The Structure Shop provides additional functionality for the generation of large, primarily planar structures such as buildings as well as support structures and basic functionality for point and line surveying. The Structure Shop adds the point, line, and plane objects to the palette available to the user and provides simple interactive functionality for manipulating these objects.

Extract Scan Points

The user can cut out points from a range scan using the Extract Scan Points tool. The user selects a range scan and then either traces out a loop around the points he wishes to extract or draw a polygon around these points. The range scan selected is replaced with two range scans containing separately the points inside and the points outside of the drawn region. Range scan names are augmented with a unique identifier (i.e. RS35 divides into RS35 1 and RS35_2) and annotations are copied into each new component scan.

Plane From Points

The plane object a set of bounded polygons lying in a plane. The multi-contoured boundary consists of edges and vertices which can be shared between juxtaposed planes as necessary. The Plane from Points tool calculates the best-fit plane given a set of points. The set of points can originate either from a range scan or from a mesh (and by polymorphism this implies that they can originate from any geometric object or part). The boundary of the plane is generated by projecting the points into the best fit plane and computing the convex hull. Depending upon a preference set by the user, the original object from which the points were derived is deleted from the database or remains intact. The new plane object is inserted into the database.

Corner from Points

The Corner from Points tool Generates three plane objects from a set of points. The set of points can originate either from a range scan or from a mesh. The three planes share a corner vertex and three edges extending from that vertex. With the exception of the shared vertex and a pair of shared edges, each plane object is bounded by the convex hull of its points when projected into its plane. Depending upon a preference set by the user, the original object from which the points were derived is deleted from the database or remains intact. The three new plane objects are inserted into the database.

Add Hole/Add Region

Holes and additional contours can be added to plane objects using this tool. In each case, the user draws a contour onto the infinite plane of which the plane object is a part. In the case of the hole, the resulting contour is subtracted from the given plane object causing the addition and deletion of vertices as necessary. In the Add Region case, the new contour region is unioned with the existing, polygons and vertices are added and removed as necessary.

Interactive Vertex Move

The user can drag vertices of a polygon with the mouse. These vertices are constrained to lie in the plane specified by their plane object. The user can also identify one or two snapping planes to allow precise placement of vertices. The addition of one snapping plane creates snapping regions around all of the vertices of that plane as well as a weaker (smaller) snapping region everywhere in that plane. The user can easily drag a vertex so that it aligns with another plane or attaches to a vertex in another plane. If two snapping planes are indicated, then all of the snap regions described above are created for each of the two indicated planes; however, in addition, an extremely large snap region is created around the intersection point of the three planes (the two indicated planes plus the plane which contains the dragged vertex). If a vertex is snapped to another vertex by the user, then the vertex becomes a shared vertex.

Vertices which are shared by two planes can be dragged only in the line which is the intersection of their two planes. Vertices which are shared by more than two planes cannot be dragged, Vertices also interact with the other contours within the same plane. Snapping occurs with all edges and vertices of these other contours. When a contour which bounds a filled region is moved it may intersect with other contours representing regions or holes. The result of moving a vertex of such a contour is the union of all filled regions within that polygon. Similarly, when moving a vertex of a contour which bounds a hole, the filled region of this contour is subtracted from all other filled polygons in that plane. The new position of the vertex is reflected in the database and edges which use this vertex as an endpoint are also updated.

Unshare Vertex

Clicking on the Unshare Vertex tool and selecting a shared vertex will cause sharing of this vertex to be replaced with use of independent copies of this vertex which may be moved independently and, in turn, separated from each other. The original shared vertex is deleted from the database and replaced with the copies.

Vertex Insertion/Deletion

Vertices may be inserted or deleted with this tool. Vertices are inserted by clicking on the location of the insertion point. Vertices are deleted by indicating the vertex. Vertices which are shared are deleted from all of the plane objects in which they participate. All such changes are reflected in the database.

Merge Planes

The user can merge two plane objects with the Merge Planes tool. This operation checks that the two objects are near coplanar and warns the user before continuing if they are not. Merging planes causes the two indicated plane objects to be replaced in the database by a single plane object which is a best fit plane to all of the points from which the two original objects were generated. Vertices from the original plane objects are projected into the new plane while maintaining the constraints imposed by vertex sharing. The boundary of the new object is the union of the boundaries of all of the merged plane objects.

Point to Free Point

The Point to Free Point tool generates a free standing point from either a scan point, a mesh point, or a vertex. The free point is a specially marked vertex which exists outside of any surface. Free points are a non-surface data object and thus cannot be converted into a mesh. Free standing points are primarily intended to permit basic surveying (property lines, etc) using the FDV. Free points can be named and annotated and are stored in the database.

Make Free Line

The Make Free Line tool Generates a free standing line from two free standing points. The free line exists outside of any surface and therefore cannot be converted into a mesh. Free standing lines are primarily intended to permit basic surveying (property lines, etc) using the FDV. Free lines can be named and annotated and are stored in the database.

Inquiry and Presentation

The Inquiry and Presentation toolkit provides functionality for querying and displaying the data as well as for modifying non-geometric data stored within the database. This toolkit, while providing tight integration with the various other toolkits in the system, will be separable into an independent system for distribution to users who are not expected to use either the FDV unit or the model reconstruction tools but who wish to access the information generated by the various Cyra tools.

View Data World

The geometric contents of a data world may be viewed using an interactive, visual browser which displays a three-dimensional representation of that data world. Every geometric object or part belongs to one data world which is a subset of a database. Any number of data world views may be opened and used independently. Operations which do not involve a particular viewpoint (unlike, for example, the Extract Scan Points tool) may be performed using multiple views of the same data world by indicating some operands in one view and other operands in any number of other views.

Interactive View Manipulation

A data world view may be zoomed in and out, rotated, and panned by the user. These operations will be interactive provided that the size and complexity of the model and the required frame rate do not exceed the ability of the platform to generate frames at interactive speeds.

Interactive Fly Through

The user can navigate through a model using a fly through paradigm in which the user controls the movement (speed, direction, and orientation) of an imaginary eye which views the scene. This fly through will be interactive provided that the size and complexity of the model and the required frame rate do not exceed the ability of the platform to generate frames at interactive speeds.

Significant research has been done on optimizing this process to permit high frame rates on extremely complex models. It is our desire to incorporate such research in later generations of the CGP.

Save/Load Named View

The user may save a current viewpoint in a data world with a name and annotation. A named view may be loaded into any data world viewing window thereby replacing that window's viewpoint with the saved viewpoint.

Delete Named View

A named view may be deleted from the database at the request of the user.

Standard Views

The six standard views (left, right, front, back, top, and bottom) relative to a user-specified origin and at a user-specified distance are immediately available in any data world view.

Orthographic/Perspective Toggle

A data world may be viewed using either an orthographic or perspective projection. Operations from all of the various toolkits will function correctly regardless of which projection is being used.

Integrate Data Worlds

The user can merge one data world into a second data world by specifying pairs of corresponding points in the two data worlds. The user must provide at least three non-degenerate pairs of points. A transformation which repositions the second data world so that the correspondences will be met as closely as possible (in a least squares sense) is calculated from the point pairs. The second data world is removed from the database and all data within that data world is copied into the first data world with the calculated transformation.

Distance

The distance between two user-specified locations in the model can be calculated and displayed using the Distance tool.

Viewing Parameters

Every object, part, or primitive can provide any number of named visual representations. The user can specify which of these named visual representations is to be used for a given object, part, or primitive or for an entire scene by setting an object's "representation attribute". Every object is provided with a default representation which is used if the named visual representation does not exist for that object or if no named visual representation is provided. A named visual representation is either a system provided drawing style such as wireframe or bounding box or else a pointer to another model such as a lower resolution version of the model or a symbolic representation of that object (two cones representing a complex valve).

Typically, a primitive provides at least the following representation attribute values of which "surface" is normally marked as the default: wireframe, hidden line, surface. bounding, box. and invisible.

Surface property parameters such as color and reflectivity are also provided through the visual representation by providing attribute/value pairs as part of an object's visual representation. An entity in a hierarchy uses its closest ancestors' value for an attribute if no value is specified for that attribute in the entity. Every attribute required for the drawing of an object (such as color or line width) must be provided with a corresponding default in case no value is specified by the entity or its ancestors. The attributes which will be supported by all primitives in the first release of the CGP are ambient color, diffuse color, specular color, emissive color, shininess, transparency, show name, and show annotations. In addition, certain primitives will support the "show dimension" attribute. Range scans will support the "use intensity pseudocoloring attribute".

Create/Load/Save/Delete Named Visual Representation

A user can create a named visual representation to permit him to view a database using a different parameter set than others using the database. This visual representation is given a name and is stored in the database. When a user creates a new visual representation, all of the current attribute/value pairs for each object in the data world is associated with the named visual representation. Changes effected by the user to the data world (such as changing representation attribute of an object to wireframe or its color to blue) when using this named visual representation affect only the attribute/value pairs of the currently loaded visual representation. Thus, a piping engineer might generate a visual representation of a data world in which all pipes are displayed as cylinders during one session and a second visual representations in which pipes are displayed as center lines to be used during another session. This, of course, presumes that the pipe object provides a named representation attribute for center lines.

Note that this paradigm permits many simultaneous views on the same database by different users without requiring separate copies of the database for each viewer.

Create/Delete/View/Edit Annotation

An annotation is a typed data field associated with an object, primitive, part, or prototype. Annotations permit the inclusion of application specific data in the CGP database. This data can be in any of the ISO standard data types (don't recall what these are but there are only half a dozen of them and they are supported by every database). Each annotation is referenced by name. Annotations associated with a prototype apply to every part generated with that prototype unless the value of the annotation is explicitly over-ridden by the part.

Every entity has, at a minimum, a name and type annotation.

Select by Query

The user can select a set of entities using an SQL query on the annotations of all entities in a data world. Such queries are handed directly to the database and the degree of SQL support provided will be based on the database selected. The entities which are returned by the queries are marked as selected and may be used as arguments to all tools which permit operations on multiple objects. Data stored by the CGP within the database is also accessible to the user via a read-only front end to CGP's database structures.

Data Exchange

The Data Exchange toolkit provides the functionality necessary to seamlessly integrate the CGP with other CAD packages and vendor provided catalogues. The toolkit will ultimately import and export a wide variety of file types dependent upon market need.

Import/Export CRX

The export function generates a single binary data file representing selected objects, a data world, or a database in CRX, Cyra's proprietary data format. The import function permits the reading of this data format.

Import/Export DXF

The export function generates a DXF data file representing selected objects, a data world, or a database in this general purpose CAD standard format.

Import DXF file loads an entity or set of entities stored in a DXF file into the CGP.

Import/Export RGB

The export RGB function generates an RGB video image file from a selected video image. Import RGB generates a video image object in the CGP from an RGB video image file.

Import/Export Inventor

The export Inventor function generates an Inventor file representing selected objects, a data world, or a database in the Inventor file format. The resulting model when viewed using a standard Inventor viewer will be identical to the model as viewed in the CGP. The import function loads an entity or set of entities stored in an Inventor file into the CGP. The CGP version of this Inventor file will be limited in the following ways.

Export PostScript

The export PostScript function generates a PostScript file or prints directly to a printer the view represented in a selected data world.

General Interaction and System Information

Interaction with the toolkits will be through a mouse and keyboard with emphasis on visual interactivity. The user interface is expected to have iconic tool palettes, function key shortcuts, menus, and windows. Most of the functionality will be accessible using only the mouse. The user interface of the system will be consistent with standard interfaces and interaction paradigms on a given platform.

Platform

The CGP will run on a 100 MHz Pentium Processor running Windows NT in a laptop box. The system will provide a minimum of 48 Mbytes of RAM with a 512 kbyte cache The platform is expected to have an 800×600, 256 color display and at least one Gbyte of disk space. The system will communicate with the hardware via an ethernet over PCMCIA.

The first port of the CGP is expected to be to a Silicon Graphics platform to provide in-the-office model reconstruction in a graphics intensive environment.

Help System

The CGP will provide an interactive help system which provides context sensitive help in a format corresponding to the standard interface for applications on a given platform. All functionality accessible to the user will be documented in the help system.

Undo

The CGP will allow the user to Undo any number of operations (to the functional limits of the system such as memory and disk space) performed during a session.

Documentation

Hard copy documentation will be provided for the system including, at a minimum, a field guide which can be used by a surveyor on-site.

What is claimed is:

1. An apparatus for imaging and modeling three dimensional objects comprising:
   an imaging module for emitting a laser beam for scanning the surface of a remote object and recording data points corresponding to the points on the surface of the object;
   a modeling module for converting the data points into a three dimensional image of the object;
   a user interface for inputting commands, said commands including an identification of a region of the surface of the object and specifications for the level of resolution desired for that region; and
   a processor for controlling the operation of the imaging module, the modeling module and the user interface and being arranged to generate an overall scan of the object and a scan of the selected region within the object and wherein said modeling module functions to integrate data points from the scans into a composite image.

2. An apparatus as recited in claim 1 wherein said scan of the region has a resolution different from the scan of the overall object.

3. An apparatus as recited in claim 2 wherein said scan of the region has a higher resolution than the scan of the object.

4. An apparatus as recited in claim 1 further including a camera for obtaining a video image of the object and wherein said user interface includes a display for displaying the video image of the object and wherein the user can identify the region of the object to be scanned from the video image.

5. An apparatus as recited in claim 4 wherein said three dimensional image generated by said modeling module is also displayed on said display.

6. An apparatus as recited in claim 1 wherein the three dimensional image generated by said modeling module includes geometric shapes corresponding to portions of the remote object.

7. An apparatus for imaging and modeling three dimensional objects comprising:
   a video module for capturing and displaying a video image of the object;
   an imaging module for emitting a laser beam for scanning the surface of a remote object and recording data points corresponding to the points on the surface of the object;
   a modeling module for converting the data points into a three dimensional image of the object;
   a user interface for inputting commands, said commands including an identification of a region of the surface of the object and specifications for the level of resolution desired for that region, said user interface being connected to said video module such that user can select the region to be scanned utilizing the video image of the object as a reference; and
   a processor for controlling the operation of the imaging module, the modeling module and the user interface and being arranged to generate an overall scan of the object at a low resolution and a scan of the selected region within the object at a higher resolution and wherein said modeling module functions to integrate data points from the scans into a composite image.

8. An apparatus as recited in claim 7 wherein the three dimensional image generated by said modeling module includes geometric shapes corresponding to portions of the remote object.

9. A method of imaging and modeling three dimensional objects comprising the steps of:
   a) scanning the surface of a remote object with a laser beam and recording data points corresponding to points on the surface of the object;
   b) modeling the data points into a three dimensional image of the object;
   c) scanning a region of the surface of the remote object and recording additional data points corresponding to points on the surface of the object within that region; and
   d) integrating the data points from the scans into the three dimensional image.

10. A method as recited in claim 9 wherein the scanning of the region of the object performed in step c is performed at a higher resolution than the scan performed in step a.

11. A method as recited in claim 9 wherein the scanning of step a is performed before the scanning of the region in step c.

12. A method as recited in claim 9 wherein the three dimensional image generated during said modeling step includes geometric shapes corresponding to portions of the remote object.

13. A method of imaging and modeling three dimensional objects comprising the steps of:
   a) capturing a video image of the object;
   b) displaying the video image;
   c) scanning the surface of a remote object with a laser beam and recording data points corresponding to points on the surface of the object;
   d) modeling the data points into a three dimensional image of the object;

e) scanning a region of the surface of the remote object and recording additional data points corresponding to points on the surface of the object within that region, said region being selected by the user utilizing the video image of the object as a reference; and g) integrating the data points from the scans into the three dimensional image.

14. A method as recited in claim 13 wherein the user indicates the density of the scanning operation by defining the number of samples to be taken in the region.

15. A method as recited in claim 13 wherein the user indicates the density of the scanning operation by defining the angular separation between adjacent data points.

16. A method as recited in claim 13 further including the step of generating a data file from the three dimensional image which can be inputted into a computer-aided design system.

17. A method as recited in claim 13 wherein the scanning of the region of the object performed in step e is performed at a higher resolution than the scan performed in step c.

18. A method as recited in claim 13 wherein the scanning of step c is performed before the scanning of the region in step e.

19. A method as recited in claim 13 wherein the three dimensional image generated during said modeling step includes geometric shapes corresponding to portions of the remote object.

20. A method as recited in claim 19 wherein the region selected for scanning in step e includes a portion of the object corresponding to a geometric shape and wherein the additional data points are used to refine the geometric shape during step g.

* * * * *